(12) United States Patent
Arishima et al.

(10) Patent No.: US 10,554,913 B2
(45) Date of Patent: Feb. 4, 2020

(54) SOLID-STATE IMAGING DEVICE, IMAGING SYSTEM AND MOVABLE OBJECT

(71) Applicant: CANON KABUSHIKI KAISHA, Tokyo (JP)

(72) Inventors: Yu Arishima, Yokohama (JP); Yasuhiro Oguro, Tokyo (JP); Shinichiro Shimizu, Kawasaki (JP); Satoshi Koizumi, Kawasaki (JP); Masaya Ogino, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/956,582

(22) Filed: Apr. 18, 2018

(65) Prior Publication Data
US 2018/0316881 A1 Nov. 1, 2018

(30) Foreign Application Priority Data
Apr. 26, 2017 (JP) ................................ 2017-087026

(51) Int. Cl.
*H04N 5/365* (2011.01)
*H04N 5/369* (2011.01)
*H04N 5/378* (2011.01)

(52) U.S. Cl.
CPC ......... *H04N 5/3658* (2013.01); *H04N 5/3696* (2013.01); *H04N 5/378* (2013.01)

(58) Field of Classification Search
CPC .... H04N 5/3658; H04N 5/343; H04N 5/3535; H04N 5/3532; H04N 5/3456; H04N 5/36961; H04N 5/378; H04N 5/3696
See application file for complete search history.

(56) References Cited

U.S. PATENT DOCUMENTS

| 7,755,688 B2 | 7/2010 | Hatano et al. |
| 7,847,362 B2 | 12/2010 | Ogino et al. |
| 7,961,237 B2 | 6/2011 | Hatano et al. |
| 8,106,343 B2 | 1/2012 | Arishima et al. |

(Continued)

FOREIGN PATENT DOCUMENTS

JP     2010-219958 A     9/2010

OTHER PUBLICATIONS

U.S. Appl. No. 15/955,146, filed Apr. 17, 2018. Applicant: Takeru Ohya, et al.

*Primary Examiner* — Jason A Flohre
(74) *Attorney, Agent, or Firm* — Venable LLP

(57) ABSTRACT

A solid-state imaging device includes pixels forming pixel rows, and a scanning circuit that performs a reset operation of a photoelectric converter and a readout operation of a pixel signal based on charges generated by the photoelectric converter including charge transfer from the photoelectric converter to the holding unit. The pixel rows include imaging rows and focus detection rows. The scanning circuit performs an image capture scan of the imaging rows and a focus detection scan of the focus detection rows, independently, such that signals of the focus detection rows are output after signals from the imaging rows. The scanning circuit performs the focus detection scan such that the reset operation on the focus detection row does not overlap with a charge transfer period on an imaging row belonging to a unit pixel row neighboring a unit pixel row to which a focus detection row under the reset operation belongs.

18 Claims, 30 Drawing Sheets

(56) References Cited

U.S. PATENT DOCUMENTS

| | | |
|---|---|---|
| 8,466,401 B2 | 6/2013 | Arishima et al. |
| 8,507,870 B2 | 8/2013 | Arishima et al. |
| 8,530,989 B2 | 9/2013 | Kikuchi et al. |
| 8,553,115 B2 | 10/2013 | Arishima et al. |
| 8,687,246 B2 | 4/2014 | Fujimura et al. |
| 8,710,610 B2 | 4/2014 | Kono et al. |
| 8,742,359 B2 | 6/2014 | Arishima et al. |
| 8,796,609 B2 | 8/2014 | Arishima et al. |
| 8,836,833 B2 | 9/2014 | Yamashita et al. |
| 9,232,164 B2 | 1/2016 | Minowa et al. |
| 9,270,911 B2 | 2/2016 | Taniguchi |
| 9,276,036 B2 | 3/2016 | Arishima et al. |
| 9,445,029 B2 | 9/2016 | Shimizu |
| 9,549,139 B2 | 1/2017 | Ikeda et al. |
| 9,554,069 B2 | 1/2017 | Shimizu et al. |
| 9,621,832 B2 | 4/2017 | Ogino et al. |
| 9,681,076 B2 | 6/2017 | Oguro et al. |
| 2008/0074534 A1* | 3/2008 | Kusaka .............. H04N 5/23212 348/364 |
| 2008/0231859 A1 | 9/2008 | Ogino |
| 2009/0219420 A1* | 9/2009 | Kuroda .................. H04N 5/343 348/281 |
| 2010/0283881 A1* | 11/2010 | Araki .................. H04N 5/3456 348/308 |
| 2011/0273598 A1 | 11/2011 | Ogino et al. |
| 2012/0008030 A1 | 1/2012 | Kono et al. |
| 2012/0038810 A1* | 2/2012 | Taniguchi ............ H04N 5/3532 348/308 |
| 2012/0105670 A1 | 5/2012 | Arishima et al. |
| 2013/0113966 A1 | 5/2013 | Arishima et al. |
| 2014/0117211 A1 | 5/2014 | Arishima et al. |
| 2014/0340565 A1* | 11/2014 | Kitani ................ H04N 5/23212 348/349 |
| 2014/0375852 A1 | 12/2014 | Ogino |
| 2015/0281610 A1 | 10/2015 | Ota et al. |
| 2016/0309102 A1 | 10/2016 | Koizumi |
| 2018/0063460 A1 | 3/2018 | Ogino et al. |

* cited by examiner

SOLID-STATE IMAGING DEVICE, IMAGING SYSTEM AND MOVABLE OBJECT

BACKGROUND OF THE INVENTION

Field of the Invention

The present invention relates to a solid-state imaging device and a method of driving the same.

Description of the Related Art

In an imaging system such as a video camera or an electronic still camera, the autofocus (AF) function that automatically adjusts a focus (focal spot, focal point) when capturing an image is widely spread. As a device having the AF function, an imaging device that can acquire both an imaging signal and a focus detecting signal is known. Japanese Patent Application Laid-Open No. 2010-219958 discloses an imaging device that acquires both an imaging signal and a focus detecting signal by performing an image capture scan in which rows are reduced and scanned for capturing and a focus detection scan in which at least some of the rows which are not scanned in the image capture scan are scanned for focus detection.

In an imaging device that acquires a capturing signal and a focus detecting signal by performing both an image capture scan and a focus detection scan, however, noise may be superimposed on imaging signals read out from capturing rows due to the operation of focus detection rows.

SUMMARY OF THE INVENTION

An object of the present invention is to provide a solid-state imaging device and a method of driving the same that can suppress noise due to an operation of focus detection rows from superimposing on an imaging signal read out from imaging rows.

According to one aspect of the present invention, there is provided a solid-state imaging device including a plurality of pixels arranged to form a plurality of pixel rows, each of the plurality of pixels including a plurality of photoelectric converters that generate charges by photoelectric conversion, a holding unit that holds charges generated by any of the plurality of photoelectric converters, an amplifier unit that outputs a pixel signal based on an amount of charges held in the holding unit, and a reset unit that resets the photoelectric converters, and a scanning circuit that performs, on the row-by-row basis for the plurality of pixels, a reset operation of the photoelectric converters of the pixel and a readout operation of a pixel signal based on charges generated by the photoelectric converter, the readout operation including charge transfer that transfers charges generated by the photoelectric converter to the holding unit, wherein the plurality of pixel rows include a plurality of imaging rows to be used for acquiring imaging signals and a plurality of focus detection rows to be used for acquiring focus detection signals, wherein the scanning circuit performs an image capture scan and a focus detection scan, independently, such that signals of the plurality of focus detection rows are output after signals from the plurality of imaging rows are output, wherein, in the image capture scan, the reset operation and the readout operation are performed on the plurality of imaging rows, wherein in the focus detection scan, the reset operation and the readout operation are performed on the plurality of focus detection rows, wherein the plurality of pixel rows form a plurality of unit pixel rows defined by the holding unit on a basis that each of the unit pixel rows corresponds to one of the holding units, each of the unit pixel rows including at least one pixel row, and wherein the scanning circuit performs the focus detection scan such that the reset operation on each of the plurality of focus detection rows does not overlap with a period of the charge transfer on an imaging row belonging to a unit pixel row neighboring a unit pixel row to which a focus detection row on which the reset operation is performed belongs.

According to another aspect of the present invention, there is provided a solid-state imaging device including a plurality of pixels arranged to form a plurality of pixel rows, each of the plurality of pixels including a photoelectric converter that generates charges by photoelectric conversion, a holding unit that holds charges generated by the photoelectric converter, an amplifier unit that outputs a pixel signal based on an amount of charges held in the holding unit, and a reset unit that resets the photoelectric converter, and a scanning circuit that performs, on the row-by-row basis for the plurality of pixels, a reset operation of the photoelectric converter of the pixel and a readout operation of a pixel signal based on charges generated by the photoelectric converter, the readout operation including charge transfer that transfers charges generated by the photoelectric converter to the holding unit, wherein the plurality of pixel rows include a plurality of imaging rows to be used for acquiring imaging signals and a plurality of focus detection rows to be used for acquiring focus detection signals, wherein the scanning circuit performs an image capture scan and a focus detection scan, independently, such that signals of the plurality of focus detection rows are output after signals from the plurality of imaging rows are output, wherein, in the image capture scan, the reset operation and the readout operation are performed on the plurality of imaging rows, wherein in the focus detection scan, the reset operation and the readout operation are performed on the plurality of focus detection rows, wherein the plurality of pixel rows form a plurality of unit pixel rows defined by the holding unit on a basis that each of the unit pixel rows corresponds to one of the holding units, each of the unit pixel rows including at least one pixel row, and wherein, when the readout operation is performed on each of the plurality of imaging rows, the scanning circuit performs the focus detection scan so as not to perform the reset operation on the focus detection row belonging to the unit pixel row neighboring the unit pixel row to which the imaging row on which the readout operation is performed belongs.

According to yet another aspect of the present invention, there is provided a solid-state imaging device including a plurality of pixels arranged to form a plurality of pixel rows, each of the plurality of pixels including a photoelectric converter that generates charges by photoelectric conversion, a holding unit that holds charges generated by the photoelectric converter, an amplifier unit that outputs a pixel signal based on an amount of charges held in the holding unit, and a reset unit that resets the photoelectric converter, and a scanning circuit that performs, on the row-by-row basis for the plurality of pixels, a reset operation of the photoelectric converter of the pixel and a readout operation of a pixel signal based on charges generated by the photoelectric converter, the readout operation including charge transfer that transfers charges generated by the photoelectric converter to the holding unit, wherein the plurality of pixel rows include a plurality of imaging rows to be used for acquiring imaging signals and a plurality of focus detection rows to be used for acquiring focus detection signals, wherein the plurality of pixel rows form a plurality of unit pixel rows each including a plurality of pixel rows defined by the holding unit shared by pixels on the plurality of pixel rows, wherein the scanning circuit performs an image capture scan and a focus detection scan, independently, such that signals of the plurality of focus detection rows are output after signals from the plurality of imaging rows are output, wherein in the image capture scan, the reset operation and the readout operation are performed on the plurality of imaging rows, wherein, in the focus detection scan, the reset operation and the readout operation are performed on the plurality of focus detection rows, wherein the scanning circuit performs in parallel the readout operation on an imaging row included in a first unit pixel row in a first period and the reset operation on a focus detection row included in a second unit pixel row neighboring the first unit pixel row, wherein, in the first period, the scanning circuit performs an operation of causing the holding unit included in the second unit pixel row to be in a floating state by causing the reset unit included in the second unit pixel row to be in an off-state after completion of the reset operation on the focus detection row included in the second unit pixel row, and wherein the scanning circuit performs the readout operation on an imaging row included in the second unit pixel row in a second period subsequent to the first period.

Further features of the present invention will become apparent from the following description of exemplary embodiments with reference to the attached drawings.

BRIEF DESCRIPTION OF THE DRAWINGS

FIG. 5 and FIG. 9 are schematic diagrams illustrating the operation of each pixel row in a method of driving the solid-state imaging device according to the first embodiment.

FIG. 19 is a schematic diagram illustrating the operation of respective pixel rows in a method of driving the solid-state imaging device according to the third embodiment.

FIG. 21 is a schematic diagram illustrating an arrangement example of color filters in a solid-state imaging device according to a fourth embodiment.

DESCRIPTION OF THE EMBODIMENTS

Preferred embodiments of the present invention will now be described in detail in accordance with the accompanying drawings.

First Embodiment

Figure 1:
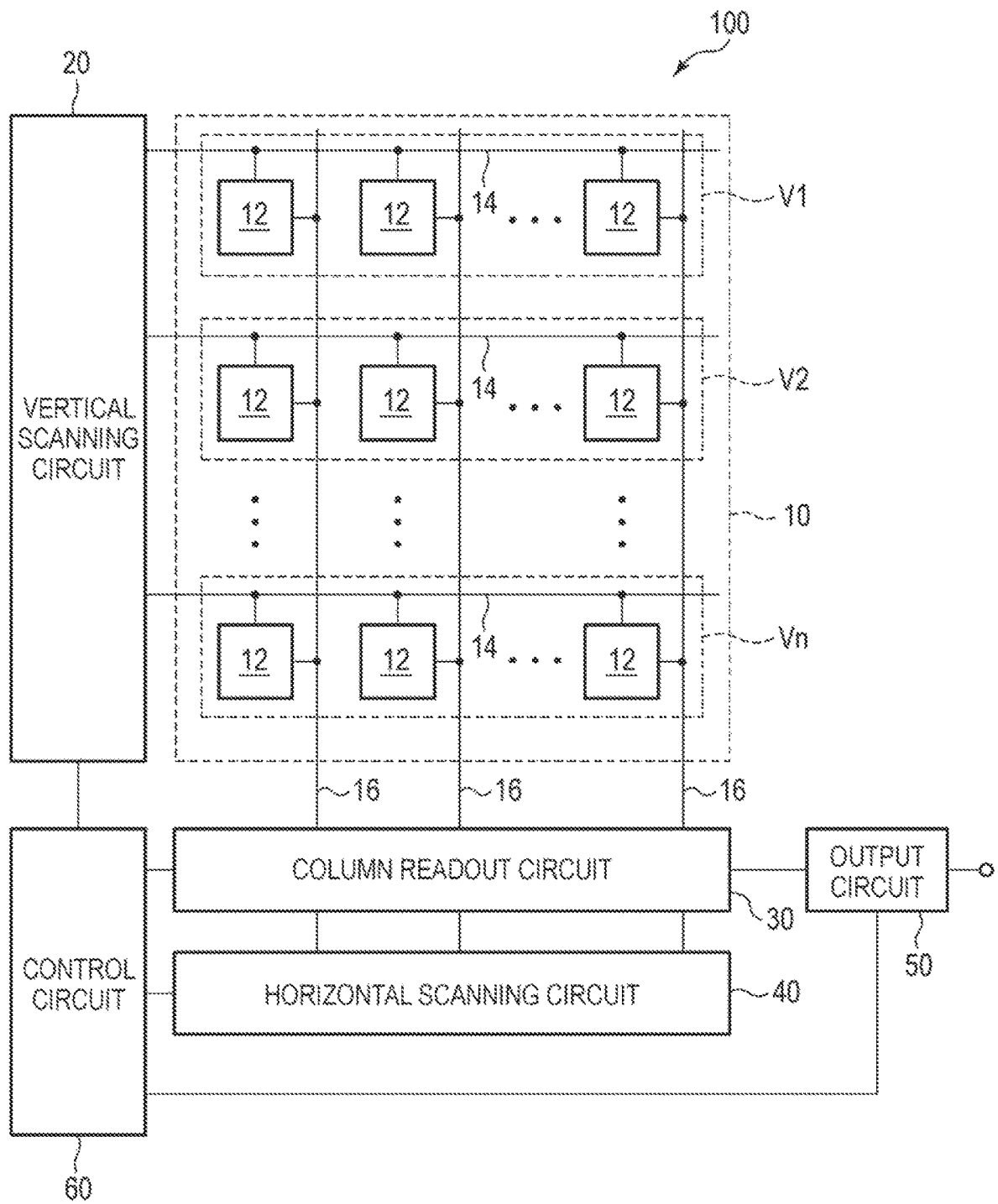
FIG. 1 is a block diagram illustrating a general configuration of a solid-state imaging device according to a first embodiment.
Figure 2:
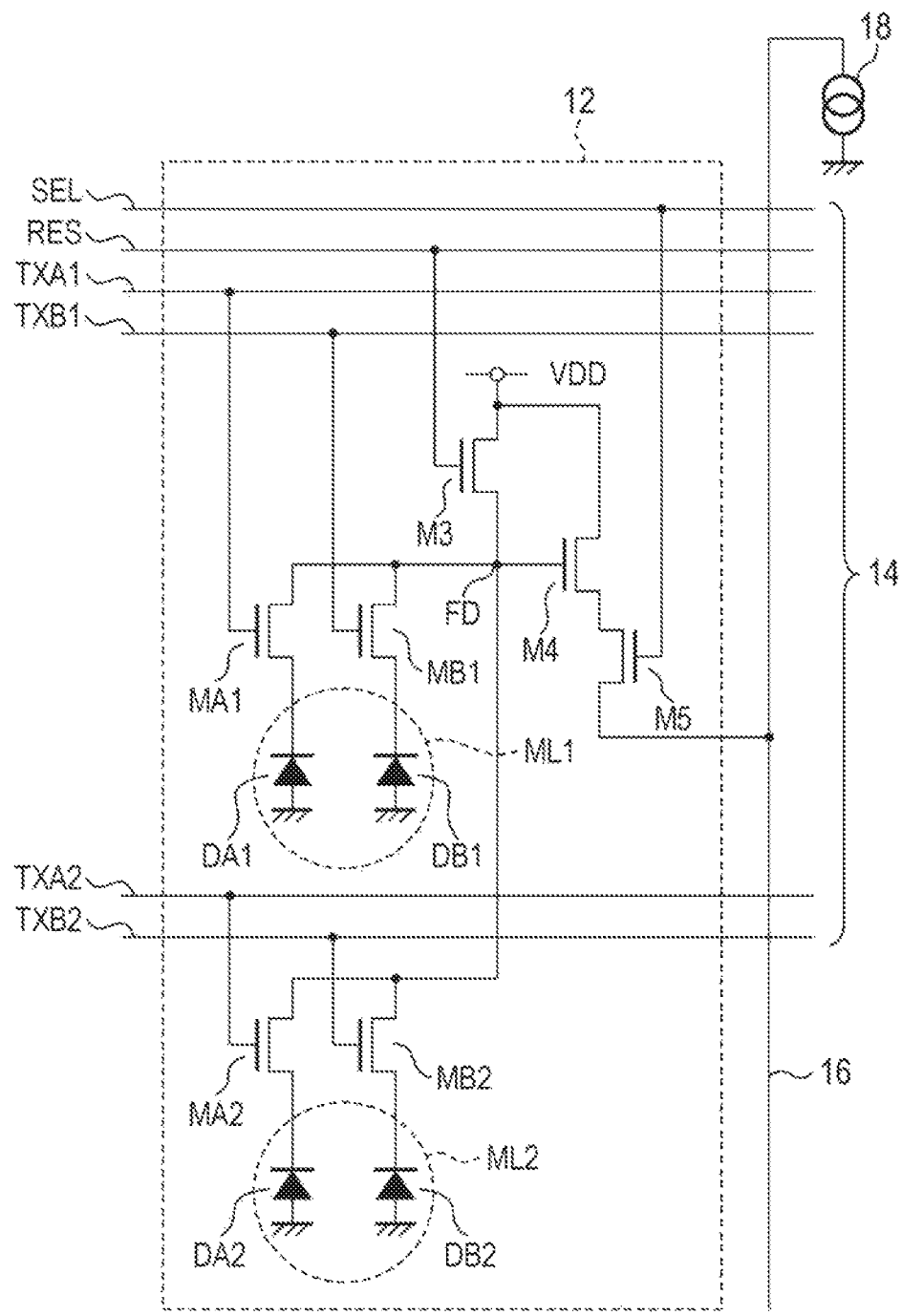
FIG. 2 is a circuit diagram illustrating a configuration example of a unit pixel of the solid-state imaging device according to the first embodiment.
Figure 3:
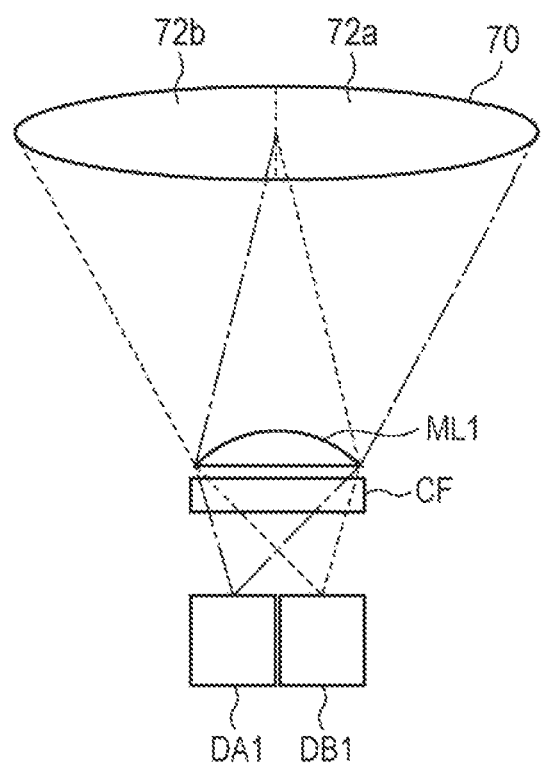
FIG. 3 is a conceptual diagram of imaging optics in the solid-state imaging device according to the first embodiment.
Figure 4:
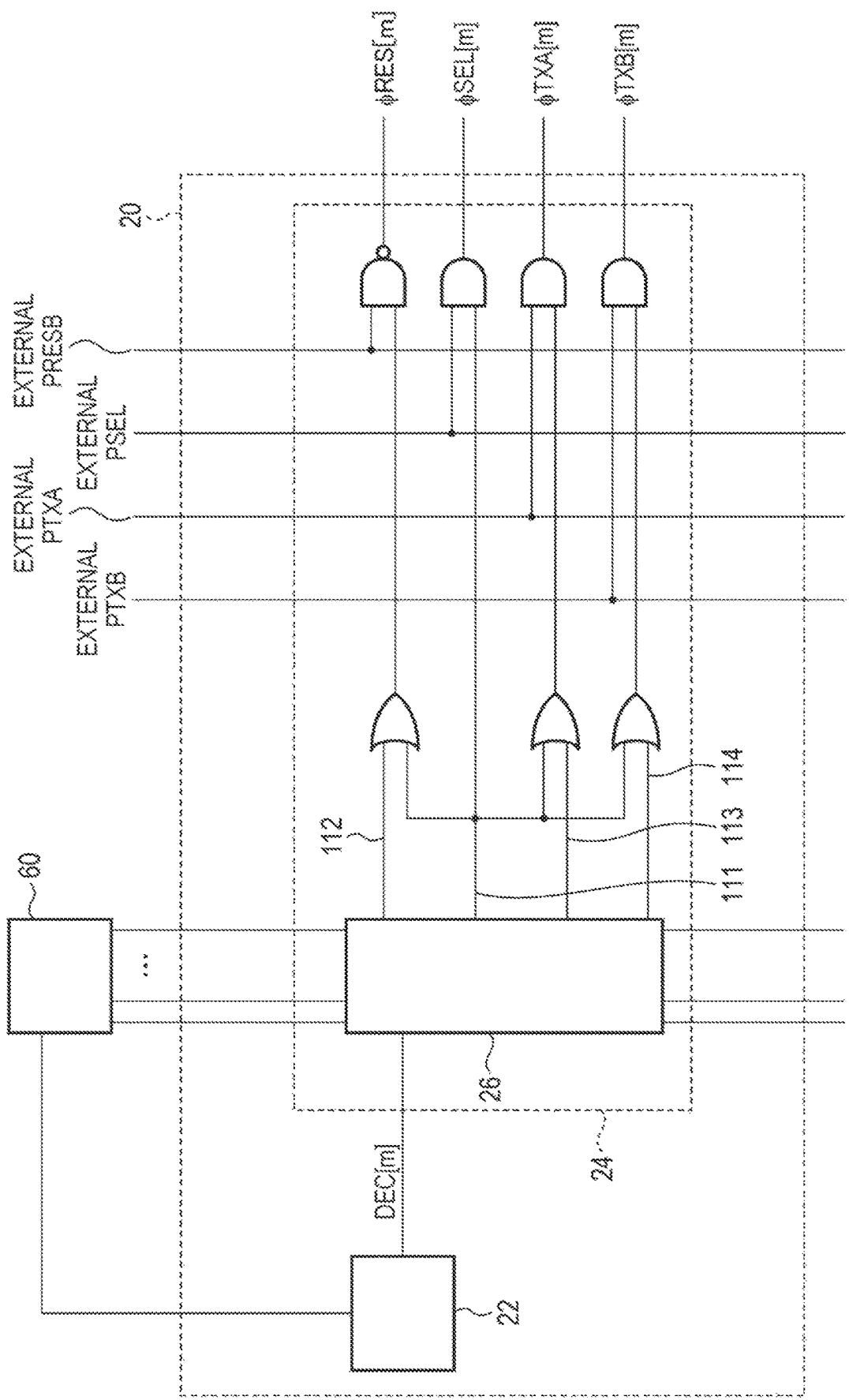
FIG. 4 is a diagram illustrating a configuration example of a vertical scanning circuit of the solid-state imaging device according to the first embodiment.

A solid-state imaging device and a method driving the same according to a first embodiment of the present invention will be described with reference to FIG. 1 to FIG. 12. First, the structure of the solid-state imaging device according to the present embodiment will be described by using FIG. 1 to FIG. 4. FIG. 1 is a block diagram illustrating a general configuration of the solid-state imaging device according to the present embodiment. FIG. 2 is a circuit diagram illustrating a configuration example of a unit pixel of the solid-state imaging device according to the first embodiment. FIG. 3 is a conceptual diagram of imaging optics in the solid-state imaging device according to the present embodiment. FIG. 4 is a diagram illustrating a configuration example of a vertical scanning circuit of the solid-state imaging device according to the present embodiment.

As illustrated in FIG. 1, a solid-state imaging device 100 according to the present embodiment includes a pixel region 10, a vertical scanning circuit 20, a column readout circuit 30, a horizontal scanning circuit 40, an output circuit 50, and a control circuit 60.

A plurality of unit pixels 12 arranged in a matrix over a plurality of rows and a plurality of columns are provided in the pixel region 10. FIG. 1 illustrates the pixel region 10 including n unit pixel rows from a unit pixel row V1 to a unit pixel row Vn. Each unit pixel row includes a plurality of unit pixels 12 arranged in a column in the row direction. The number of rows and the number of columns of a pixel array arranged in the pixel region 10 are not limited in particular. Further, other pixels (not illustrated) such as optical black pixels that are shielded from light, dummy pixels that do not output a signal, or the like may be arranged in the pixel region 10, in addition to the unit pixels 12 that detect imaging signals or focus detecting signals.

On each unit pixel row of the pixel array of the pixel region 10, a control signal line 14 is arranged extending in a first direction (the lateral direction in FIG. 1, the horizontal direction in an example). The control signal line 14 is connected to the unit pixels 12 aligned in the first direction, respectively, to form a signal line common to these unit pixels 12. In the present specification, the first direction in which the control signal line 14 extends may be denoted as a row direction. Further, on each column of the pixel array of the pixel region 10, a vertical output line 16 is arranged extending in a second direction (the up-down direction in FIG. 1, the vertical direction in an example) that intersects the first direction. The vertical output line 16 is connected to the unit pixels 12 aligned in the second direction, respectively, to form a signal line common to these unit pixels 12. In the present specification, the second direction in which a vertical output line extends may be denoted as a column direction.

The control signal line 14 on each unit pixel row is connected to the vertical scanning circuit 20. The vertical scanning circuit 20 is a circuit unit that supplies, to the unit pixel 12 via the control signal line 14, control signals used for driving readout circuits inside the unit pixels 12 when pixel signals are read out from the unit pixels 12. One end of the vertical output line 16 on each column is connected to the column readout circuit 30. A pixel signal read out from the unit pixel 12 is input to the column readout circuit 30 via the vertical output line 16. The column readout circuit 30 is a circuit unit that performs predetermined signal processing, for example, signal processing such as an amplifying process, an analog-to-digital (AD) conversion process on a pixel signal read out from the unit pixel 12. The column readout circuit 30 may include differential amplifier circuits, sample-hold circuits, AD conversion circuits, or the like.

The horizontal scanning circuit 40 is a circuit unit that supplies, to the column readout circuit 30, control signals used for transferring pixel signals processed in the column readout circuit 30 to the output circuit 50 sequentially on a column basis. The output circuit 50 is a circuit unit that is formed of a buffer amplifier, a differential amplifier, or the like and outputs pixel signals read out from the column readout circuit 30 to a signal processing unit outside the solid-state imaging device 100. The control circuit 60 is a circuit unit that supplies control signals that control the operation or the timing of the vertical scanning circuit 20, the column readout circuit 30, the horizontal scanning circuit 40, and the output circuit 50. At least some of the control signals that control the operation or the timing of the vertical scanning circuit 20, the column readout circuit 30, the horizontal scanning circuit 40, and the output circuit 50 may be supplied from the outside of the solid-state imaging device 100.

Each of the unit pixels 12 may be configured by a circuit illustrated in FIG. 2, for example. The unit pixel 12 illustrated in FIG. 2 includes photoelectric converter DA1, DB1, DA2, and DB2, transfer transistors MA1, MB1, MA2, and MB2, a reset transistor M3, an amplifier transistor M4, and a select transistor M5.

Each of the photoelectric converters DA1, DB1, DA2, and DB2 is a photodiode, for example. The photoelectric converter DA1 has the anode connected to a ground voltage line and the cathode connected to the source of the transfer transistor MA1. The photoelectric converter DB1 has the anode connected to the ground voltage line and the cathode connected to the source of the transfer transistor MB1. The photoelectric converter DA2 has the anode connected to the ground voltage line and the cathode connected to the source of the transfer transistor MA2. The photoelectric converter DB2 has the anode connected to the ground voltage line and the cathode connected to the source of the transfer transistor MB2.

The drains of the transfer transistors MA1, MB1, MA2, and MB2 are connected to the source of the reset transistor M3 and the gate of the amplifier transistor M4. The connection node of the drains of the transfer transistors MA1, MB1, MA2, and MB2, the source of the reset transistor M3, and the gate of the amplifier transistor M4 is a so-called floating diffusion (FD) node. The capacitance component of the FD node functions as a holding unit of charges transferred from the photoelectric converters DA1, DB1, DA2, and DB2 and functions as a charge voltage converter.

The drain of the reset transistor M3 and the drain of the amplifier transistor M4 are connected to a power source voltage line that supplies a power source voltage VDD. The source of the amplifier transistor M4 is connected to the drain of the select transistor M5. The source of the select transistor M5 is connected to the vertical output line 16. A current source 18 is connected to the other end of the vertical output line 16.

In the case of the unit pixel 12 illustrated in FIG. 2, the control signal line 14 includes transfer gate signal lines TXA1, TXB1, TXA2, and TXB2, a reset signal line RES, and a select signal line SEL. The transfer gate signal line TXA1 is connected to the gate of the transfer transistor MA1. The transfer gate signal line TXB1 is connected to the gate of the transfer transistor MB1. The transfer gate signal line TXA2 is connected to the gate of the transfer transistor MA2. The transfer gate signal line TXB2 is connected to the gate of the transfer transistor MB2. The reset signal line RES is connected to the gate of the reset transistor M3. The select signal line SEL is connected to the gate of the select transistor M5.

Each of the photoelectric converters DA1, DB1, DA2, and DB2 converts (photoelectrically converts) an incident light into an amount of charges in accordance with the light amount and accumulates generated charges. When turned on, the transfer transistor MA1 transfers charges of the photoelectric converter DA1 to the FD node. When turned on, the transfer transistor MB1 transfers charges of the photoelectric converter DB1 to the FD node. When turned on, the transfer transistor MA2 transfers charges of the photoelectric converter DA2 to the FD node. When turned on, the transfer transistor MB2 transfers charges of the photoelectric converter DB2 to the FD node. The transfer transistors MA1, MB1, MA2, and MB2 form a charge transfer unit that transfers charges of the photoelectric converters DA1, DB1, DA2, and DB2 to the FD node.

The FD node is set to a voltage in accordance with the amount of charges transferred from the photoelectric converters DA1, DB1, DA2, and DB2 according to charge-to-voltage conversion due to the capacitance of the FD node. The amplifier transistor M4 is configured such that the power source voltage VDD is supplied to the drain and a bias current is supplied to the source from the current source 18 via the select transistor M5, which forms an amplifier unit whose input node is the gate (source follower circuit). Thereby, the amplifier transistor M4 outputs a signal based on the voltage of the FD node to the vertical output line 16 via the select transistor M5. When turned on, the reset transistor M3 reset the FD node to a voltage in accordance with the power source voltage VDD. At this time, the photoelectric converters DA1, DB1, DA2, and DB2 can be reset by the transfer transistors MA1, MB1, MA2, and MB2 being turned on. The reset transistor M3 forms a reset unit that resets the photoelectric converters DA1, DB1, DA2, and DB2 together with the transfer transistors MA1, MB1, MA2, and MB2.

A common microlens ML1 is arranged in the light incident direction of the photoelectric converters DA1 and DB1, and pupil-divided lights enter the photoelectric converter DA1 and the photoelectric converter DB1, respectively. For example, as illustrated in FIG. 3, the color filter CF and the microlens ML1 are arranged over the photoelectric converters DA1 and DB1. The light that has passed through a pupil 70 of a capture lens passes through the microlens ML1 and the color filter CF and enters the photoelectric converters DA1 and DB1. At this time, a light flux that has passed through a pupil region 72a that is a part of the pupil 70 of the capture lens enters the photoelectric converter DA1. Also, a light flux that has passed through a pupil region 72b that is another part of the pupil 70 of the capture lens enters the photoelectric converter DB1. When an object image acquired by the photoelectric converter DA1 is denoted as an image-A and an object image acquired by the photoelectric converter DB1 is denoted as an image-B, detection of the relative position of the image-A and the image-B enables detection of a focus displacement (defocus amount) of the object image. That is, this enables focus detection in a phase difference scheme. Further, a signal obtained by summing a signal based on charges generated by the photoelectric converter DA1 and a signal based on charges generated by the photoelectric converter DB1 can be utilized as an imaging signal.

Similarly, a common microlens ML2 is arranged in the light incident direction of the photoelectric converters DA2 and DB2, and pupil-divided lights enter the photoelectric converter DA2 and the photoelectric converter DB2, respectively. Such a configuration enables focus detection in a phase difference scheme using a signal based on charges generated by the photoelectric converter DA2 and a signal based on charges generated by the photoelectric converter DB2. Further, a signal obtained by summing a signal based on charges generated by the photoelectric converter DA2 and a signal based on charges generated by the photoelectric converter DB2 can be utilized as an imaging signal.

In an example, the photoelectric converter DA1 and the photoelectric converter DB1 are aligned in the row direction. Also, the photoelectric converter DA2 and the photoelectric converter DB2 are aligned in the row direction. The photoelectric converter DA1 and the photoelectric converter DB1 (microlens ML1) and the photoelectric converter DA2 and the photoelectric converter DB2 (microlens ML2) are aligned in the column direction.

Note that the photoelectric converter DA1 and the photoelectric converter DB1 may be aligned in the column direction, and the photoelectric converter DA2 and the photoelectric converter DB2 may be arranged in the column direction. Further, the photoelectric converter DA1 and the photoelectric converter DB1 (microlens ML1) and the photoelectric converter DA2 and the photoelectric converter DB2 (microlens ML2) are aligned in the row direction.

The photoelectric converters DA1 and DB1 and the photoelectric converters DA2 and DB2 output signals based on lights that have passed through the different microlenses ML1 and ML2 and are elements of different pixels. In other words, each of the unit pixels 12 includes a pupil division pixel including the photoelectric converters DA1 and DB1 and a pupil division pixel including the photoelectric converters DA2 and DB2. The pixel including the photoelectric converters DA1 and DB1 and the pixel including the photoelectric converters DA2 and DB2 share the FD node, the reset transistor M3, the amplifier transistor M4, and the select transistor M5. Further, it can be said that each of the unit pixel row includes two pixel rows, namely, a pixel row in which a plurality of pixels each including the photoelectric converters DA1 and DB1 are arranged, and a pixel row in which a plurality of pixels each including the photoelectric converters DA2 and DB2 are arranged. In this case, the number of pixel rows included in the pixel array of the pixel region 10 is 2 n. Out of the pixels belonging to a single unit pixel row, pixels including photoelectric converters DA1 and DB1 and pixels including photoelectric converters DA2 and DB2 arranged on the same column share the holding unit (FD node). In other words, a plurality of pixel rows form a plurality of unit pixel rows where the holding unit forms one unit.

In the following description, when it is not necessary to distinguish two pixels of the unit pixels 12 from each other, the photoelectric converters DA1 and DB1 or the photoelectric converters DA2 and DB2 may be denoted as photoelectric converters DA and DB. Further, the transfer transistors MA1 and MB1 or the transfer transistors MA2 and MB2 may be denoted as transfer transistors MA and MB.

FIG. 4 is a circuit diagram illustrating the configuration of a portion related to driving of the m-th row that is any row of the vertical scanning circuit 20. Note that one unit row in the illustration of FIG. 4 is not a unit pixel row but a pixel row.

As illustrated in FIG. 4, the vertical scanning circuit 20 includes a decoder unit 22 and a scanning circuit unit 24 provided for each pixel row of the pixel region 10. The scanning circuit unit 24 includes a logic generation unit 26 and a logic circuit that generates an output signal of the logic generation unit 26 and control signals of the unit pixels 12 in accordance with external signals.

The control circuit 60 supplies predetermined control signals to the decoder unit 22 and the scanning circuit unit 24. The decoder unit 22 selects a row address based on the control signal supplied from the control circuit 60. For example, a decoder signal DEC[m] is supplied from the decoder unit 22 to the scanning circuit unit 24 on the m-th row. In a plurality of control signals supplied from the control circuit 60 to the scanning circuit units 24 on all the rows, row select latch pulses used for selecting rows at regular intervals are supplied from the common signal line to the scanning circuit units 24 on respective rows.

The logic generation unit 26 outputs a row select signal to a signal line 111 in response to the decoder signal DEC[m] supplied from the decoder unit 22 and a row select latch pulse supplied from the control circuit 60. The scanning circuit unit 24 calculates an AND of this row select signal and an external PSEL signal to generate a control signal ϕSEL[m] supplied to the select signal line SEL.

Further, the logic generation unit 26 outputs a reset signal to a signal line 112 in response to the decoder signal DEC[m] and a row select latch pulse. The scanning circuit unit 24 calculates a NAND of this reset signal and an external PRESB signal to generate a control signal ϕRES [m] supplied to the reset signal line RES. At this time, the reset signal output to the signal line 112 rises to a high level at a timing of a row select latch pulse one cycle before a row select latch pulse which triggers a select signal output to the signal line 111. That is, the control signal ϕRES[m] is generated one row before the generation of the control signal ϕSEL[m]. This is to have the same reset state of FD nodes immediately before the readout on a plurality of pixel rows, when reading out the plurality of pixel rows sharing the FD nodes.

As an operation for achieving the above, reset operations are performed on all the pixels one horizontal period before the readout (hereafter, referred to as "preliminary select operation") in the readout operations of pixels sharing an FD node. Note that one horizontal period is a unit period in which a reset operation or a readout operation is performed, which is defined by the interval of the row select latch pulses.

Further, in the present configuration, an inverting pulse is illustrated as an example of the externally input external PRESB signal. In this case, in a period in which the external PRESB signal is at a high level, the control signal ϕRES [m] falls to a low level when a signal used for a preliminary select operation is input to the signal line 112 and when a row select signal is input to the signal line 111. This enables a preliminary select operation and a signal readout operation.

Further, the logic generation unit 26 outputs a signal used for a shutter operation to signal lines 113 and 114, respectively, in response to the decoder signal DEC[m] and a row select latch pulse. The scanning circuit unit 24 calculates an AND of the signal used for a shutter operation output to the signal line 113 and an external PTXA signal to generate a control signal ϕTXA[m]. Further, the scanning circuit unit 24 calculates an AND of the signal used for a shutter operation output to the signal line 114 and an external PTXB signal to generate a control signal ϕTXB[m].

Note that the external PSEL signal, the external PRESB signal, the external PTXA signal, and the external PTXB signal may be supplied from the control circuit 60.

Figure 5:
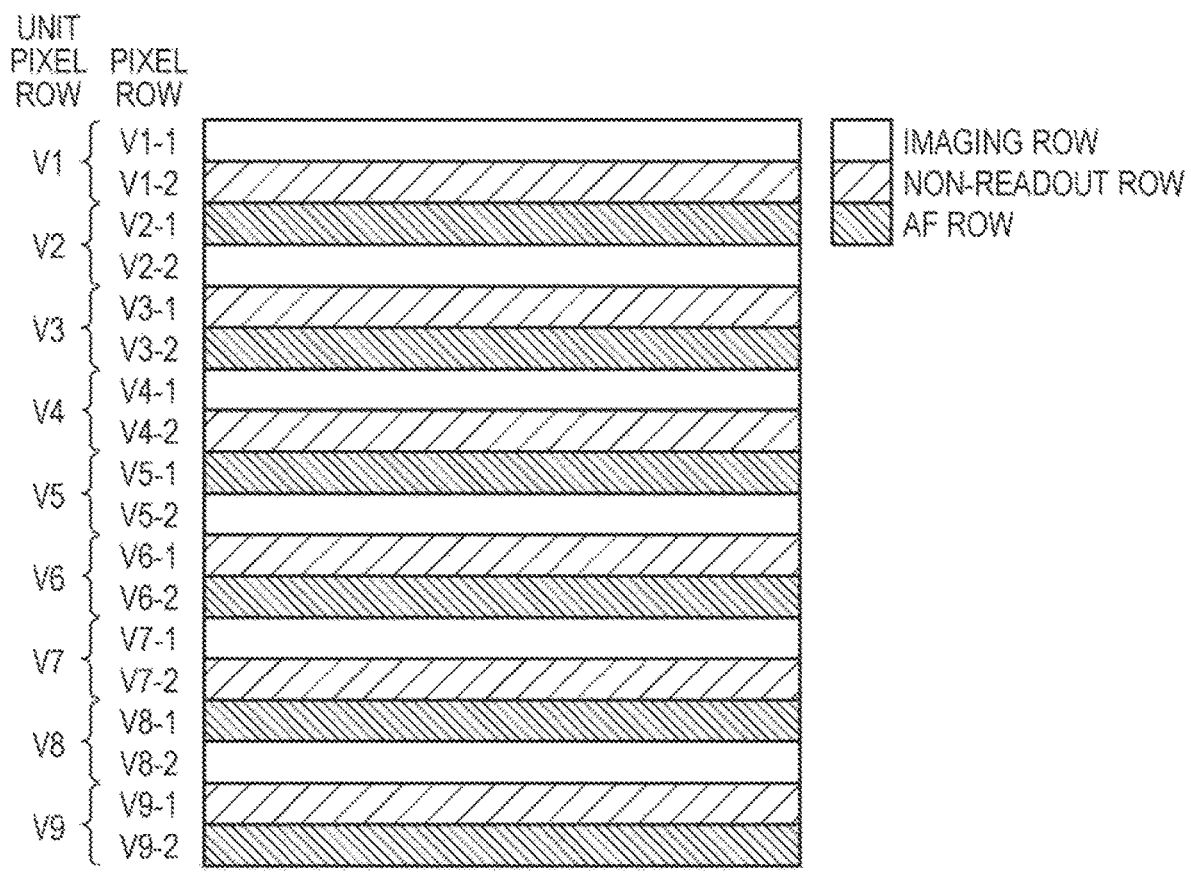
Figure 6:
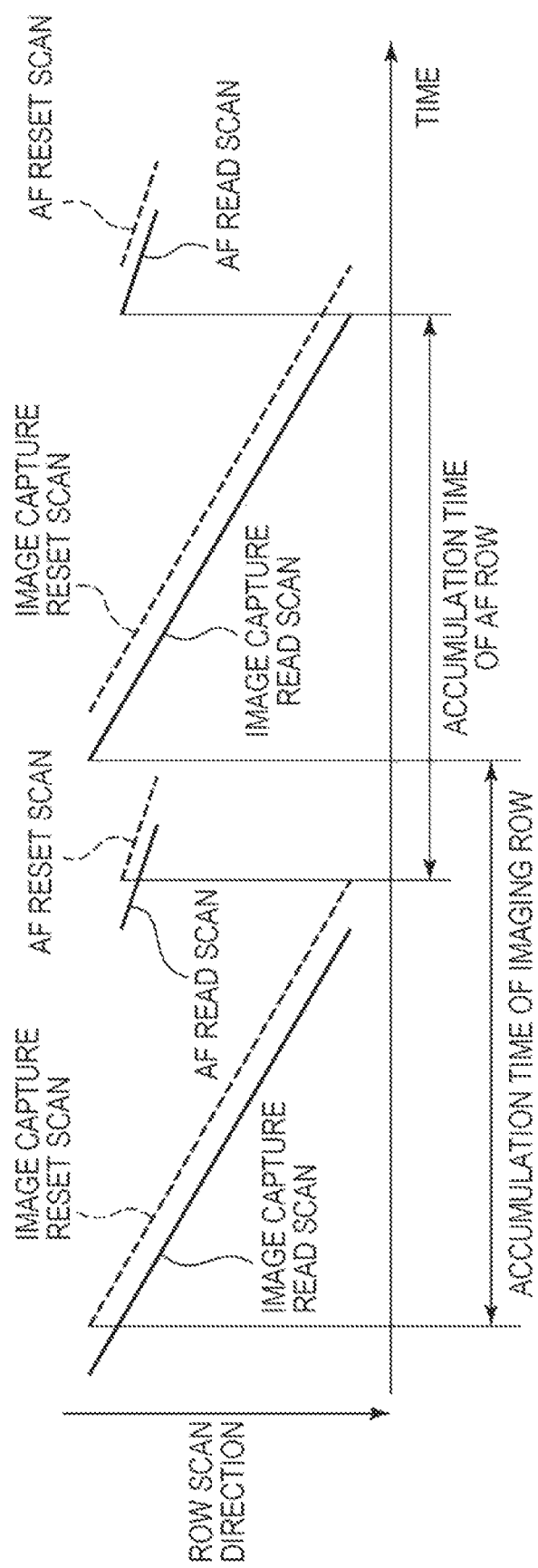
FIG. 6 and FIG. 7 are schematic diagrams illustrating the timing of an image capture scan and an AF scan.
Figure 7:
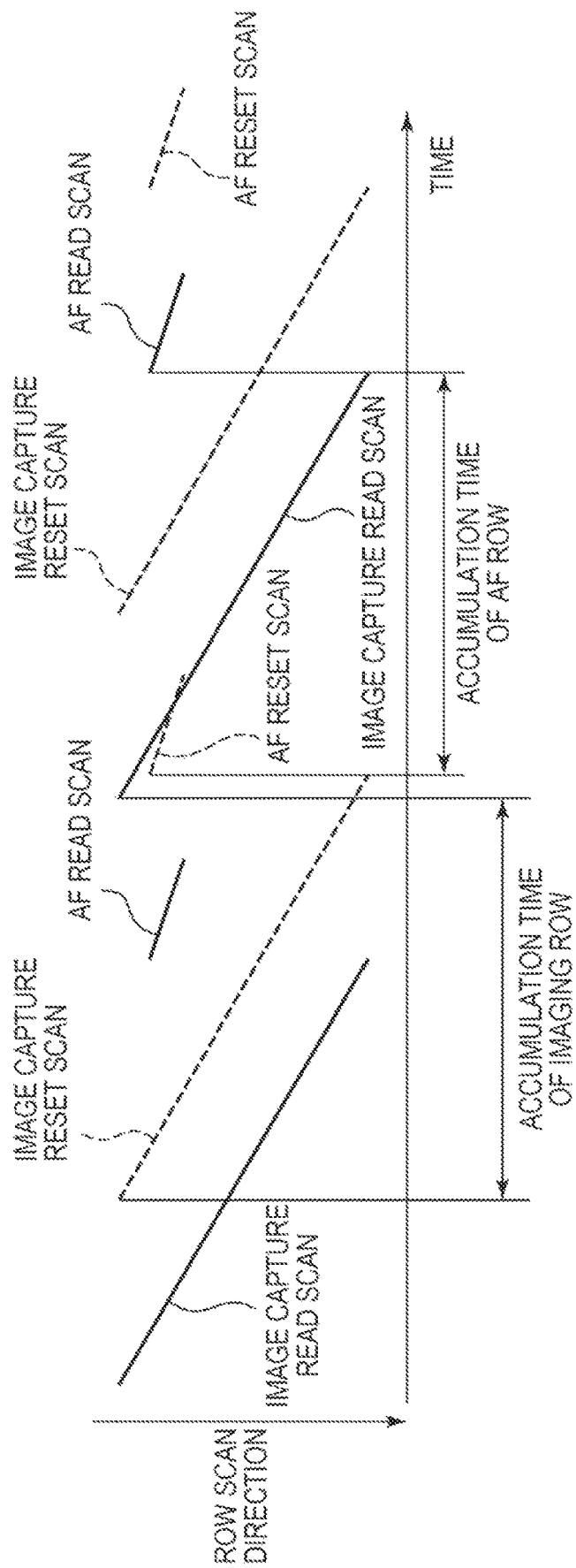
Figure 8A:
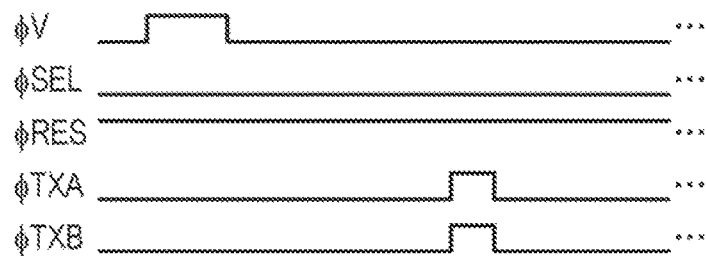
FIG. 8A, FIG. 8B and FIG. 8C are timing charts illustrating a reset operation, a readout operation of an imaging row, and a readout operation of an AF row.
Figure 8B:
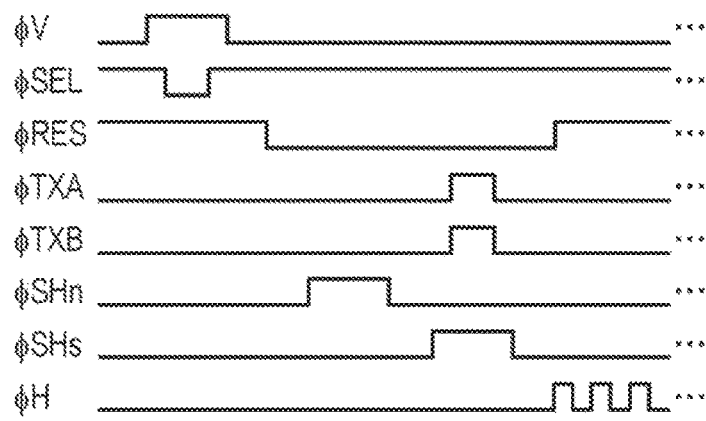
Figure 8C:
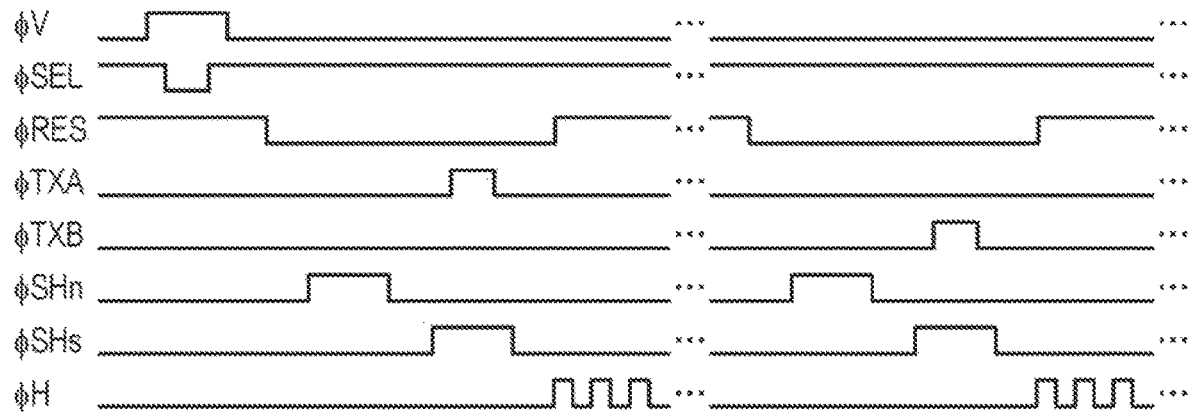
Figure 9:
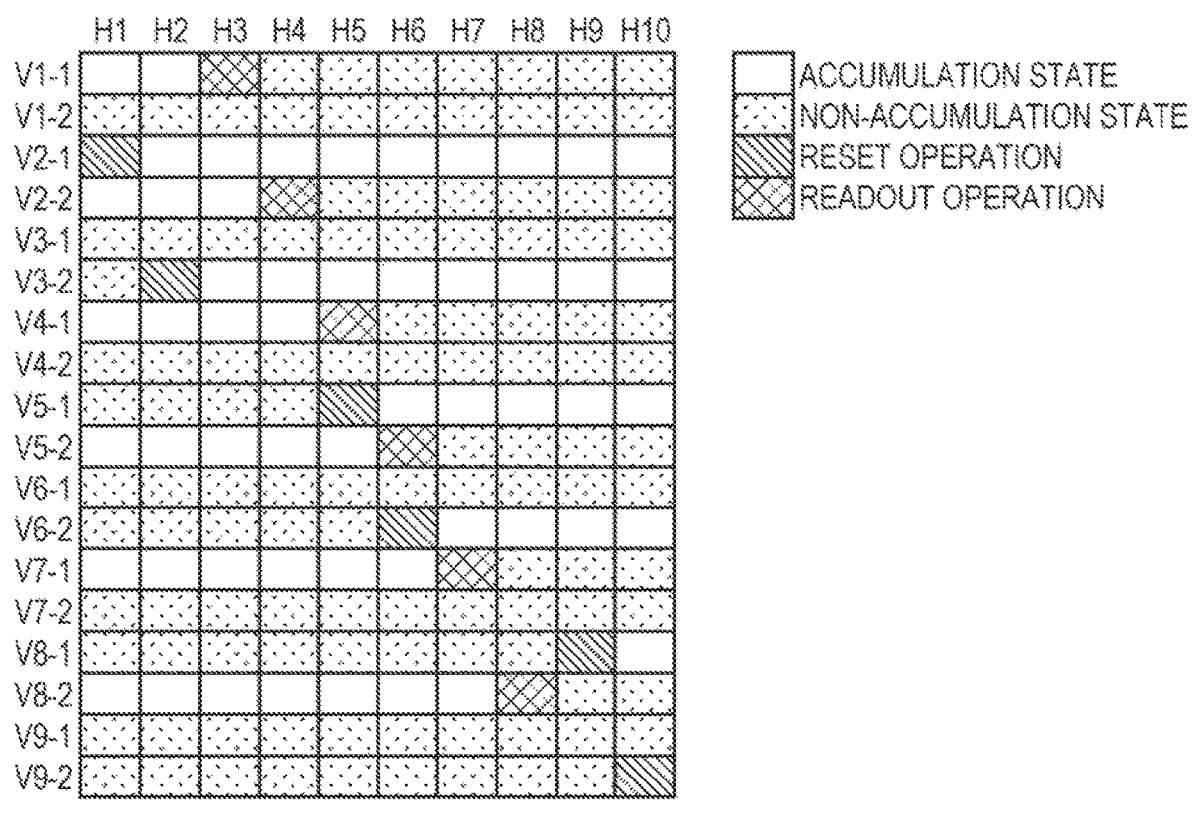
Figure 10:
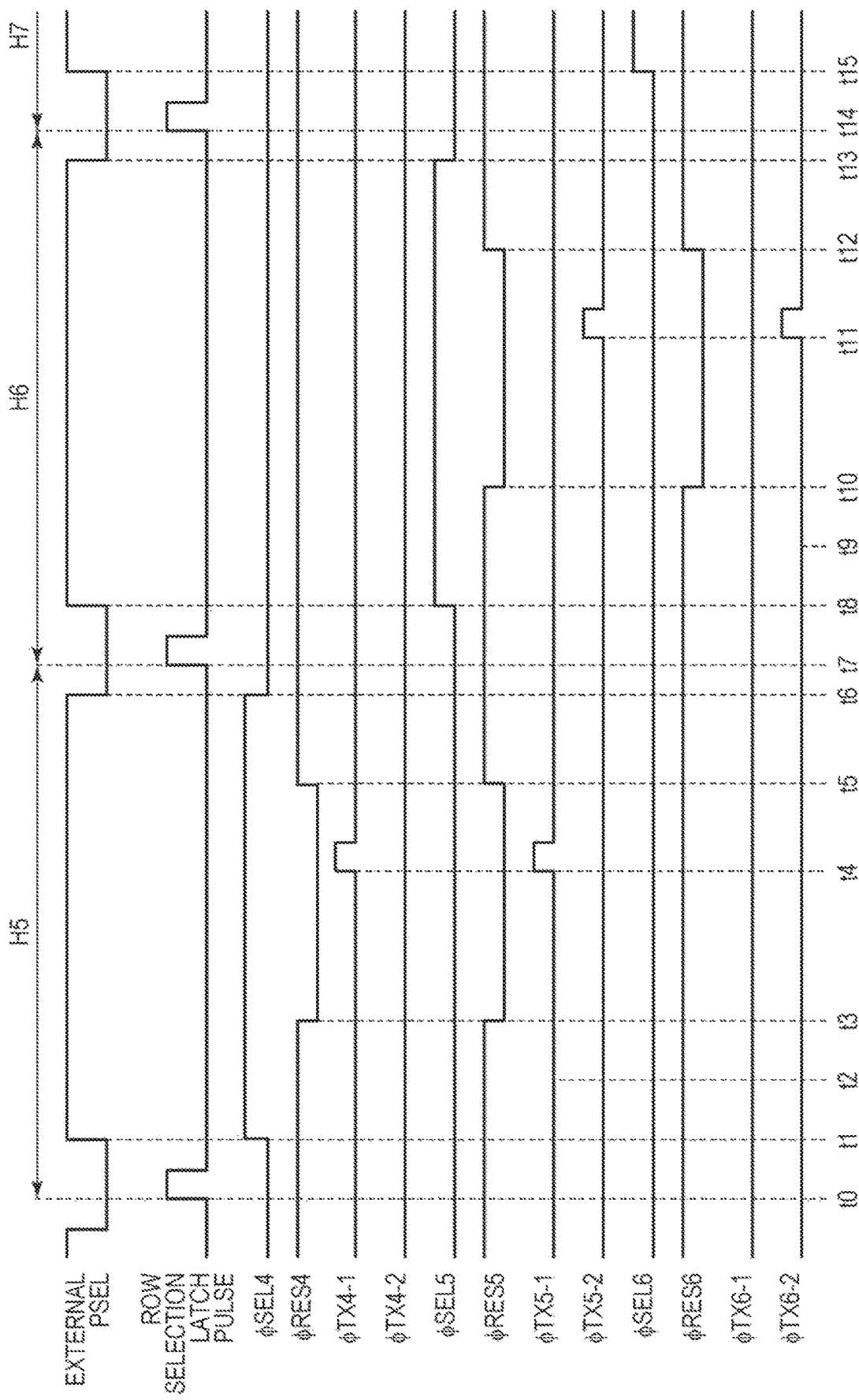
FIG. 10 is a timing chart illustrating a method of driving a solid-state imaging device according to a reference example.
Figure 11:
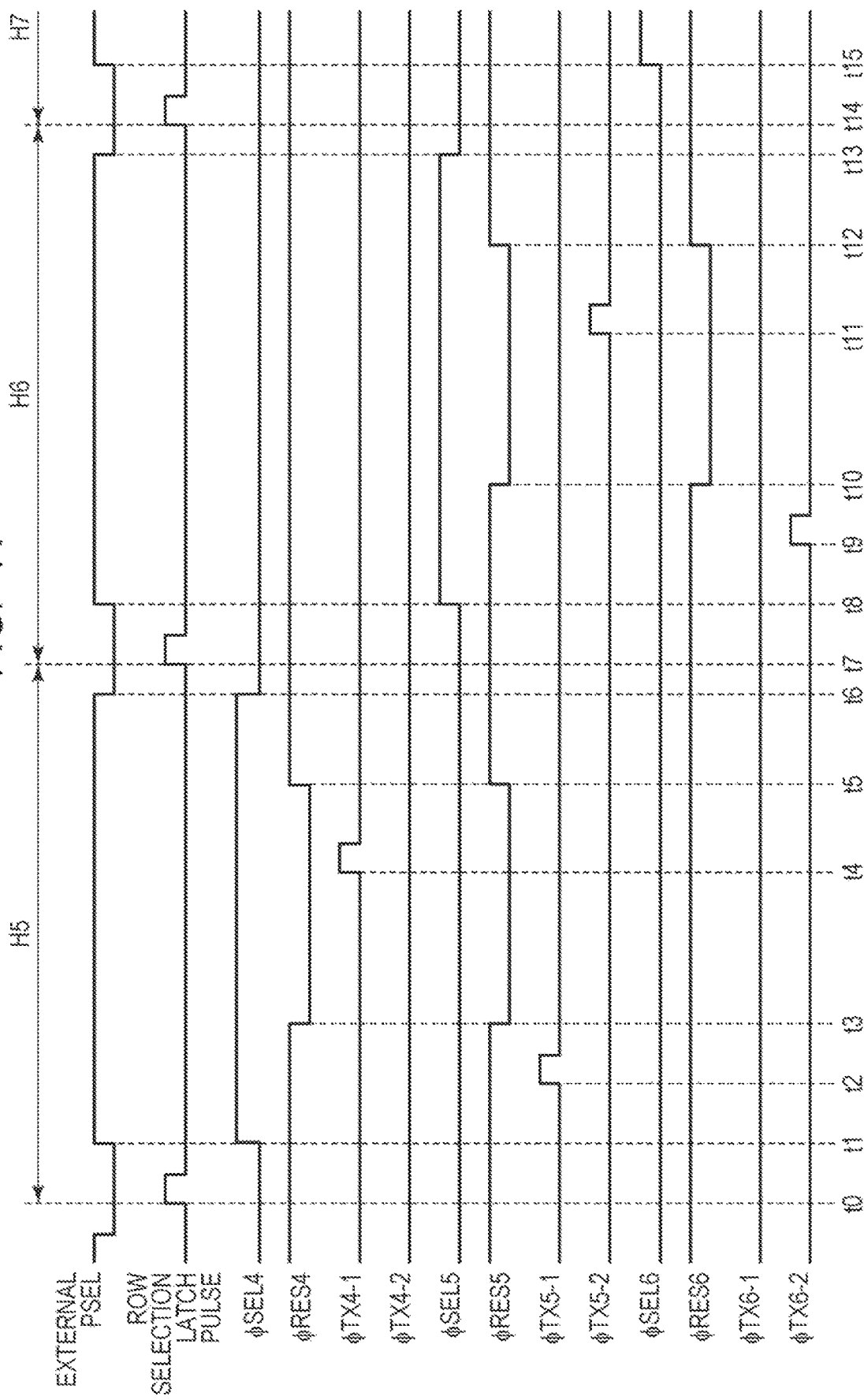
FIG. 11 is a timing chart illustrating a method of driving the solid-state imaging device according to the first embodiment.

Next, a method of driving the solid-state imaging device according to the present embodiment will be described by using FIG. 5 to FIG. 11. FIG. 5 and FIG. 9 are schematic diagrams illustrating the operation of each pixel row in a method of driving the solid-state imaging device according to the present embodiment. FIG. 6 and FIG. 7 are schematic diagrams illustrating the timing of an image capture scan and an AF scan. FIG. 8A to FIG. 8C are timing charts illustrating a reset operation, a readout operation of an imaging row, and a readout operation of an AF row. FIG. 10 is a timing chart illustrating a method of driving a solid-state imaging device according to a reference example. FIG. 11 is a timing chart illustrating a method of driving the solid-state imaging device according to the first embodiment.

FIG. 5 schematically illustrates the operation from the unit pixel row V1 to the unit pixel row V9 out of the unit pixel row V1 to the unit pixel row Vn forming the pixel region 10. Each of the unit pixel rows includes two pixel rows as described above. In this example, a branch number is provided to the reference of each unit pixel row to distinguish two pixel rows belonging thereto from each other. For example, two pixel rows included in the unit pixel row V1 are denoted as "V1-1" and "V1-2." The same applies to the unit pixel row V2 and subsequent unit pixel rows.

In the method of driving the solid-state imaging device according to the present embodiment, a predetermined operation is performed in a three-row cycle on a pixel row basis. That is, the pixel rows V1-1, V2-2, V4-1, V5-2, V7-1, and V8-2 are rows on which signals used for image capturing are acquired (hereafter, referred to as "imaging row"). The pixel rows V1-2, V3-1, V4-2, V6-1, V7-2, and V9-1 are rows on which no signal is read out (hereafter, referred to as "non-readout row"). The pixel rows V2-1, V3-2, V5-1, V6-2, V8-1, and V9-2 are focus detection rows on which signals used for focus detection are acquired (hereafter, referred to as "AF row"). The reduction ratio of pixel rows in each of an image capture scan and an AF scan is 1/3. Note that a reduction ratio of pixel rows is a ratio, to all the pixel rows, of pixel rows on which readout operations are performed. For example, when the reduction ratio of pixel rows is 1/3, this means that a readout operation is performed on one pixel row per three pixel rows.

FIG. 6 and FIG. 7 are schematic diagrams illustrating the timing of an image capture scan and an AF scan. In FIG. 6 and FIG. 7, the horizontal axis represents time, and the vertical axis represents the row scan direction.

An operation on each pixel row includes a reset operation (also referred to as "shutter operation") and a readout operation, respectively. The reset operation is an operation to reset charges of the photoelectric converters DA and DB. Charge accumulation is started in response to reset of the photoelectric converters DA and DB, and after a predetermined accumulation time elapses, the charge accumulation period ends in response to transfer of the charges of the photoelectric converters DA and DB to the FD node. The transfer of charges from the photoelectric converters DA and DB to the FD node corresponds to the readout operation. Such a series of operations are performed commonly on imaging rows and AF rows.

A reset operation and a readout operation on an imaging row and a reset operation and a readout operation on an AF row are performed sequentially on a row basis. The accumulation time is determined by the timing of a reset operation and a readout operation on each row. Such driving is a so-called rolling shutter driving.

In the present specification, a series of operations in which reset operations of imaging rows are performed sequentially on a row basis is referred to as "image capture reset scan." Further, a series of operations in which readout operations of imaging rows are performed sequentially on a row basis is referred to as "image capture read scan." Further, an image capture reset scan and an image capture read scan are referred to collectively as "image capture scan." Similarly, a series of operations in which reset operations of AF rows are performed sequentially on a row basis is referred to as "AF reset scan." Further, a series of operations in which readout operations of AF rows are performed sequentially on a row basis is referred to as "AF read scan." Further, an AF reset scan and an AF read scan are referred to collectively as "focus detection scan (AF scan)."

FIG. 8A to FIG. 8C are timing charts illustrating a basic operation on one pixel row. FIG. 8A illustrates the reset operation on an imaging row and an AF row, FIG. 8B illustrates the readout operation on an imaging row, and FIG. 8C illustrates the readout operation on an AF row.

In the reset operation, as illustrated in FIG. 8A, in a state where the control signal φSEL is at a low level and the control signal φRES is at a high level, the control signals φTXA and φTXB are set to a high level at a predetermined timing in response to a vertical scanning signal φV. Thereby, the transfer transistors MA and MB are turned on, and the photoelectric converters DA and DB are reset to a predetermined potential in accordance with the power source voltage VDD.

In the readout operation on an imaging row, as illustrated in FIG. 8B, the control signal φSEL is set to a high level at a predetermined timing in accordance with the vertical scanning signal φV to turn on the select transistor M5. At this time, the control signal φRES is at a high level, and the FD node has been reset. After the control signal φRES is set to a low level and a control signal φSHn is set to a high level, a reset signal output to the vertical output line 16 via the select transistor M5 is held in a sample-hold capacitor used for an N-signal. The control signal φSHn is a control signal for a switch that controls connection and disconnection of the sample-hold capacitor used for the N-signal. Subsequently, the control signals φTXA and φTXB are set to a high level at the same time to transfer signal charges accumulated in the photoelectric converters DA and DB to the FD node. At this time, a control signal φSHs is set to a high level, and thereby an optical signal output to the vertical output line 16 via the select transistor M5 is held in the sample-hold capacitor used for an S-signal. The control signal φSHs is a control signal for a switch that controls connection and disconnection of a sample-hold capacitor used for the S-signal. Subsequently, horizontal transfer signals φH are turned on sequentially on a column basis to transfer the S-signal and the N-signal held in the sample-hold capacitor to the output circuit 50. By calculating and outputting the difference between the S-signal and the N-signal in the output circuit 50, a pixel signal with a high S/N ratio can be acquired.

In the readout operation on the AF row, as illustrated in FIG. 8C, an operation of setting only the control signal φTXA to a high level and an operation of setting only the control signal φTXB to a high level are separately performed in the same manner as the readout operation on an imaging row. Thereby, an image-A signal based on only the signal charges accumulated in the photoelectric converter DA and an image-B signal based on only the signal charges accumulated in the photoelectric converter DB can be acquired separately as the focus detection signal.

As described above, the control signal φSEL is at a low level in the reset operation, and no pixel signal is output to the vertical output line 16. Therefore, a reset operation and a readout operation can be performed at the same timing.

In the drive method of the present embodiment, an image capture scan and an AF scan are performed independently. In FIG. 6 and FIG. 7, the period from the timing of a reset operation to the timing of a readout operation of an imaging row is a charge accumulation time on the imaging row. Similarly, the period from the timing of a reset operation to the timing of a readout operation of an AF row is a charge accumulation time on the AF row. Note that, while FIG. 6 and FIG. 7 illustrate an example in which readout of an AF row is performed after readout of an imaging row is performed, readout of an imaging row may be performed after readout of an AF row is performed.

As illustrated in FIG. 8B and FIG. 8C, the time required for a readout operation of an AF row is longer than the time required for a readout operation of an imaging row. Typically, while one horizontal period is required for a readout operation of an imaging row, two horizontal periods are required for a readout operation of an AF row. Thus, when an image capture scan and an AF scan are performed in the same pixel row cycle as illustrated in FIG. 5, for example, the slope of the lines indicating an AF reset scan and an AF read scan is smaller than the slope of the lines indicating an image capture reset scan and an image capture read scan, as illustrated in FIG. 6 and FIG. 7.

Therefore, for example, when the accumulation time of the imaging row and the AF row is shorter than the case of FIG. 6, the line indicating an image capture read scan and the line indicating an AF reset scan may intersect each other as illustrated in FIG. 7. That is, the timing of a readout operation of an imaging row and the timing of a reset operation of an AF row may match each other on the neighboring pixel rows. Note that the accumulation time of an imaging row and an AF row is controlled by fixing the timing of a readout operation and adjusting the timing of a reset operation, for example.

Since the slopes of the line indicating an image capture read scan and the slope of the line indicating an AF reset scan are changed by the reduction ratio of imaging rows and the reduction ratio of AF rows or the like, the cause by which these lines intersect each other is not limited to the setting condition of the accumulation time.

FIG. 9 is a schematic diagram more specifically illustrating a state where a line indicating an image capture read scan and a line indicating an AF reset scan intersect each other. In FIG. 9, the vertical direction represents the same pixel rows V1-1 to V9-2 as those of FIG. 5. The repetition cycle of the imaging row, the non-readout row, and the AF row is also the same as that of FIG. 5. In FIG. 9, the horizontal direction is a time axis and defines a period H1, a period H2, . . . , and a period H10, where the interval of a control signal used for selecting a row to be scanned, that is, the row select latch pulses (one horizontal period) is a reference unit.

For example, for pixels on the pixel row V1-1 that is an imaging row, the periods H1 and H2 correspond to a period of accumulating signal charges (accumulation state), the period H3 corresponds to a period of performing a readout operation of an imaging signal, and the periods H4 to H10 correspond to a period of not accumulating charges to be signal charges (non-accumulation state). Further, for pixels on the pixel row V2-1 that is an AF row, the period H1 corresponds to a period of performing a reset operation of resetting the photoelectric converters DA and DB, and the period H2 to the period H10 correspond to an accumulation state. In the present specification, a horizontal period in which a reset operation is performed may be denoted as "reset period," and a horizontal period in which a readout operation is performed may be denoted as "readout period." Note that, for a non-readout row, all the periods correspond to a non-accumulation state.

Now, in focusing on the period H5, a readout operation is performed on the pixel row V4-1 that is an imaging row, and a reset operation is performed on the pixel row 5-1 that is an AF row. Further, in focusing on the period H6, a readout operation is performed on the pixel row V5-2 that is an imaging row, and a reset operation is performed on the pixel row 6-2 that is an AF row. That is, in the same period, a readout operation on an imaging row and a reset operation on an AF row are performed in parallel.

FIG. 10 is an example of a timing chart illustrating the operation in the period H5 and the period H6 on the pixel rows V4-1, V4-2, V5-1, V5-2, V6-1, and V6-2.

In FIG. 10, control signals that drive the select transistors M5 on the unit pixel rows V4, V5, and V6 are denoted as φSEL4, φSEL5, and φSEL6, respectively. Further, control signals that drive the reset transistors M3 on the unit pixel rows V4, V5, and V6 are denoted as φRES4, φRES5, and φRES6, respectively. Further, control signals that drive the transfer transistors MA1 and MB1 on the pixel rows V4-1, V5-1, and V6-1 are denoted as φTX4-1, φTX5-1, and φTX6-1, respectively. Further, control signals that drive the transfer transistors MA2 and MB2 on the pixel rows V4-2, V5-2, and V6-2 are denoted as φTX4-2, φTX5-2, and φTX6-2, respectively. Note that, while operated at different timings as illustrated in FIG. 8C in a readout operation on the AF row, the transfer transistors MA and MB on each pixel row are operated at the same timing in the operation in a range illustrated in FIG. 10 and thus are represented as a single signal in FIG. 10.

The row select latch pulses are supplied from the control circuit 60 to the vertical scanning circuit 20 as described using FIG. 4. Then, inside the vertical scanning circuit 20, an AND of a row select latch pulse and the external PSEL signal externally supplied form the sensor is calculated to perform select of each row. Thus, periods between row select latch pulses are defined as the period H5, the period H6, and the period H7, respectively, based on a rising edge of the row select latch pulse as a reference. That is, in FIG. 10, the period from the time t0 to the time t7 is the period H5, the period from the time t7 to the time t15 is the period H6, and the period on and after the time t15 is the period H7.

At the time t0, the control signals φRES4, φRES5, and φRES6 are at a high level, and the FD nodes on the unit pixel rows V4, V5, and V6 are in a reset state.

At the time t1, the control signal φSEL4 is controlled to a high level by the vertical scanning circuit 20 and thereby the select transistors M5 on the unit pixel rows V4 are turned on leading to a state where readout of signals from the unit pixels 12 on the unit pixel row V4 to the vertical output lines 16 is ready. That is, the unit pixel row V4 is selected.

At the time t3, the control signal φRES4 is controlled to a low level by the vertical scanning circuit 20, and thereby the reset of the FD nodes on the unit pixel rows V4 is released. Pixel signals based on the voltages of the FD nodes after the release of reset are output via the vertical output lines 16 as reset signals (N-signal).

At the time t4, the control signal φTX4-1 is controlled to a high level by the vertical scanning circuit 20, and signal charges accumulated in the photoelectric converters DA1 and DB1 on the pixel row V4-1 are transferred to the FD nodes on the unit pixel row V4. Pixel signals based on the voltages of the FD nodes after signal charges are transferred are output via the vertical output lines 16 as optical signals (S-signal). Note that, since the pixel row V4-2 is a non-readout row, the control signal φTX4-2 is maintained at a low level.

Similarly, at the time t4, the control signal φTX5-1 is controlled to a high level by the vertical scanning circuit 20, and the photoelectric converters DA1 and DB1 on the pixel row V5-1 are reset. That is, the reset operation of pixel row V5-1 is performed.

At the time t5, the control signal φRES4 is controlled to a high level by the vertical scanning circuit 20, and thereby the potentials of the FD nodes on the unit pixel row V4 are reset.

At the time t6, the control signal φSEL4 is controlled to a low level by the vertical scanning circuit 20, thereby the select transistors M5 on the unit pixel row V4 are turned off, and the unit pixels 12 on the unit pixel row V4 are disconnected from the vertical output lines 16. That is, the selection of the unit pixel row V4 is released.

In the period H6 starting from the time t7, first, at the time t8, the control signal φSEL5 is controlled to a high level by the vertical scanning circuit 20. Thereby, the select transistors M5 on the unit pixel row V5 are turned on leading to a state where readout of signals from the unit pixels 12 on the unit pixel row V5 to the vertical output lines 16 is ready. That is, the unit pixel row V5 is selected.

At the time t10, the control signal φRES5 is controlled to a low level by the vertical scanning circuit 20, and thereby the reset of the FD nodes on the unit pixel rows V5 is released. Pixel signals based on the voltages of the FD nodes after the release of reset are output via the vertical output lines 16 as reset signals (N-signal).

At the time t11, the control signal φTX5-2 is controlled to a high level by the vertical scanning circuit 20, and signal charges accumulated in the photoelectric converters DA2 and DB2 on the pixel row V5-2 are transferred to the FD nodes on the unit pixel row V5. Pixel signals based on the voltages of the FD nodes after signal charges are transferred are output via the vertical output lines 16 as optical signals (S-signal). Note that, since the pixel row V5-1 is a non-readout row, the control signal φTX5-1 is maintained at a low level.

Similarly, at the time t11, the control signal φTX6-2 is controlled to a high level by the vertical scanning circuit 20, and the photoelectric converters DA2 and DB2 on the pixel row V6-2 are reset. That is, the reset operation of pixel row V6-2 is performed.

At the time t12, the control signal φRES5 is controlled to a high level by the vertical scanning circuit 20, and thereby the readout of the pixel row V5-2 ends.

At the time t13, the control signal φSEL5 is controlled to a low level by the vertical scanning circuit 20, thereby the select transistors M5 on the unit pixel row V5 are turned off, and the unit pixels 12 on the unit pixel row V5 are disconnected from the vertical output lines 16. That is, the selection of the unit pixel row V5 is released.

Now, in focusing on the reset operation of the pixel row V5-1, in the period from the time t3 to the time t5 of the period H5 that is a period for performing the reset operation, the control signal φRES5 is at a low level. This is due to a preliminary select operation described above performed prior to the readout operation of the pixel row V5-2 in the period H6. Thus, in a period from the time t3 to the time t5, the FD nodes of the unit pixels 12 belonging to the unit pixel row V5 are in a floating state. When the transfer transistors MA1 and MB1 are operated by the control signal φTX5-1 in order to reset the photoelectric converters DA1 and DB1 in this state, the potential of the FD node that couples by capacitance to the gates of the transfer transistors MA1 and MB1 significantly changes.

When the potential of the FD node changes, the change may be transmitted to the FD node of the neighboring unit pixel 12 and lead to a change in the potential thereof. In particular, when the neighboring unit pixel row is in a readout operation, a change in the potential of the FD node is superimposed as noise on a pixel signal, which causes deterioration of the image quality. In the example of driving in FIG. 10, the pixel row V4-1 of the unit pixel row V4 neighboring the unit pixel row V5 is in a readout operation, there is a concern that noise could superimpose on pixel signals output from pixels belonging to the pixel row V4-1. The influence of a change in the potential of the FD node will be particularly significant when the timing of the drive pulse of the transfer transistors MA and MB on a readout row and the timing of the drive pulse of the transfer transistors MA and MB on a reset row overlapping with each other.

Similarly, in focusing on the period H6, since the pixel row V6-2 is a period of performing a reset operation, the pixel row V5-2 is a period of performing a readout operation of an imaging row. Thus, there is a concern that a change in the potential of the FD node due to the reset operation of the pixel row V6-2 could affect pixel signals output from pixels belonging to the pixel row V5-2.

In such a point of view, in the present embodiment, when a readout operation on an imaging row and a reset operation on an AF row are performed in the same horizontal period, the solid-state imaging device is driven in accordance with the timing chart illustrated in FIG. 11, for example.

The timing chart illustrated in FIG. 11 is different from the timing charge illustrated in FIG. 10 in the drive timing of the transfer transistors MA and MB at the reset operation. That is, in FIG. 11, the timing of the reset operation of the AF row is shifted such that the timing of the reset operation of the AF row does not overlap with a charge transfer period in which charges are transferred from the photoelectric converters DA and DB to the FD node in unit pixels belonging to an imaging row neighboring the AF row. In the present embodiment, during a reset period in which the reset operation of the AF row is performed, the timing of the reset operation is shifted.

Specifically, while the timing of setting the control signal φTX5-1 of the transfer transistors MA1 and MB1 on the pixel row V5-1 to a high level is between the time t4 and the time t5 in FIG. 10, the timing is between the time t1 and the time t3 in FIG. 11. While the control signal φRES5 is at a low level and the FD node is in a floating state during the period from the time t3 to the time t5, the control signal φRES5 is at a high level and the FD node is fixed to the potential in accordance with the power source voltage VDD during the period from the time t1 to the time t3. Therefore, when the transfer transistors MA1 and MB1 are driven at the time t2 between the time t1 and the time t3, a change in the potential of the FD node can be suppressed. This can reduce noise superimposing on pixel signals output from pixels belonging to the pixel row V4-1 during the readout operation in the period H5 and therefore improve the image quality.

Similarly, with the timing of driving the transfer transistors MA2 and MB2 on the pixel row V6-2 being set between the time t8 and the time t10 in the period H6, this can reduce noise superimposing on pixel signals output from pixels belonging to the pixel row V5-2 and therefore improve the image quality.

In a similar manner, the timing of the reset operation of an AF row may be shifted in the AF row in which the timing of the reset operation of the AF row does not overlap with the charge transfer period in which charges are transferred to the FD node from the photoelectric converters DA and DB in unit pixels belonging to an imaging row neighboring the AF row.

Note that, while the solid-state imaging device that includes the vertical scanning circuit 20 having a function of a preliminary select operation has been described as an example in the present embodiment, the object due to performing a readout operation and a reset operation on neighboring unit pixel rows in the same period may arise in a case where no preliminary select operation is performed. Also in this case, in a similar manner to the present embodiment, by differing the timing of the drive pulse for the transfer transistors MA and MB on a readout row from the timing of the drive pulse for the transfer transistors MA and MB on a reset row, the influence of a change in the potential of the FD node can be suppressed.

Figure 12:
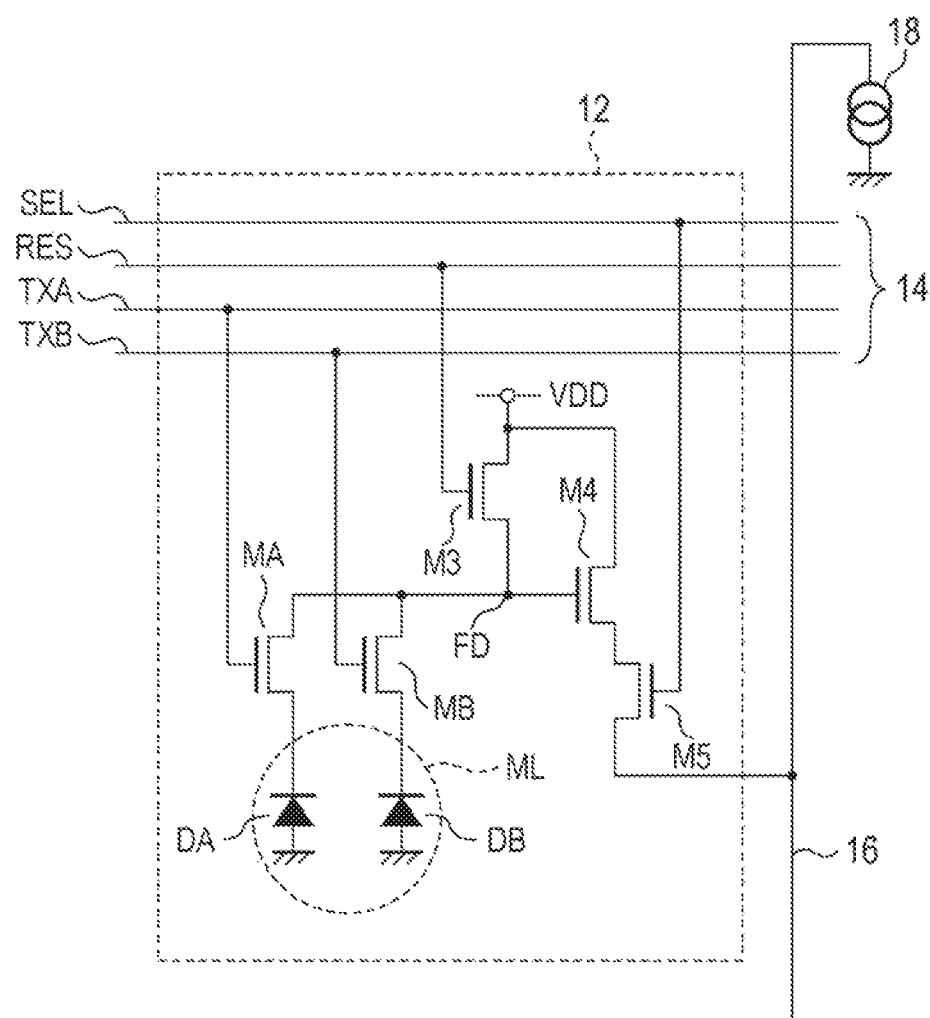
FIG. 12 is a circuit diagram illustrating a configuration example of a unit pixel of the solid-state imaging device according to a modified example of the first embodiment.

Further, for example, as illustrated in FIG. 12, the same as the case where no preliminary select operation is performed applies to the case where the unit pixel 12 is formed of a single pixel including only a pair of the photoelectric converters DA and DB corresponding to a single micro lens ML, that is, the unit pixel row is formed of a single pixel row. In a similar manner to the present embodiment, by differing the timing of the drive pulse for the transfer transistors MA and MB on a readout row from the timing of the drive pulse for the transfer transistors MA and MB on a reset row, the influence of a change in the potential of the FD node can be suppressed.

As discussed above, according to the present embodiment, it is possible to suppress noise due to the operation on a focus detection row from superimposing on an imaging signal read out from an imaging row and improve the image quality.

Second Embodiment

A solid-state imaging device and a method of driving the same according to a second embodiment of the present invention will be described with reference to FIG. 13 to FIG. 16. The same component as that of the solid-state imaging device according to the first embodiment is labeled with the same reference, and the description thereof will be omitted or simplified.

Figure 13:
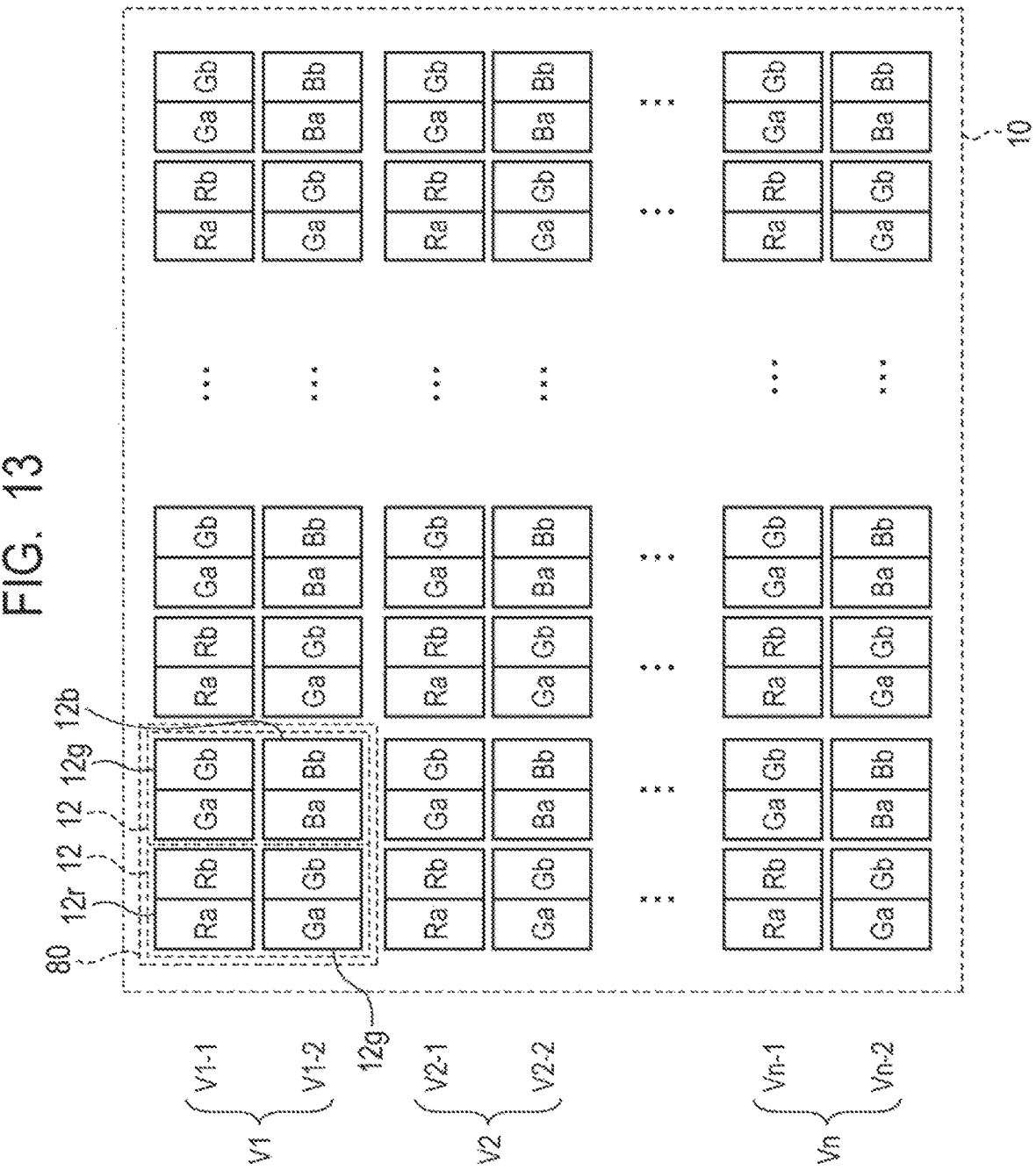
FIG. 13 is a schematic diagram illustrating an arrangement example of color filters in a solid-state imaging device according to a second embodiment.
Figure 14:
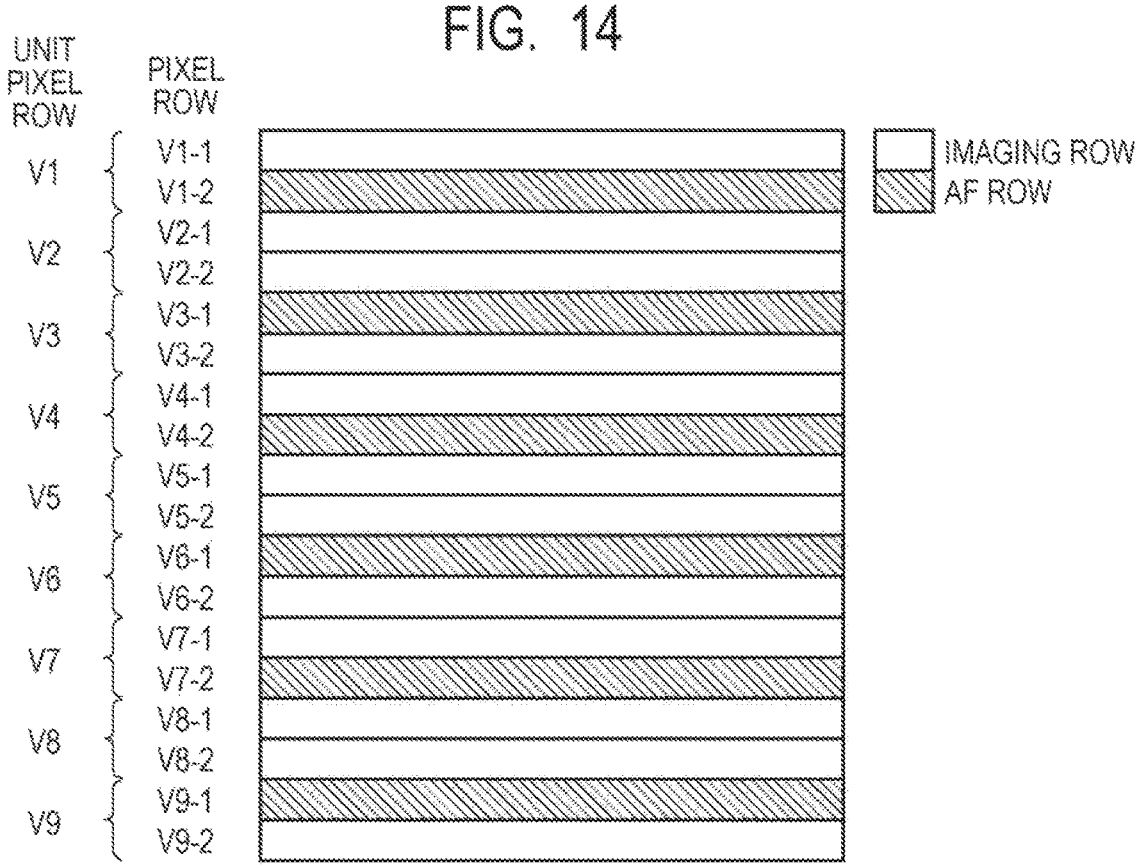
FIG. 14 and FIG. 15 are schematic diagrams illustrating the operation of respective pixel rows in a method of driving the solid-state imaging device according to the second embodiment.
Figure 15:
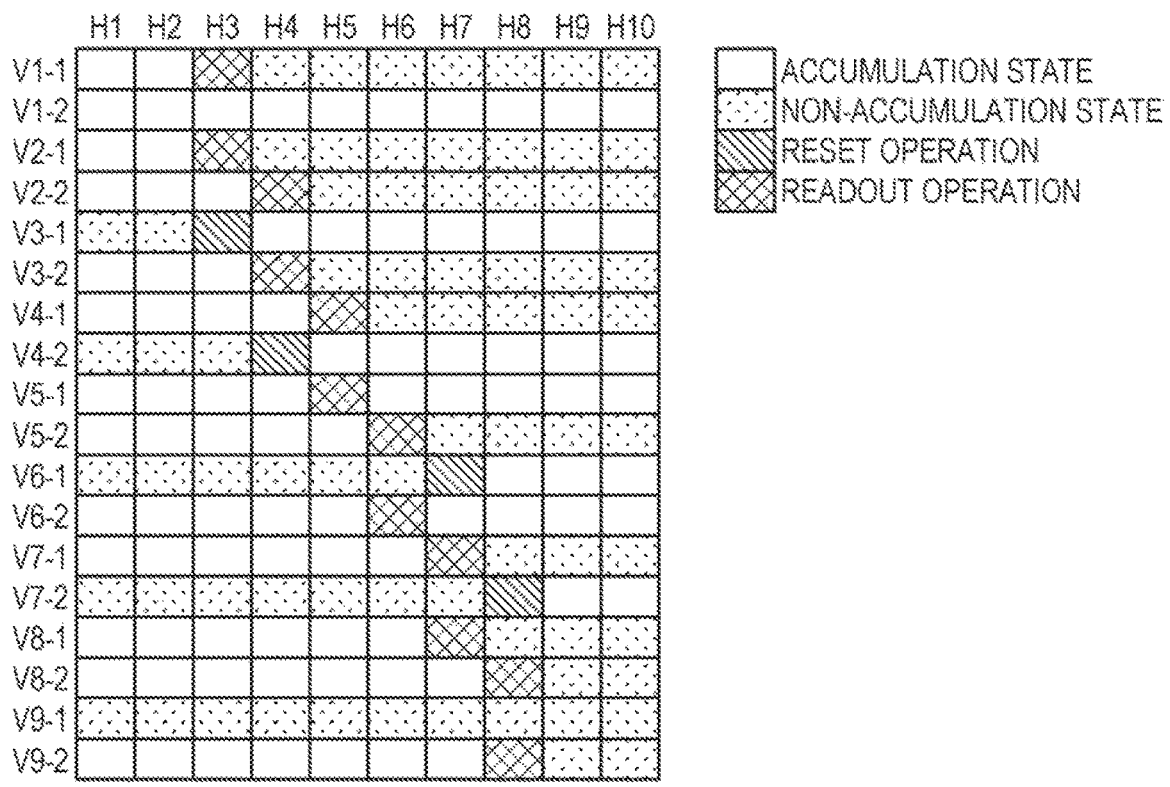
Figure 16:
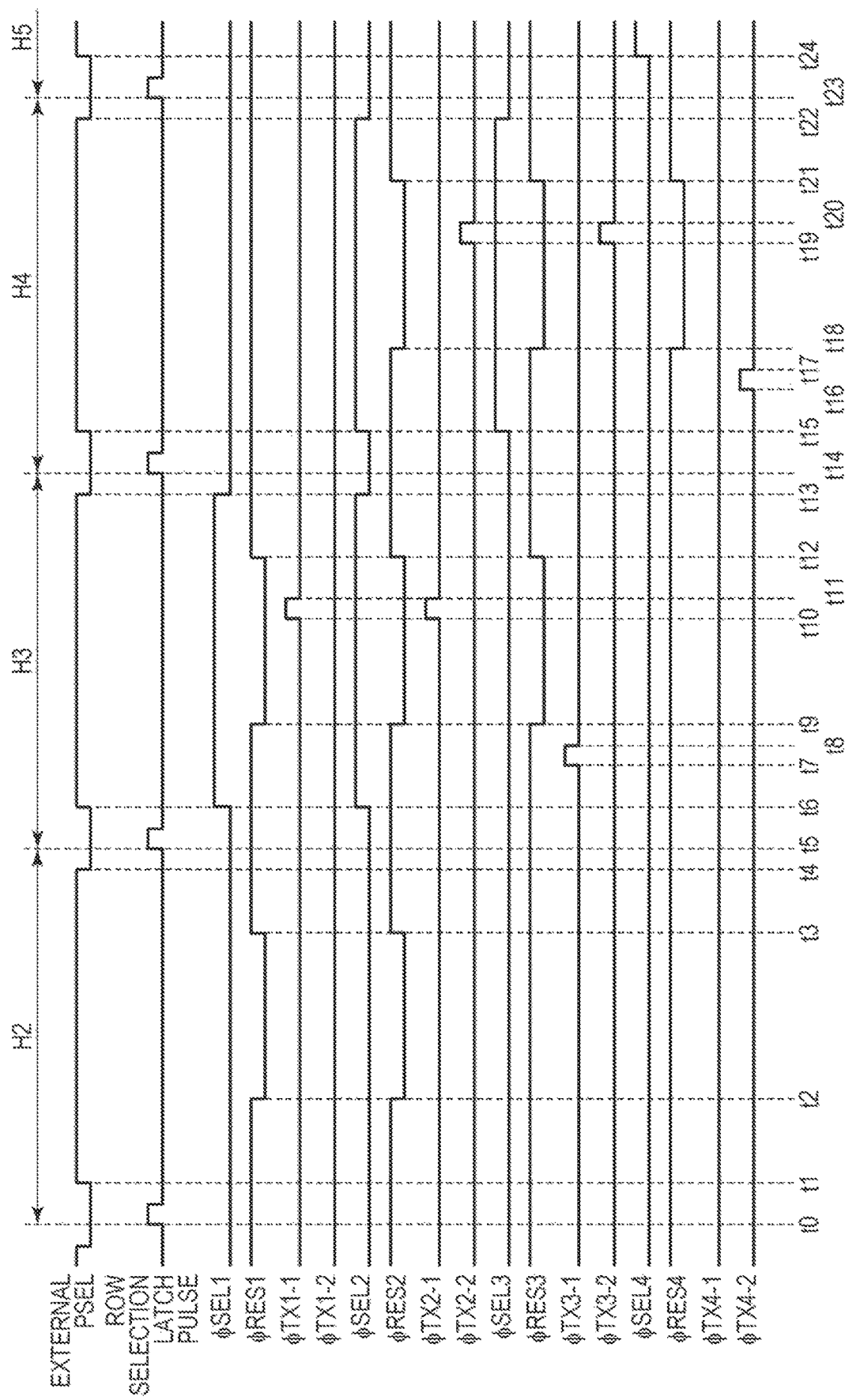
FIG. 16 is a timing chart illustrating a method of driving the solid-state imaging device according to the second embodiment.

FIG. 13 is a schematic diagram illustrating an arrangement example of color filters in the solid-state imaging device according to the present embodiment. FIG. 14 and FIG. 15 are schematic diagrams illustrating the operation of respective pixel rows in the method of driving the solid-state imaging device according to the present embodiment. FIG. 16 is a timing chart illustrating the method of driving the solid-state imaging device according to the present embodiment.

In the present embodiment, an example in which the present invention is applied to a solid-state imaging device having color filters of three colors of red (R), green (G), and blue (B) will be described.

FIG. 13 is a diagram illustrating an arrangement example of color filters arranged on respective pixels of the pixel region 10. While an example using a Bayer arrangement that is a typical arrangement pattern of color filters is illustrated in this example, the arrangement pattern of color filters is not limited in particular.

A unit block 80 forming a unit of repetition in the Bayer arrangement comprises four pixels of two rows by two columns as illustrated in FIG. 13. Out of the four pixels within a unit block, a pixel 12r having a red (R) color filter and a pixel 12b having a blue (B) color filter are aligned in one diagonal direction, and pixels 12g each having a green (G) color filter are aligned in the other diagonal direction, respectively.

Each of the pixels 12r, 12g, and 12b is a pupil division pixel including the photoelectric converters DA and DB sharing a single micro-lens ML. In FIG. 13, for illustrating that the pixels 12r, 12g, and 12b represent pupil division pixels, references of the colors (R, G, B) of color filters provided with indexes "a" and "b", namely, Ra, Rb, Ga, Gb, Ba, and Bb are written in respective blocks of the pixels 12r, 12g, and 12b.

When the unit pixel 12 has the circuit of FIG. 2, the unit pixel row is formed of a pixel row including the pixel 12r and the pixel 12g and a pixel row including the pixel 12g and the pixel 12b. For example, the unit pixel row V1 may be formed of a pixel row V1-1 including the pixel 12r and the pixel 12g and the pixel row V1-2 including the pixel 12g and the pixel 12b. The same applies to the unit pixel row V2 and subsequent unit pixel rows. A single unit block 80 thus includes the unit pixel 12 including the pixel 12r and the pixel 12g aligned in the column direction and the unit pixel 12 including the pixel 12g and the pixel 12b aligned in the column direction.

FIG. 14 schematically illustrates the operation from the unit pixel row V1 to the unit pixel row V9 out of the unit pixel row V1 to the unit pixel row Vn forming the pixel region 10. Each of the pixel unit rows includes two pixel rows as described above.

In the method of driving the solid-state imaging device according to the present embodiment, a predetermined operation is performed in a three-row cycle in a unit of pixel row. That is, the pixel rows V1-1, V2-2, V4-1, V5-2, V7-1, and V8-2 are first imaging rows. The pixel rows V1-2, V3-1, V4-2, V6-1, V7-2, and V9-1 are AF rows. The pixel rows V2-1, V3-2, V5-1, V6-2, V8-1, and V9-2 are second imaging rows on which signals are read out from pixels having the same color set of color filters as that of the first imaging row. That is, the reduction ratio of the pixel rows in an image capture scan is 2/3, and the reduction ratio of the pixel rows in an AF scan is 1/3.

For example, on the pixel row V1-1 and the pixel row V2-1, readout of signals from respective pixels 12r and readout of signals from respective pixels 12g are performed. Further, on the pixel row V2-2 and the pixel row V3-2, readout of signals from respective pixels 12g and readout of signals from respective pixels 12b are performed. In the present embodiment, readout operations of the first imaging row and the second imaging row included in one cycle are performed at the same time. That is, signals of pixels on two pixel rows having color filters in the same color are output to the same vertical output line 16 at the same timing. For example, a signal of the pixel 12r on the pixel row V1-1 and a signal of the pixel 12r on the pixel row V2-1 are output to the same vertical output line at the same timing. Further, a signal of the pixel 12g on the pixel row V1-1 and a signal of the pixel 12g on the pixel row V2-1 are output to the same vertical output line at the same timing.

FIG. 15 is a schematic diagram more specifically illustrating the operation on each pixel row illustrated in FIG. 14. In FIG. 15, the same pixel rows V1-1 to V9-2 as those of the FIG. 14 are represented in the vertical direction. The repetition cycle of the first imaging row, the AF row, and the second imaging row is also the same as that of FIG. 14. In FIG. 15, the horizontal direction is a time axis and defines the period H1, the period H2, . . . , and the period H10, where each interval of the row select latch pulses (one horizontal period) is a reference unit.

Now, in focusing on the period H3, readout operations are performed on the pixel row V1-1 and the pixel row V2-1 that are imaging rows, a reset operation is performed on the pixel row V3-1 that is an AF row. Therefore, as described in the first embodiment, the influence of a potential change of the FD node due to a reset operation on the pixel row V3-1 may superimpose as noise on pixel signals read out from the pixel row V1-1 and the pixel row V2-1.

Similarly, in focusing on the period H4, readout operations are performed on the pixel row V2-2 and the pixel row V3-2 that are imaging rows, a reset operation is performed on the pixel row V4-2 that is an AF row. Therefore, the influence of a potential change of the FD node due to a reset operation on the pixel row V4-2 may superimpose as noise on pixel signals read out from the pixel row V2-2 and the pixel row V3-2.

FIG. 16 is an example of a timing chart illustrating the operation from the period H2 to the period H4 on the pixel rows V1-1, V1-2, V2-1, V2-2, V3-1, V3-2, V4-1, and V4-2.

In FIG. 16, control signals that drive the select transistors M5 on the unit pixel rows V1, V2, V3, and V4 are denoted as φSEL1, φSEL2, φSEL3, and φSEL4, respectively. Further, control signals that drive the reset transistors M3 on the unit pixel rows V1, V2, V3, and V4 are denoted as φRES1, φRES2, φRES3, and φRES4, respectively. Further, control signals that drive the transfer transistors MA1 and MB1 on the pixel rows V1-1, V2-1, V3-1, and V4-1 are denoted as φTX1-1, φTX2-1, φTX3-1, and φTX4-1, respectively. Further, control signals that drive the transfer transistors MA2 and MB2 on the pixel rows V1-2, V2-2, V3-2, and V4-2 are denoted as φTX1-2, φTX2-2, φTX3-2, and φTX4-2, respectively. Note that, while operated at different timings as illustrated in FIG. 8C in a readout operation on the AF row, the transfer transistors MA and MB on each pixel row are operated at the same timing in the operation in a range illustrated in FIG. 16 and thus are represented as a single signal in FIG. 16.

In FIG. 16, the period from the time t0 to the time t5 is the period H2, the period from the time t5 to the time t14 is the period H3, the period from the time t14 to the time t23 is the period H4, and the period on and after the time t23 is the period H5.

At the time t0, the controls signals φRES1, φRES2, φRES3, and φRES4 are at a high level, and the FD nodes on the unit pixel rows V1, V2, V3, and V4 are in a reset state. During the period H2, the unit pixel rows V1, V2, V3, and V4 are not selected, and the control signals φSEL1, φSEL2, φSEL3, and φSEL4 are maintained at a low level.

The period H2 is a period one horizontal period before the period H3 in which readout operations of the pixel rows V1-1 and V2-1 are performed, and a preliminary select operation is performed therein. That is, the control signals φRES1 and φRES2 fall to a low level in the period from the time t2 to the time t3, and reset of the FD nodes of the unit pixel rows V1 and V2 is released in this period. Then, the control signal φRES1 and φRES2 again rise to a high level at the time t3, and reset of the FD nodes on the unit pixel rows V1 and V2 are performed.

Further, the period H3 is a period one horizontal period before the period H4 in which readout operations of the pixel rows V2-2 and V3-2 are performed, and a preliminary select operation is performed therein. That is, the control signals φRES2 and φRES3 fall to a low level in the period from the time t9 to the time t12, and reset of the FD nodes of the unit pixel rows V2 and V3 is released in this period. Then, the control signal φRES2 and φRES3 again rise to a high level at the time t12, and reset of the FD nodes on the unit pixel rows V2 and V3 are performed.

With a preliminary select operation being performed, pixels sharing an FD node can have the same reset state of the FD node immediately before readout. For example, the reset time of the FD node before a readout operation on the pixel row V2-1 (from the time t3 to the time t9) and the reset time of the FD node before an readout operation on the pixel row V2-2 (from the time t12 to the time t16) can be matched. Therefore, signals of pixels belonging to the pixel row V2-1 and signals of pixels belonging to the pixel row V2-2 can be read out with the same potential of the FD nodes.

In the period H3, readout operations of the pixel rows V1-1 and V2-1 and a reset operation of the pixel row V3-1 are performed. At this time, the timing of performing readout operations from pixels belonging to the pixel rows V1-1 and V2-1 and the drive timing of the control signal φTX3-1 in a reset operation of the pixel row V3-1 are set so as to be different from each other in a similar manner to the case of the first embodiment. That is, the control signals φTX1-1 and φTX2-1 are driven in a period from the time t10 to the time t11 that is the period in which the control signals φRES1 and φRES2 are at a low level. In contrast, the control signal φTX3-1 is driven in the period from the time t7 to the time t8 that is a period in which the control signal φRES3 is at a high level and the potential of the FD node is fixed to the reset potential. This can suppress a change in a potential of the FD node due to the reset operation and reduce noise superimposing on pixel signals output from pixels during the readout operation, which can improve the image quality.

In the period H4, readout operations of the pixel rows V2-2 and V3-2 and a reset operation of the pixel row V4-2 are performed. Also in this case, the timing of performing readout operations from pixels belonging to the pixel rows V2-2 and V3-2 and the drive timing of the control signal φTX4-2 in a reset operation of the pixel row V4-1 are set so as to be different from each other in a similar manner to the case of the first embodiment. That is, the control signals φTX2-2 and φTX3-2 are driven in the period from the time t18 to the time t21 that is a period in which the control signals φRES2 and φRES3 are at a low level. In contrast, the control signal φTX4-2 is driven in the period from the time t16 to the time t17 that is a period in which the control signal φRES4 is at a high level and the potential of the FD node is fixed to the reset potential. This can suppress a change in a potential of the FD node due to the reset operation and reduce noise superimposing on pixel signals output from pixels during the readout operation, which can improve the image quality.

Note that, while the solid-state imaging device that includes the vertical scanning circuit 20 having a function of a preliminary select operation has been described as an example in the present embodiment, the object due to performing a readout operation and a reset operation on neighboring unit pixel rows in the same period may arise in a case where no preliminary select operation is performed. Also in this case, in a similar manner to the present embodiment, by differing the timing of drive pulses of the transfer transistors MA and MB on a readout row from the timing of drive pulses of the transfer transistors MA and MB on a reset row, the influence of a change in the potential of the FD node can be suppressed.

Further, for example, as illustrated in FIG. 12, the same as the case where no preliminary select operation is performed applies to the case where the unit pixel 12 is formed of a single pixel including only a pair of the photoelectric converters DA and DB corresponding to a single micro lens ML, that is, the unit pixel row is formed of a single pixel row. In a similar manner to the present embodiment, by differing the timing of drive pulses of the transfer transistors MA and MB on a readout row from the timing of drive pulses of the transfer transistors MA and MB on a reset row, the influence of a change in the potential of the FD node can be suppressed.

As discussed above, according to the present embodiment, it is possible to suppress noise due to the operation on a focus detection row from superimposing on an imaging signal read out from an imaging row and therefore improve the image quality.

Third Embodiment

A solid-state imaging device and a method of driving the same according to a third embodiment of the present invention will be described with reference to FIG. 17 to FIG. 20. The same component as that of the solid-state imaging device according to the first embodiment is labeled with the same reference, and the description thereof will be omitted or simplified.

Figure 17:
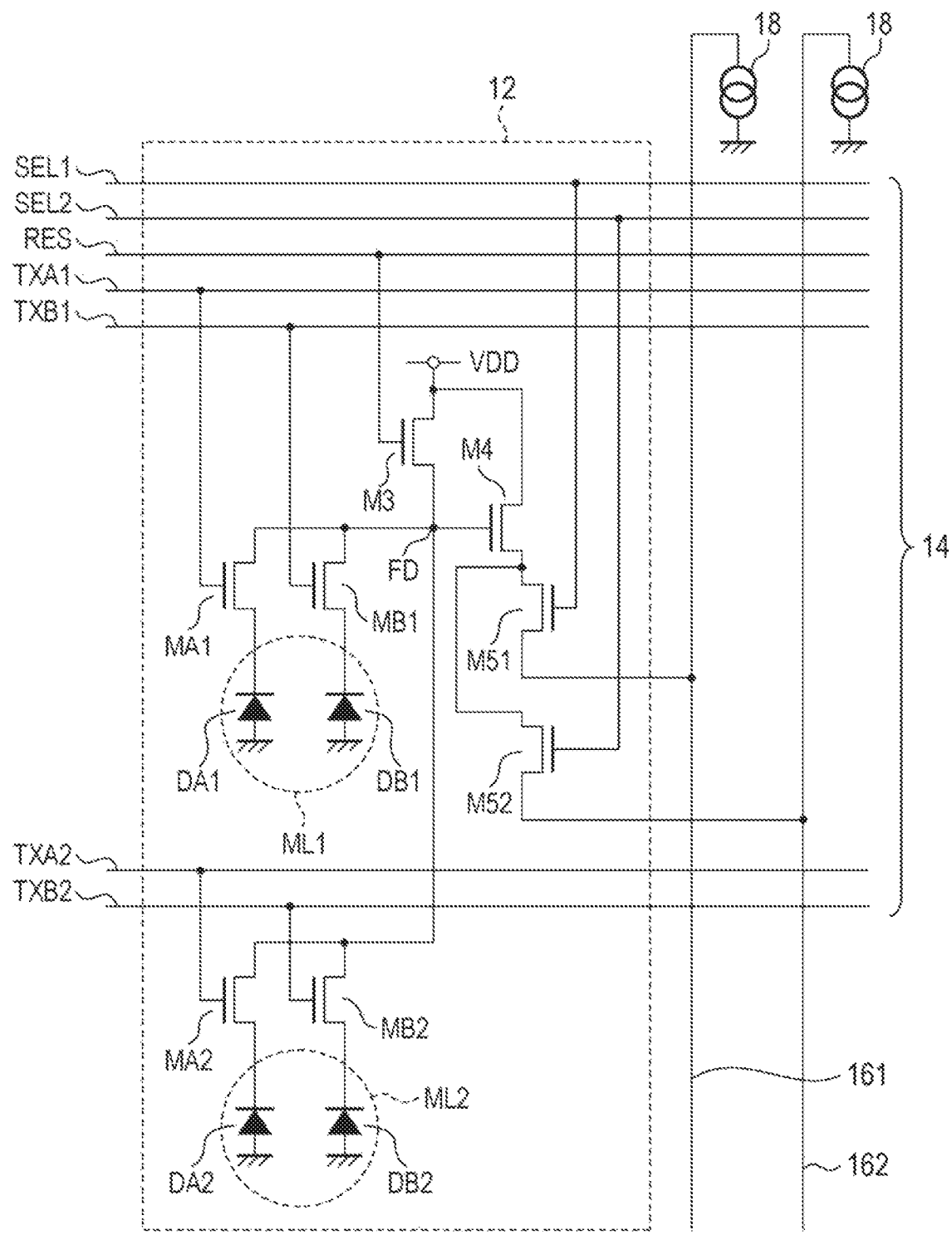
FIG. 17 is a circuit diagram illustrating a configuration example of a pixel of a solid-state imaging device according to a third embodiment.
Figure 18:
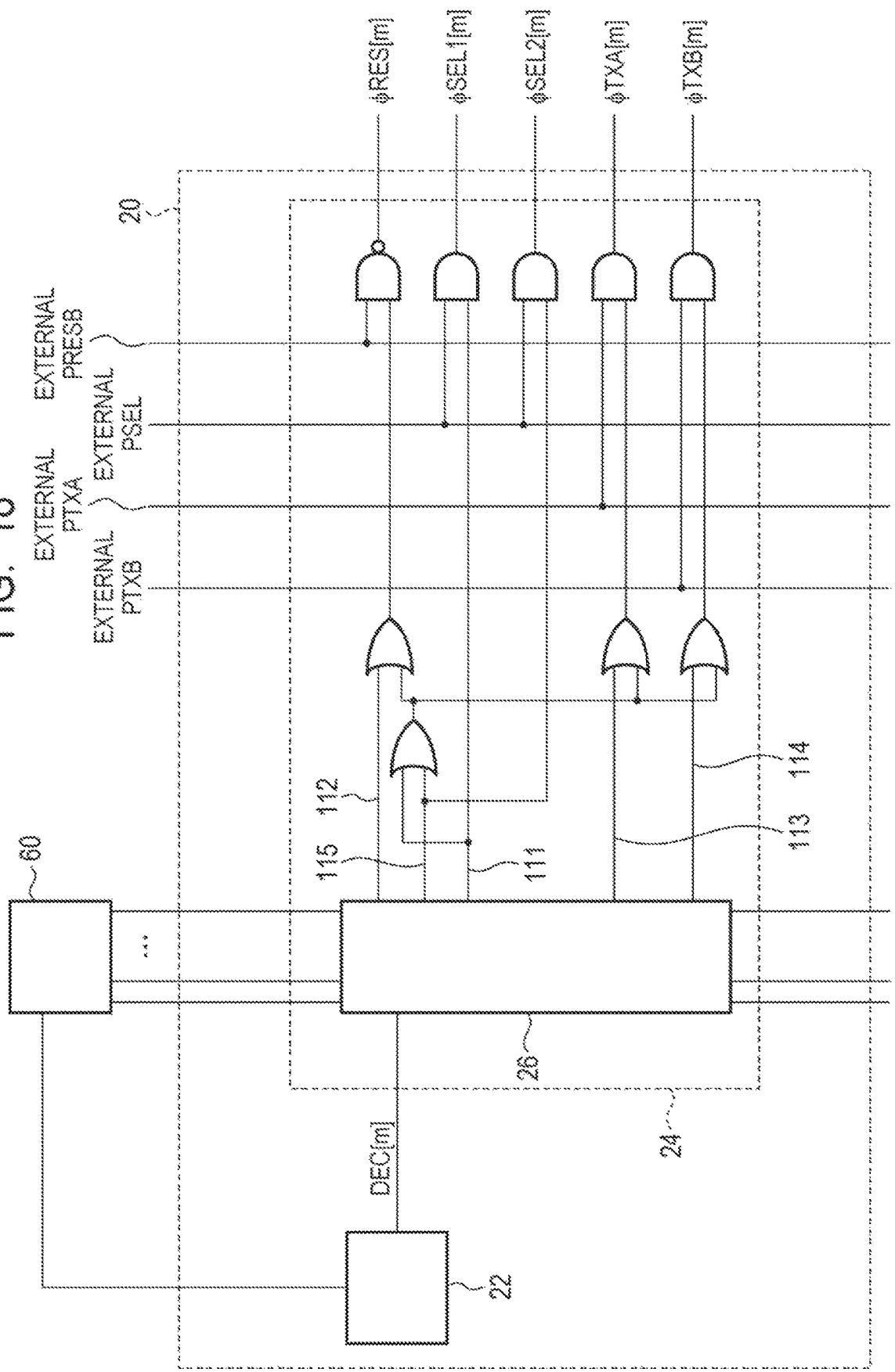
FIG. 18 is a diagram illustrating a configuration example of a vertical scanning circuit of the solid-state imaging device according to the third embodiment.
Figure 19:
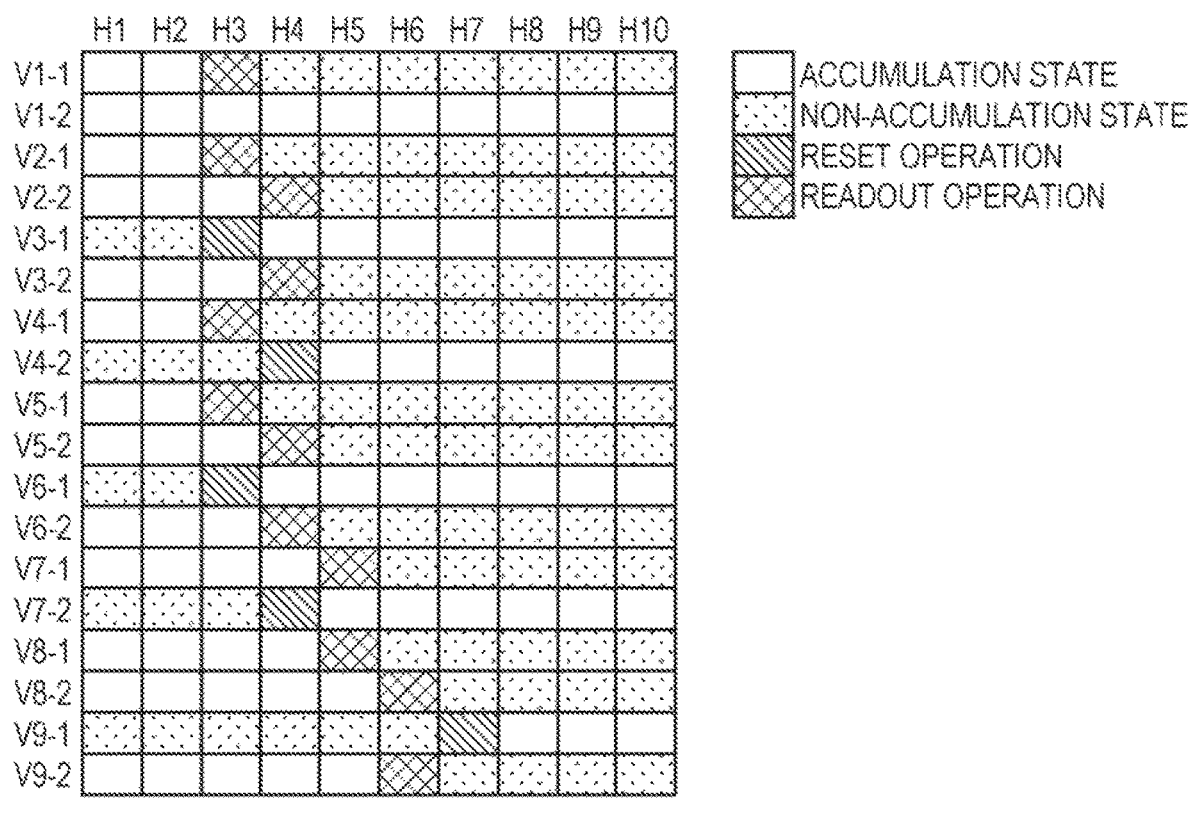
Figure 20:
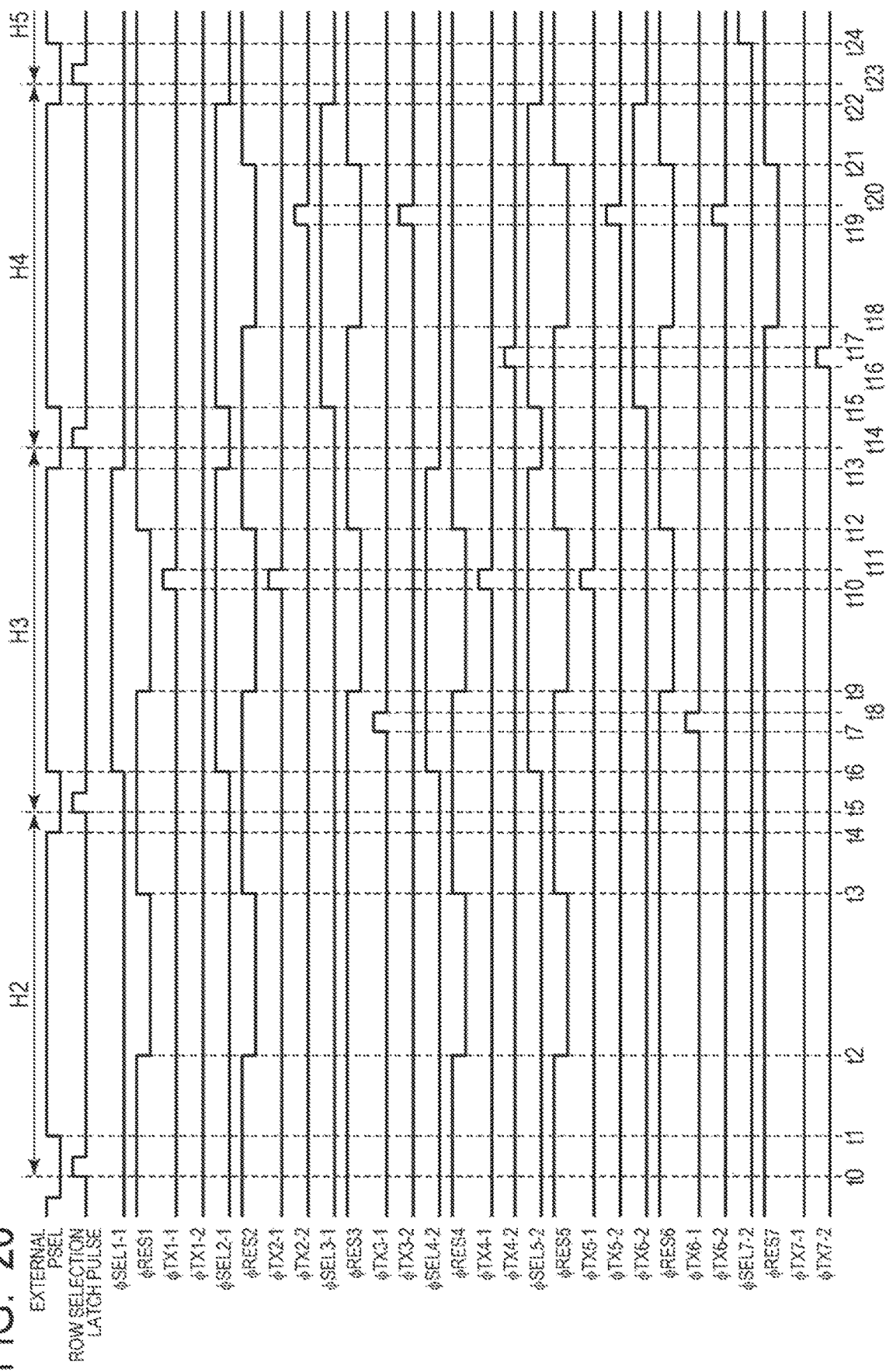
FIG. 20 is a timing chart illustrating a method of driving the solid-state imaging device according to the third embodiment.

FIG. 17 is a circuit diagram illustrating a configuration example of a pixel of the solid-state imaging device according to the present embodiment. FIG. 18 is a diagram illustrating a configuration example of a vertical scanning circuit of the solid-state imaging device according to the present embodiment. FIG. 19 is a schematic diagram illustrating the operation of respective pixel rows in the method of driving the solid-state imaging device according to the present embodiment. FIG. 20 is a timing chart illustrating the method of driving the solid-state imaging device according to the present embodiment.

The circuit configuration of the unit pixel 12 of the solid-state imaging device according to the present embodiment is different from the configuration of the unit pixel 12 of the solid-state imaging device according to the first embodiment illustrated in FIG. 2. That is, the unit pixel 12 of the solid-state imaging device according to the present embodiment includes two select transistors M51 and M52 whose drains are connected to the source of the amplifier transistor M4 as illustrated in FIG. 17. The gates of the select transistors M51 and M52 are connected to the select signal lines SEL1 and SEL2, respectively. The sources of the select transistors M51 and M52 are connected to the vertical output lines 161 and 162, respectively. With such a configuration, signals on two different unit pixel rows can be output to the vertical output lines 161 and 162, respectively, and two unit pixel rows can be read out in parallel.

FIG. 18 is a circuit diagram illustrating an example of the vertical scanning circuit 20 for driving the unit pixel 12 illustrated in FIG. 17. The description for a portion common to the vertical scanning circuit 20 illustrated in FIG. 4 will be omitted. In the vertical scanning circuit 20 illustrated in FIG. 18, from the logic generation unit 26, a row select signal for the select transistor M51 is output to the signal line 111, and a row select signal for the select transistor M52 is output to the signal line 115. The scanning circuit unit 24 calculates an AND of a row select signal output via the signal line 111 and the external PSEL signal to generate the control signal φSEL1[m] supplied to the select signal line SEL1. Further, the scanning circuit unit 24 calculates an AND of a row select signal output via the signal line 115 and the external PSEL signal to generate the control signal φSEL2[m] supplied to the select signal line SEL2.

FIG. 19 is a schematic diagram specifically illustrating the operation on each pixel row. In FIG. 19, the same pixel rows V1-1 to V9-2 as those of the FIG. 14 are represented in the vertical direction. The repetition cycle of the first imaging row, the AF row, and the second imaging row is also the same as that of FIG. 14. In FIG. 19, the horizontal direction is a time axis and defines the period H1, the period H2, . . . , and the period H10, where the interval of the row select latch pulses (one horizontal period) is a reference unit.

Now, in focusing on the period H3, readout operations are performed on the pixel rows V1-1, V2-1, V4-1, and V5-1 that are imaging rows, a reset operation is performed on the pixel rows V3-1 and V6-1 that are AF rows. In the readout operation, signals from pixels on the pixel row V1-1 and signals from pixels on the pixel row V2-1 are output to the vertical output line 161, and signals from pixels on the pixel row V4-1 and signals from pixels on the pixel row V5-1 are output to the vertical output line 162. Also in such a case, the influence of a potential change of the FD node due to reset operations on the pixel rows V3-1 and V6-1 may superimpose as noise on pixel signals read out from the pixel row V1-1 and the pixel row V2-1 and pixel signals read out from the pixel row V4-1 and the pixel row V5-1.

Similarly, in focusing on the period H4, readout operations are performed on the pixel rows V2-2, V3-2, V5-2, and V6-2 that are imaging rows, a reset operation is performed on the pixel rows V4-2 and V7-2 that are AF rows. In the readout operation, signals from pixels on the pixel row V2-2 and signals from pixels on the pixel row V3-2 are output to the vertical output line 161, and signals from pixels on the pixel row V5-2 and signals from pixels on the pixel row V6-2 are output to the vertical output line 162. Also in such a case, the influence of a potential change of the FD node due to reset operations on the pixel rows V4-2 and V7-2 may superimpose as noise on pixel signals read out from the pixel row V2-2 and the pixel row V3-2 and pixel signals read out from the pixel row V5-2 and the pixel row V6-2.

FIG. 20 is an example of a timing chart illustrating the operation from the period H2 to the period H4 on the pixel rows V1-1, V1-2, V2-1, V2-2, V3-1, V3-2, V4-1, V4-2, V5-1, V5-2, V6-1, V6-2, V7-1, and V7-2.

In FIG. 20, control signals that drive the select transistors M51 on the unit pixel rows V1, V2, and V3 are denoted as φSEL1-1, φSEL2-1, and φSEL3-1. Control signals that drive the select transistors M52 on the unit pixel rows V4, V5, V6, and V7 are denoted as φSEL4-2, φSEL5-2, φSEL6-2, and φSEL7-2. Control signals that drive the reset transistors M3 on the unit pixel rows V1, V2, V3, V4, V5, V6, and V7 are denoted as φRES1, φRES2, φRES3, φRES4, φRES5, φRES6, and φRES7. Control signals that drive the transfer transistors MA1 and MB1 on the pixel rows V1-1, V2-1, V3-1, V4-1, V5-1, V6-1, and V7-1 are denoted as φTX1-1, φTX2-1, φTX3-1, φTX4-1, φTX5-1, φTX6-1, and φTX7-1. Control signals that drive the transfer transistors MA2 and MB2 on the unit pixel rows V1-2, V2-2, V3-2, V4-2, V5-2, V6-2, and V7-2 are denoted as φTX1-2, φTX2-2, φTX3-2, φTX4-2, φTX5-2, φTX6-2, and φTX7-2. Note that, while operated at different timings as illustrated in FIG. 8C in a readout operation on the AF row, the transfer transistors MA and MB on each pixel row are operated at the same timing in the operation in a range illustrated in FIG. 20 and thus are represented as a single signal in FIG. 20.

In FIG. 20, the period from the time t0 to the time t5 is the period H2, the period from the time t5 to the time t14 is the period H3, the period from the time t14 to the time t23 is the period H4, and the period on and after the time t23 is the period H5.

In the drive method according to the present embodiment, preliminary select operations are performed in the period from the time t2 to the time t3 in the period H2 on the pixel rows V1-1, V2-1, V4-1, and V5-1 on which readout operations are performed in the period H3. Similarly, preliminary select operations are performed in the period from the time t9 to the time t12 in the period H3 on the pixel rows V2-2, V3-2, V5-2, and V6-2 on which readout operations are performed in the period H4.

In the period H3, while the readout operations on the pixel rows V1-1, V2-1, V4-1, and V5-1 and the preliminary select operation performed prior to the readout operation in the period H4 are being performed, reset operations are performed on the pixel rows V3-1 and V6-1. Further, in the period H4, while the readout operations on the pixel rows V2-2, V3-2, V5-2, and V6-2 are being performed, reset operations are performed on the pixel rows V4-2 and V7-2.

Also in the present embodiment, however, the timing when readout operations of the pixel rows V1-1, V2-1, V4-1, and V5-1 are performed and the drive timing of the control signals φTX3-1 and φTX6-1 in the reset operations of the pixel rows V3-1 and V6-1 are different from each other. Further, the timing when readout operations of the pixel rows V2-2, V3-2, V5-2, and V6-2 are performed and the drive timing of the control signals φTX4-2 and φTX7-2 in the shutter operations of the pixel rows V4-2 and V7-2 are different from each other. It is therefore possible to suppress a change in a potential of the FD node due to the reset operation and reduce noise superimposing on pixel signals output from pixels during the readout operation, which can improve the image quality.

Note that, while the example in which two vertical output lines 16 are arranged on each column of a pixel array of the pixel region 10 has been illustrated as an example in the above embodiment, the number of the vertical output lines 16 arranged on each column is not limited to two and may be three or more if necessary.

Further, while the solid-state imaging device that includes the vertical scanning circuit 20 having a function of a preliminary select operation has been described as an example in the present embodiment, the object due to performing a readout operation and a reset operation on neighboring unit pixel rows in the same period may arise also in a case where no preliminary select operation is performed. Also in this case, in a similar manner to the present embodiment, by differing the timing of drive pulses of the transfer transistors MA and MB on a readout row from the timing of drive pulses of the transfer transistors MA and MB on a reset row, the influence of a change in the potential of the FD node can be suppressed.

As discussed above, according to the present embodiment, it is possible to suppress noise due to the operation on a focus detection row from superimposing on an imaging signal read out from an imaging row and therefore improve the image quality.

Fourth Embodiment

A solid-state imaging device and a method of driving the same according to a fourth embodiment of the present invention will be described with reference to FIG. 21 to FIG. 25. The same component as that of the solid-state imaging device according to the first to third embodiments is labeled with the same reference, and the description thereof will be omitted or simplified.

Figure 21:
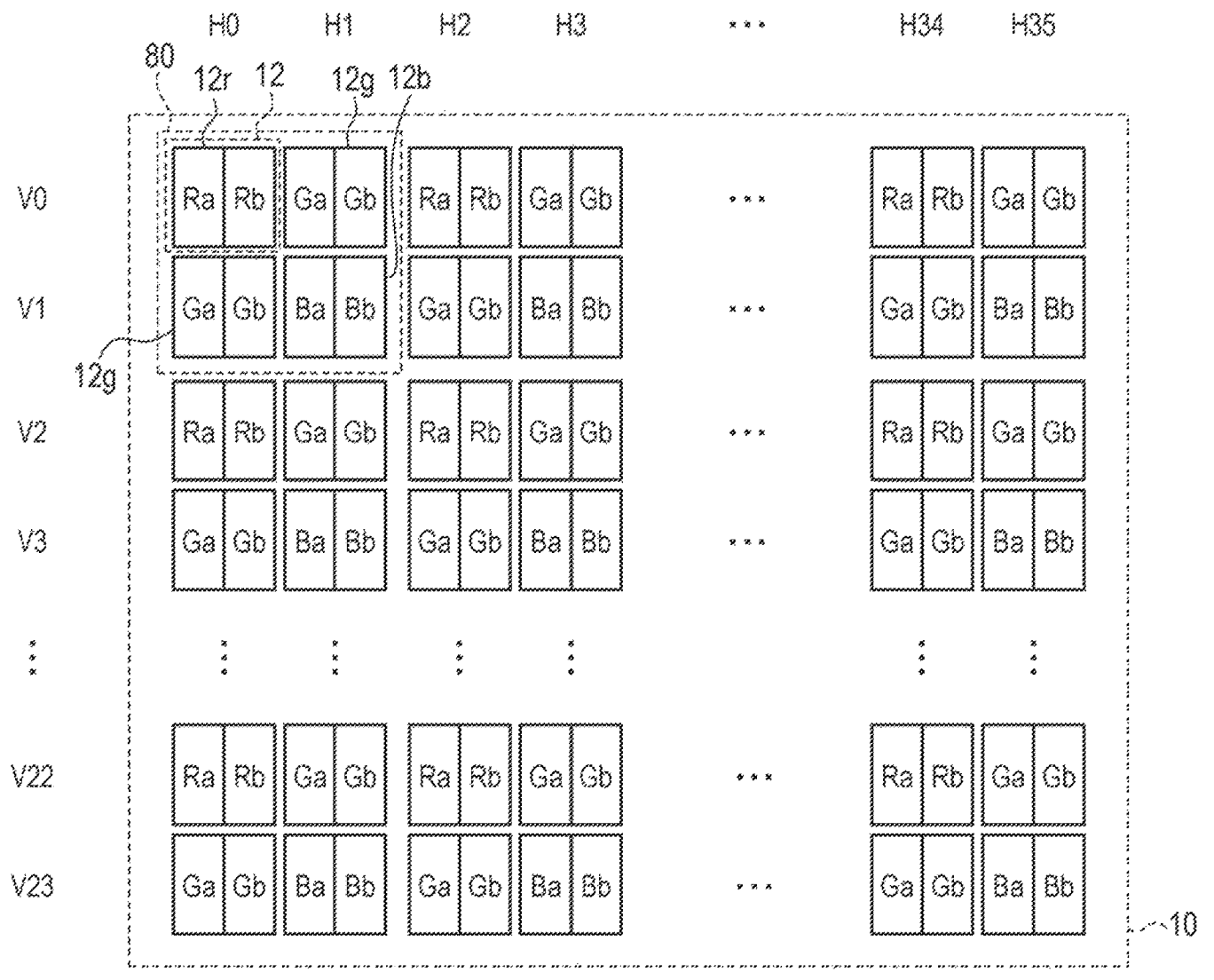
Figure 22:
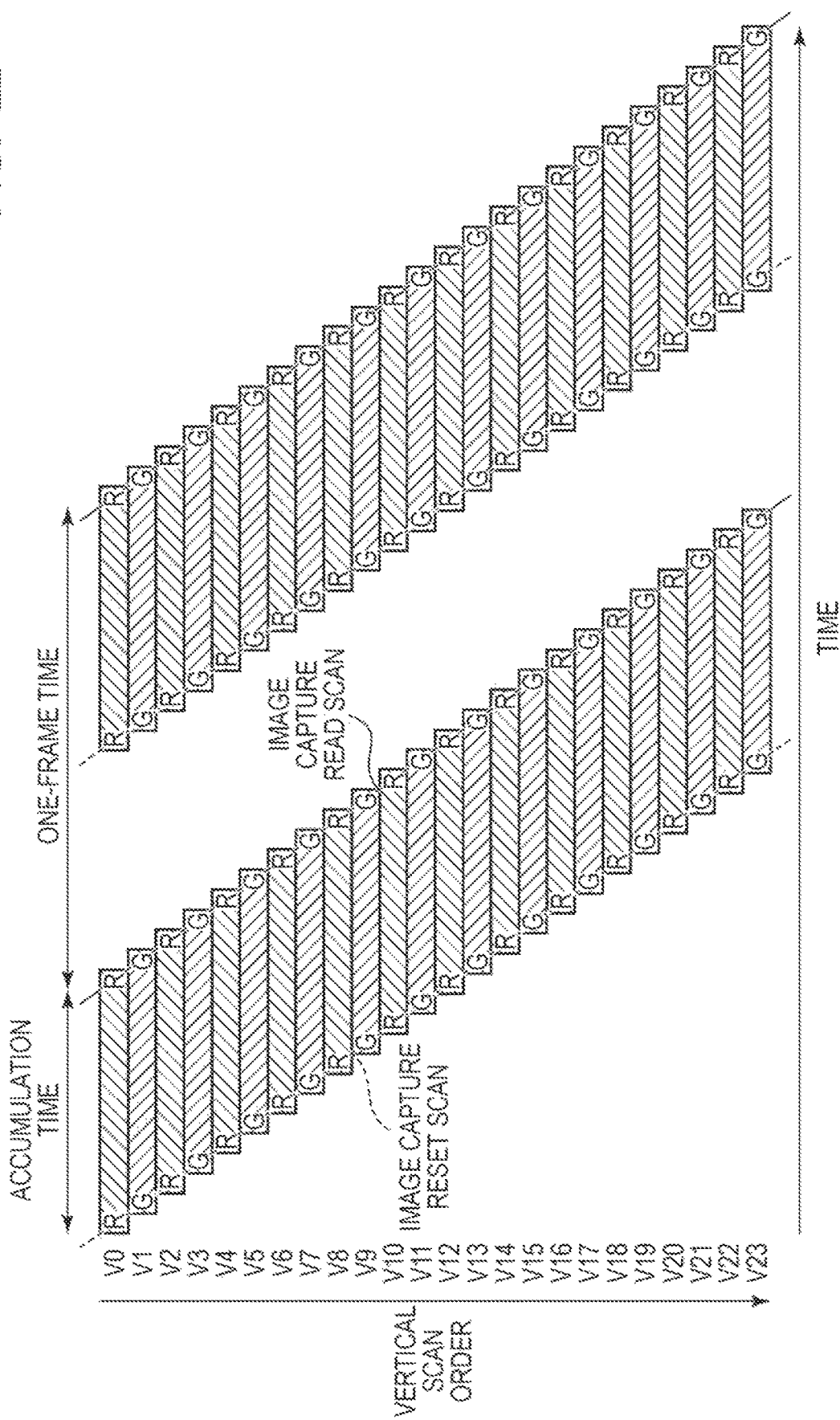
FIG. 22 is a schematic diagram illustrating the timing of the reset operation and the readout operation of respective pixel rows in an all-pixel readout mode.
Figure 23:
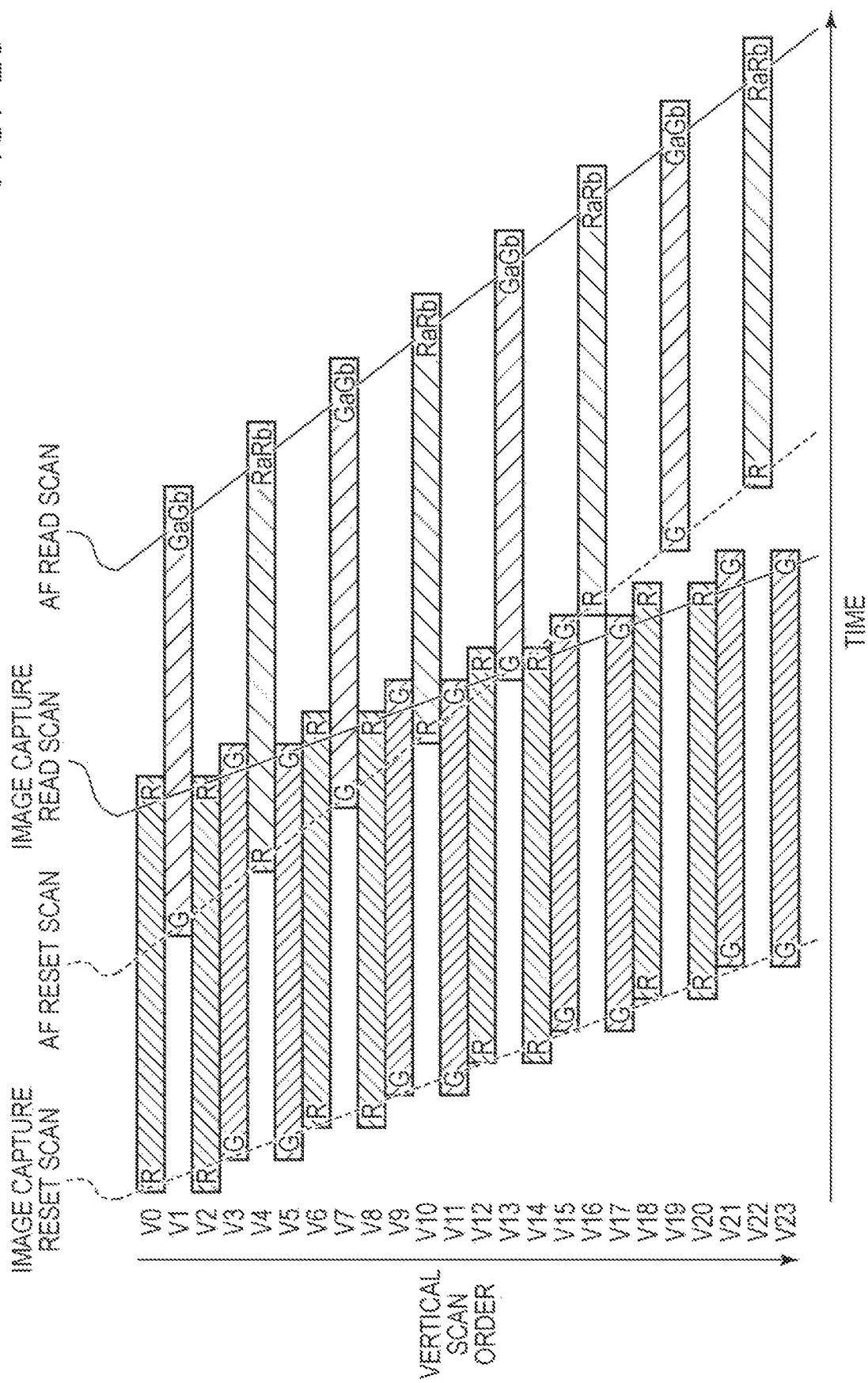
FIG. 23 is a schematic diagram illustrating the timing of the reset operation and the readout operation of respective pixel rows in a method of driving a solid-state imaging device according to a reference example.
Figure 24:
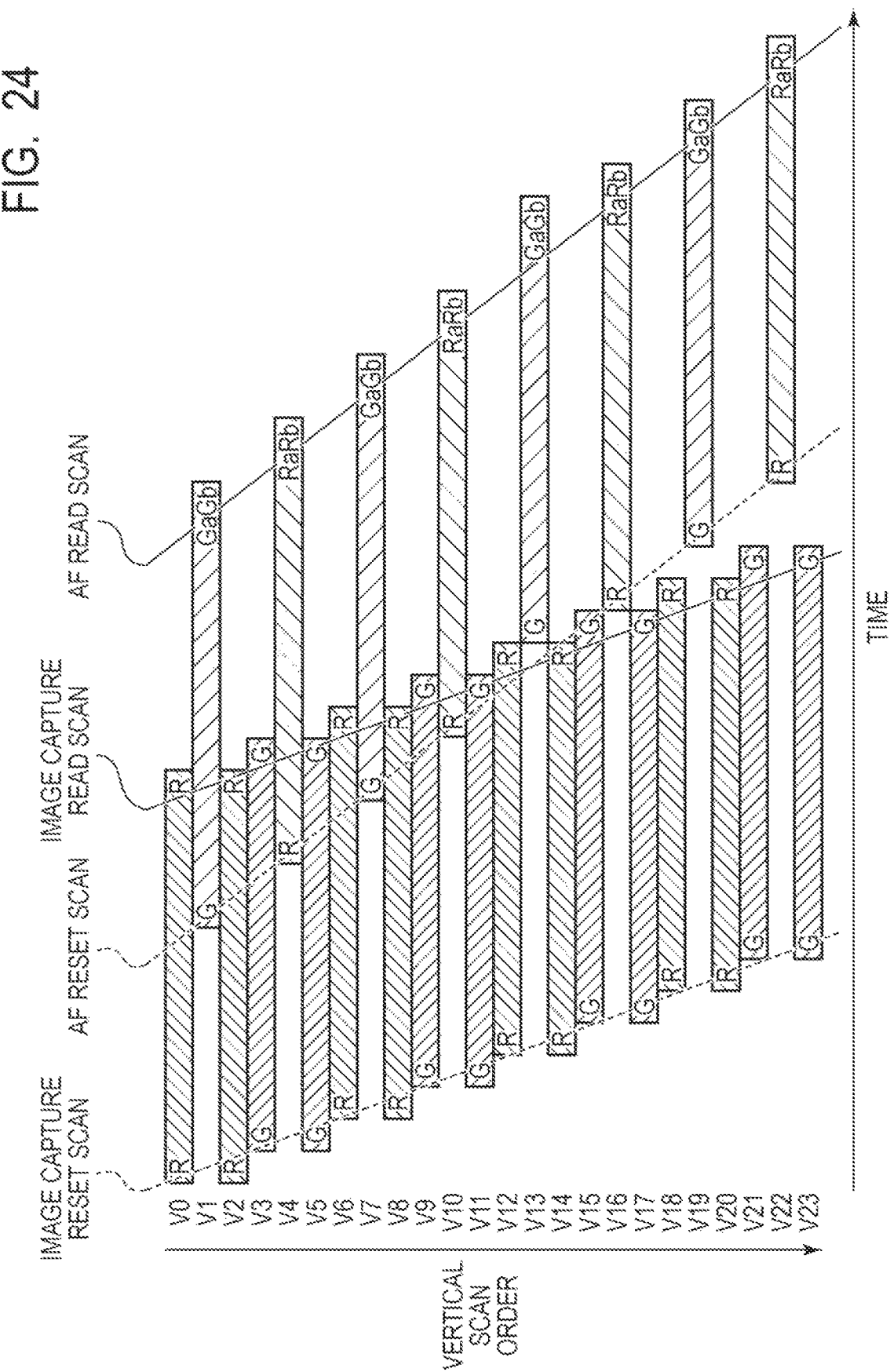
FIG. 24 is a schematic diagram illustrating the timing of the reset operation and the readout operation of respective pixel rows in a method of driving the solid-state imaging device according to the fourth embodiment.
Figure 25:
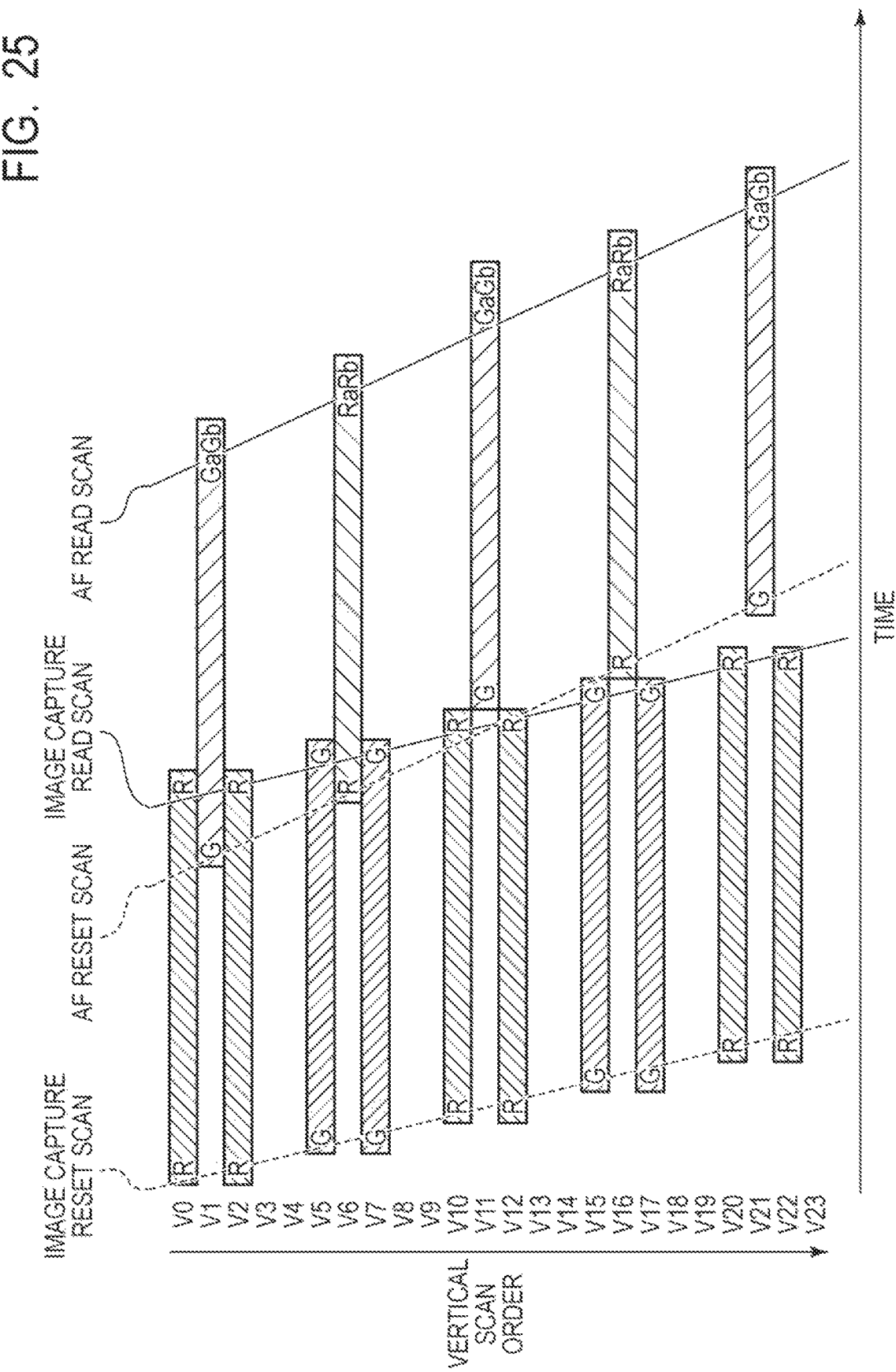
FIG. 25 is a schematic diagram illustrating the timing of the reset operation and the readout operation of respective pixel rows in a method of driving the solid-state imaging device according to a modified example of the fourth embodiment.

FIG. 21 is a schematic diagram illustrating an arrangement example of color filters in the solid-state imaging device according to the present embodiment. FIG. 22 is a schematic diagram illustrating the timing of the reset operation and the readout operation of respective pixel rows in an all-pixel readout mode. FIG. 23 is a schematic diagram illustrating the timing of the reset operation and the readout operation of respective pixel rows in a method of driving a solid-state imaging device according to a reference example. FIG. 24 is a schematic diagram illustrating the timing of the reset operation and the readout operation of respective pixel rows in the method of driving the solid-state imaging device according to the present embodiment. FIG. 25 is a schematic diagram illustrating the timing of the reset operation and the readout operation of respective pixel rows in a method of driving the solid-state imaging device according to a modified example of the present embodiment.

The present embodiment illustrates another method of driving the solid-state imaging device that includes color filters of three colors with the Bayer arrangement and in which the unit pixels 12 are configured by the circuit illustrated in FIG. 12. Note that, while an example using the Bayer arrangement that is a typical arrangement pattern of color filters is illustrated in this example, the arrangement pattern of color filters is not limited in particular.

FIG. 21 is a diagram illustrating an arrangement example of color filters arranged on respective pixels of the pixel region 10. For simplified illustration, FIG. 21 illustrates the pixel region 10 in which the unit pixels 12 are arranged in an array of 24 rows by 36 columns.

The unit block 80 forming a unit of repetition in the Bayer arrangement includes a pixel 12r having a red (R) color filter, pixels 12g having green (G) color filters, and a pixel 12b having a blue (B) color filter as described in the second embodiment. When the unit pixel 12 has the circuit illustrated in FIG. 12, the unit pixel 12 is any of the pixel 12r, the pixel 12g, and the pixel 12b. A unit pixel row corresponds to a pixel row. The pixel row is a row including the pixels 12r and the pixels 12g or a row including the pixels 12g and the pixels 12b. For example, even-numbered rows (pixel rows V0, V2, . . . , V22) are rows including the pixels 12r and the pixels 12g, and odd-numbered rows (pixel rows V1, V3, . . . , V23) are rows including the pixels 12g and the pixels 12b.

FIG. 22 is a schematic diagram illustrating the timing of reset operations and readout operations on respective pixel rows in an all-pixel readout mode. In FIG. 22, the horizontal axis represents time, and the vertical axis represents vertical scan order (row scan direction). The all-pixel readout mode is a readout mode for reading out imaging signals from all the unit pixels 12 on all the pixel rows.

In FIG. 22, each diagonal solid line represents an image capture read scan and indicates the transition of the timing of a readout operation on each pixel row. Each diagonal dotted line represents an image capture reset scans and indicates the transition of the timing of a reset operation on each pixel row. In one pixel row, a period from a readout operation to the next readout operation corresponds to a one-frame time, and a period from a reset operation to a read operation corresponds to an accumulation time. Further, R and G in FIG. 22 indicate red and green that are the colors on the head column of the row in the Bayer arrangement. A change of the accumulation time can be made by shifting the timing of the image capture reset scan in the time axis direction. By controlling the timing of the image capture reset scan, it is possible to control the accumulation time at the same framerate. A change of the framerate can be made by controlling the one-frame time.

In general, because of a high resolution but a long one-frame time, driving due to the all-pixel readout mode as illustrated in FIG. 22 is often used for static image capturing. In a case of a single-lens reflex camera, a focus detection device is arranged separately from the imaging device in general, and focus detection using the imaging element is often not required in static image capturing. In motion image capturing, however, it is desirable in general that the resolution be lower and the framerate be higher than those of a static image. Further, in motion image capturing, since the focus detection element can often not be used during capturing, an imaging device having a focus detection function is preferable. Therefore, in motion image capturing, a reduced readout mode as illustrated in FIG. 23 is used, for example.

FIG. 23 is a schematic diagram illustrating the timing of reset operations and readout operations on respective pixel rows in the reduced readout mode. In FIG. 23, the horizontal axis represents time, and the vertical axis represents vertical scan order. The reduced readout mode is a mode for driving a part of the pixel rows as imaging rows and another part of the pixel rows as AF rows out of all the pixel rows.

In an example of driving of FIG. 23, in the same manner as the case of the second embodiment, the reduction ratio of pixel rows in an image capture scan is 2/3, and the reduction ratio of pixel rows in an AF scan is 1/3. This driving is the same as the second embodiment in that one-third of all the pixel rows are reduced as AF rows from imaging rows and, at the same time, pixel signals are output from imaging rows of the same color alignment that are next to each other interposing an AF row to perform two-pixel addition. This can reduce the time required for an image capture scan to 1/3 with respect to all-pixel readout mode of FIG. 22 and increase the framerate. Further, by performing two-pixel addition, it is possible to improve the S/N ratio and reduce moire. On the pixel rows reduced in the image capture scan, the AF scan is performed subsequent to the image capture scan in the same manner as the case of the first to third embodiments.

Since the image-A signal and the image-B signal are read out in the AF read scan, the readout period of the AF row is approximately twice the readout period of the imaging row, as described by using FIG. 8A to FIG. 8C. Thus, as described by using FIG. 7, a readout operation of an imaging row and a reset operation of an AF row may be performed at the same timing in pixels arranged close to each other. For example, in an example of driving of FIG. 23, during a readout period in which readout operations of the pixel row V12 and the pixel row V14 that are imaging rows are performed, a reset period occurs in which a reset operation of the pixel row V13 that is an AF row is performed.

As described above, when a readout operation of an imaging row and a reset operation of an AF row are performed on pixels whose FD nodes are close to each other, this may cause noise to superimpose on an imaging signal. In addition, since this phenomenon occurs on a row basis, this may cause horizontal stripe noise to appear on a captured image and affect the image quality.

Thus, in the drive method according to the present embodiment, when there is a likelihood that a readout period of an imaging row and a reset period of an AF row match to each other between closely arranged pixels, the timing of the reset period of the AF row is selectively delayed by one row (one horizontal period). For example, in the case of a drive example of FIG. 23, as illustrated in FIG. 24, the reset period of the pixel row V13 of the AF rows is delayed by one row (one horizontal period) and performed. By controlling the timing of the reset period of the AF row such that the readout period of an imaging row and the reset period on an AF row are not performed at the same time between closely arranged pixels, it is possible to suppress noise from superimposing on an imaging signal.

In order to apply the drive method of the present embodiment, there is a demand for means for detecting an AF row which is close to an imaging row and on which a reset period occurs during a readout period on the imaging row (hereafter, referred to as "detection means"). However, since the condition of an image capture read scan is basically constant, once the condition of the AF reset scan is determined, the AF row which may cause noise occurrence can be easily identified by simple calculation.

The condition of the AF reset scan is uniquely determined by address information on the imaging element to be focused on and exposure control information. In the case of an example of driving of FIG. 24, the accumulation time of the pixel row V13 is shortened by delaying the timing of the reset period of the pixel row V13 that is an AF row. This causes the accumulation time of the pixel row V13 to be relatively shorter than other rows, and the influence thereof increases in particular when the accumulation time of an AF scan is short. In such a case, the output may be corrected in accordance with the shift amount of the timing in the reset period of the pixel row V13, or the output of the pixel row V13 may not be used for focus detection. Since the focus detection image is not for appreciation, a focus detection image can often be used in such a flexible manner.

Note that, while the timing of the reset period of the pixel row V13 is shifted so as to be delayed by one row in the example of driving of FIG. 24, the same effect and advantage can be obtained by shifting the timing to advance by one row. Further, the time for shifting the timing of a reset period may not necessarily be the time for one row, and any time such as the time for two rows or three rows, for example, may be set. It is desirable to set the time for shifting the timing of the reset operation as appropriate in accordance with the range to which the influence of the change in the potential of the FD node extends or the like.

Further, while the reduction ratio of imaging rows is 2/3 and the reduction ratio of AF rows is 1/3 in the example of driving of FIG. 24, the setting of the reduction ratios of imaging rows and AF rows are not limited thereto. For example, as illustrated in an example of driving of FIG. 25, the reduction ratio of imaging rows may be 2/5, and the reduction ratio of AF rows may be 1/5. In this case, two rows become non-readout rows every five rows.

Further, while the S/N ratio is improved and moire is reduced by performing two-pixel addition in the embodiment described above, pixel addition may not be necessarily performed.

As discussed above, according to the present embodiment, it is possible to suppress noise due to an operation of a focus detection row from superimposing an imaging signal read out from an imaging row and therefore improve the image quality.

Fifth Embodiment

A solid-state imaging device and a method of driving the same according to a fifth embodiment of the present invention will be described with reference to FIG. 26. The same component as that of the solid-state imaging device according to the first to fourth embodiments is labeled with the same reference, and the description thereof will be omitted or simplified.

Figure 26:
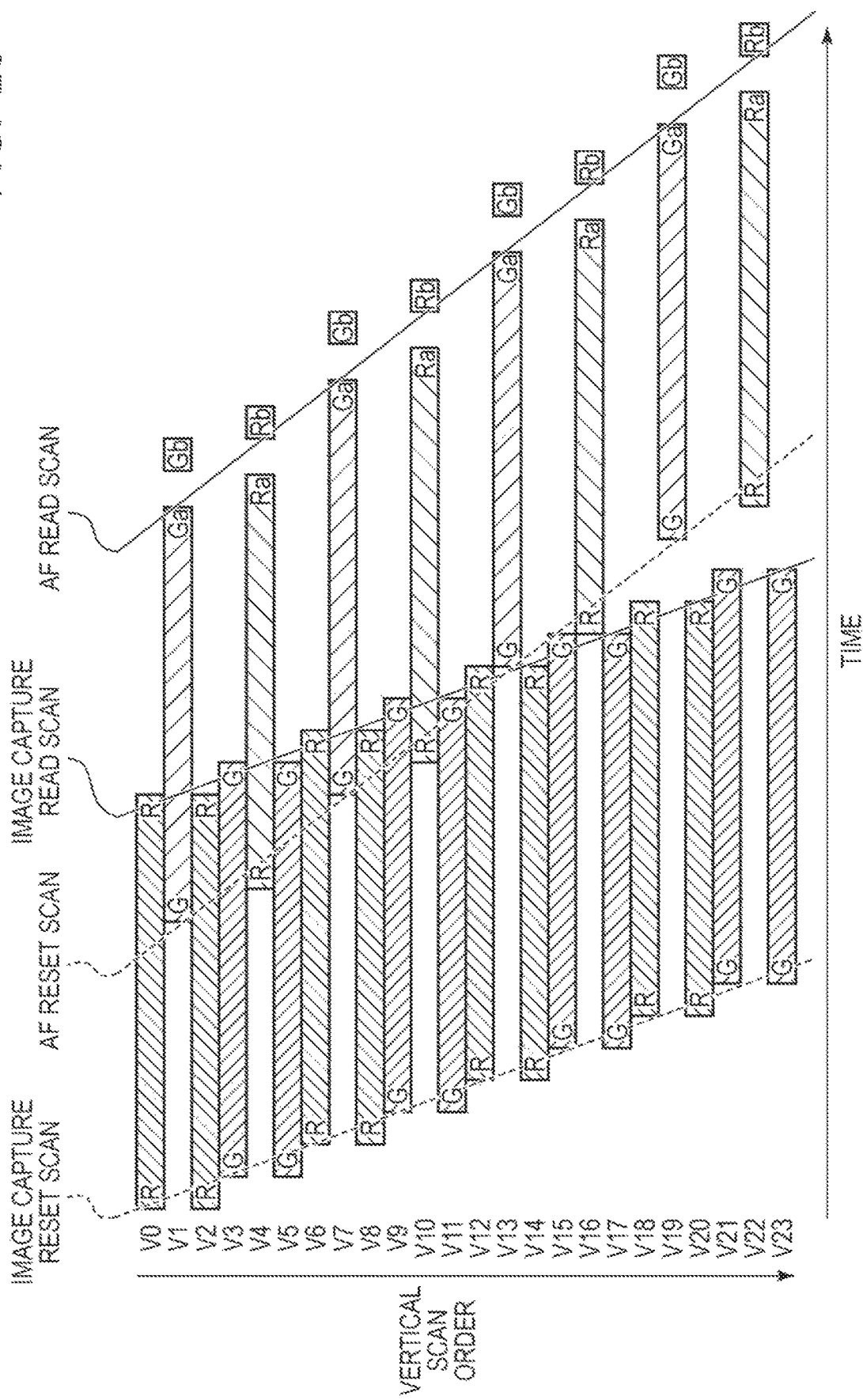
FIG. 26 is a schematic diagram illustrating the timing of the reset operation and the readout operation of respective pixel rows in a method of driving a solid-state imaging device according to a fifth embodiment.

FIG. 26 is a schematic diagram illustrating the timing of the reset operation and the readout operation of respective pixel rows in the method of driving the solid-state imaging device according to the present embodiment.

In the present embodiment, another method of driving the solid-state imaging device according to the fourth embodiment is illustrated. In the method of driving the present embodiment, as illustrated in FIG. 26, the intervals of performing AF reset operations on the neighboring AF rows are not uniform. Typically, in order to separately read out the image-A signal and the image-B signal in the AF read operation, the AF reset operations of the AF rows neighboring at intervals corresponding to two rows (two horizontal periods) are performed as illustrated in FIG. 23, for example. In contrast, in the present embodiment, while the AF reset operation of the pixel row V1 and the AF reset operation of the pixel row V4 are performed at intervals corresponding to one row, the AF reset operation of the pixel row V4 and the AF reset operation of the pixel row V7 are performed at intervals corresponding to three rows. Similarly, on the subsequent rows after the pixel row V7, AF reset operations on respective AF rows are performed with intervals corresponding to one row and intervals corresponding to three rows in an alternating manner. Further, the AF reset scan is performed at the timing shifted by one or more odd rows (the timing delayed by one row in FIG. 26) with respect to the AF reset scan in which the timing of the image capture read operation and the timing of the AF reset operation overlap with each other on neighboring pixel rows. The reason why such a setting is employed in the present embodiment will be described below.

Once the reduction ratios for imaging rows and AF rows are determined in accordance with capturing conditions, the timing of the image capture read scan and the timing of the AF read scan for each row are determined. Once the timing of the image capture read scan and the timing of the AF read scan for each row are determined, the timing of the AF reset scan which overlaps with the timing of the image capture read scan can be estimated. For example, the timing of the AF reset scan can be estimated in which the timing of the image capture read operation of the pixel rows V12 and V14 matches the timing of the AF reset operation of the pixel row V13 as illustrated in FIG. 23.

Further, the timings of the AF reset operations of neighboring AF rows are set with intervals corresponding to one row (one horizontal period) or intervals corresponding to three rows (three horizontal periods). With such a setting, in the AF reset scan shifted by one or more odd rows with respect to the timing of the AF reset scan estimated as described above, the timing of the image capture read operation and the timing of the AF reset operation do not overlap with each other on the neighboring pixel rows. Thus, the timing of the AF reset scan in accordance with the setting of the accumulation time of AF rows is selected from the timings of the AF reset scans that are shifted by one or more odd rows with respect to the estimated timing of the AF reset scan.

That is, in the present embodiment, the intervals of the reset period on the neighboring focus detection rows are set to intervals corresponding to one or more odd rows. The timing of performing a focus detection scan is then set to the timing shifted by one or more odd rows with respect to the timing of a focus detection scan in which the reset period of pixels belonging to focus detection rows matches the readout period of pixels belonging to the imaging row neighboring the focus detection rows. Thus, the accumulation time of pixels belonging to the focus detection rows is set at intervals longer than intervals corresponding to the two horizontal periods, and thereby it is possible to prevent the reset period of pixels belonging to focus detection rows from matching the readout period of pixels belonging to imaging rows neighboring the focus detection rows.

Accordingly, without using the detection means described in the fourth embodiment, it is possible to set the timing of the AF reset scan such that no AF reset scan is performed on pixels whose FDs neighbor the pixels on which the image capture read scan is performed. This can prevent horizontal stripe noise from occurring on a captured image and improve the image quality.

When the timing of the AF reset scan is set as illustrated in FIG. 26, it is desirable to perform readout of the image-A signal and the image-B signal in the AF read scan in an alternating manner in the neighboring AF rows on which the AF reset operations are performed at intervals corresponding to one row. For example, on the pixel row V1 and the pixel row V4 in FIG. 26, the AF read is performed in the order from the image-A signal of the pixels 12g on the pixel row V1, the image-A signal of the pixels 12r on the pixel row V4, the image-B signal of the pixels 12g on the pixel row V1, and then the image-B signal of the pixels 12r on the pixel row V4. This allows for matching of the accumulation times of the pixel row V1 and the pixel row V4 and thus the accumulation times of all the AF rows.

Note that the intervals of performing the AF reset operations on the neighboring AF rows or the intervals of the estimated timing of the AF reset scan and the actual reset scan are an example and can be changed as appropriate in accordance with capturing conditions or the like.

As discussed above, according to the present embodiment, it is possible to suppress noise due to an operation of a focus detection row from superimposing an imaging signal read out from an imaging row and improve the image quality.

Sixth Embodiment

A solid-state imaging device and a method of driving the same according to a sixth embodiment of the present invention will be described with reference to FIG. 27 and FIG. 28. The same component as that of the solid-state imaging device according to the first to fifth embodiments is labeled with the same reference, and the description thereof will be omitted or simplified.

Figure 27:
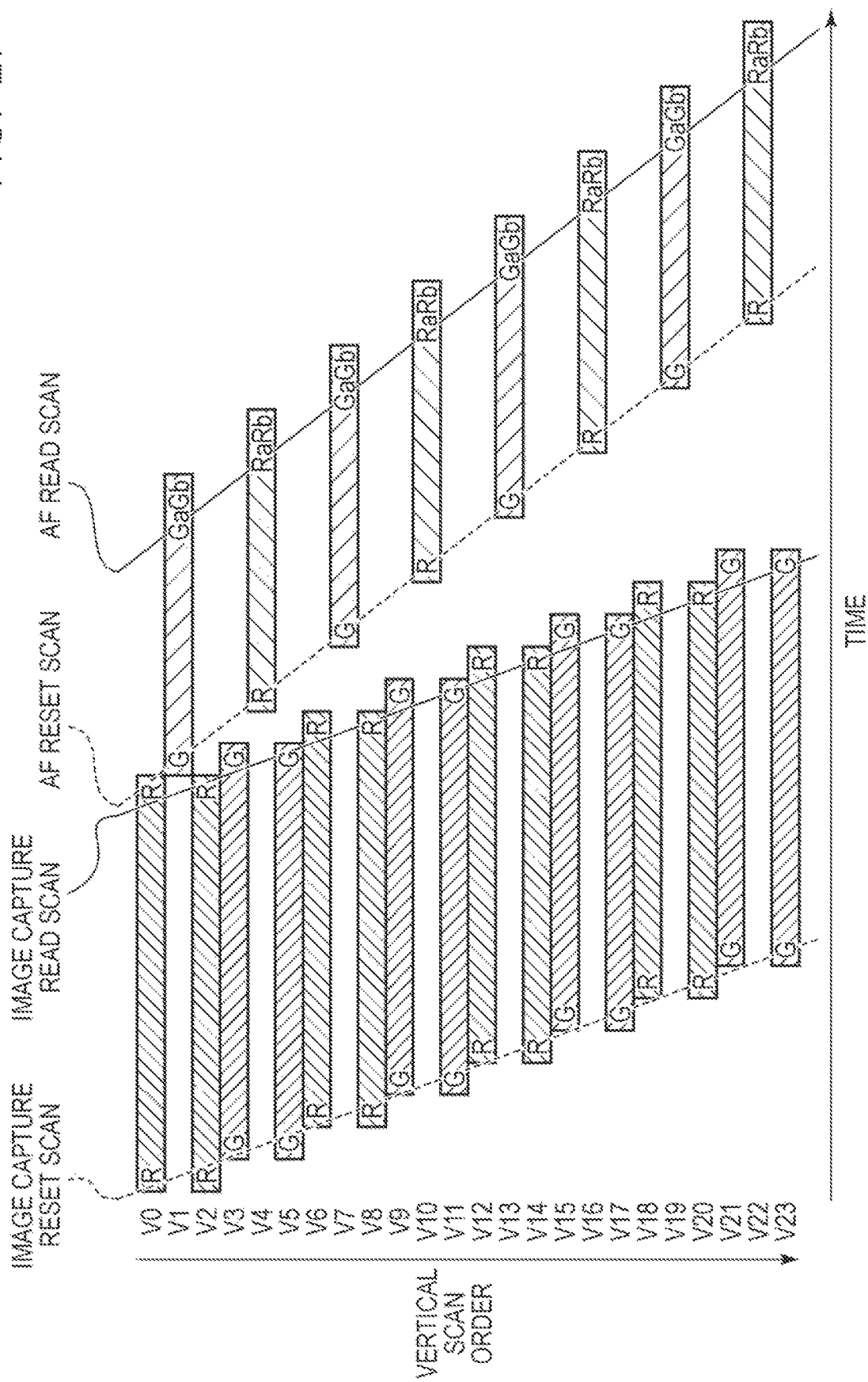
FIG. 27 and FIG. 28 are schematic diagrams illustrating the timing of the reset operation and the readout operation of respective pixel rows in a method of driving a solid-state imaging device according to a sixth embodiment.
Figure 28:
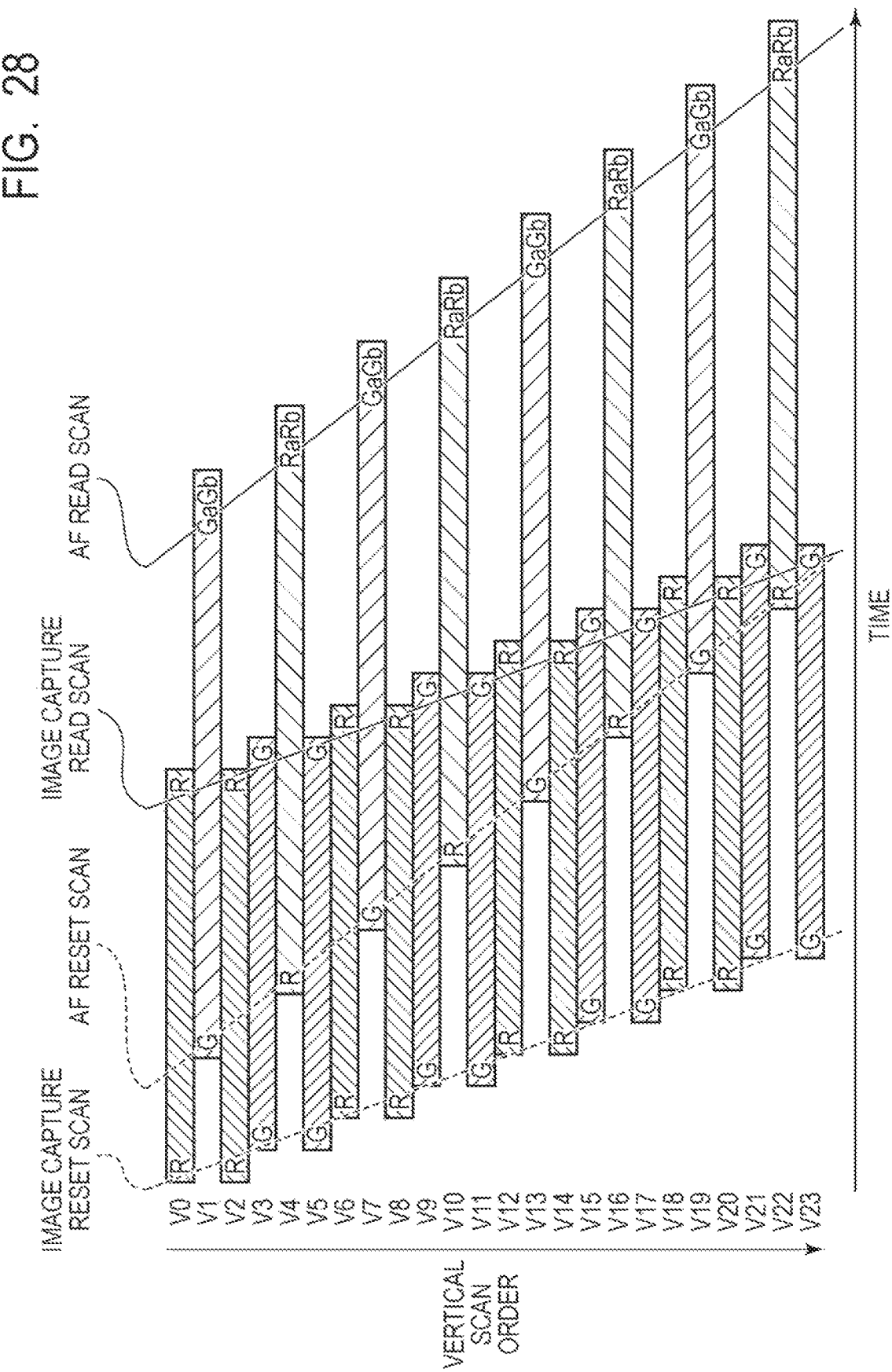

FIG. 27 and FIG. 28 are schematic diagrams illustrating the timing of the reset operation and the readout operation of respective pixel rows in the method of driving the solid-state imaging device according to the present embodiment.

In the present embodiment, another method of driving the solid-state imaging device according to the fourth embodiment is illustrated. The drive method of the present embodiment is different from that of the fourth embodiment in that the timings of the reset operations are evenly shifted not only on the row detected by the above-described detection means but also on all the AF rows.

For example, as illustrated in FIG. 27, the start timing of the AF reset scan is set so that a reset operation of the AF row that is first scanned in an AF reset scan (pixel row V1) starts after the completion of a readout operation on the immediately previous imaging row (pixel row V0). This can prevent the AF reset scan from being performed on pixels whose FD nodes neighbor the pixels on which an image capture read scan is performed, which can suppress occurrence of horizontal stripe noise.

In this example of driving, since the accumulation time of the AF row is relatively shorter, this may cause reduction in the output of the AF image. One of the conceivable solutions to this may be to increase the readout gain. For example, it is considered to control the FD capacitance to decrease or increase the gain of the column amplifier (not shown) in the AF read scan. In these cases, it is preferable to increase the gain in the pre-stage as much as possible within the dynamic range of the readout circuit.

Alternatively, as illustrated in FIG. 28, the start timing of the AF reset scan is set so that a reset operation of the last scanned AF row in an AF reset scan (pixel row V22) is completed before the start of a readout operation on the immediately following imaging row (pixel row V23). This can prevent the AF reset scan from being performed on pixels whose FD nodes neighbor the pixels on which an image capture read scan is performed and suppress occurrence of horizontal stripe noise.

In this example of driving, in contrast to the example of driving of FIG. 27, the accumulation time of the AF row is relatively longer, and reduction in the dynamic range of the AF image may occur. One of the conceivable solutions to this may be to decrease the readout gain. In this case, it is preferable to decrease the gain in the post stage as much as possible within the dynamic range of the readout circuit.

In terms of the S/N ratio, the example of driving of FIG. 28 having the longer accumulation time of the AF row is the more preferable of the above-described two examples of driving as long as the entire dynamic range of the imaging element including pixels and readout circuits is not exceeded. When selecting driving having the longer accumulation time, it is preferable to provide detection means for detecting whether or not dynamic range reduction occurs. With this detection means knowing in advance the dynamic range of the imaging element, the presence or absence of dynamic range reduction can be easily determined by simple calculation from exposure control information.

The drive method of the present embodiment is advantageous over the drive method of the fourth embodiment in that the accumulation time of the AF rows can be matched.

As discussed above, according to the present embodiment, it is possible to suppress noise due to an operation of a focus detection row from superimposing an imaging signal read out from an imaging row and therefore improve the image quality.

Seventh Embodiment

A solid-state imaging device and a method of driving the same according to a seventh embodiment of the present invention will be described with reference to FIG. 29. The same component as that of the solid-state imaging device according to the first to sixth embodiments is labeled with the same reference, and the description thereof will be omitted or simplified.

Figure 29:
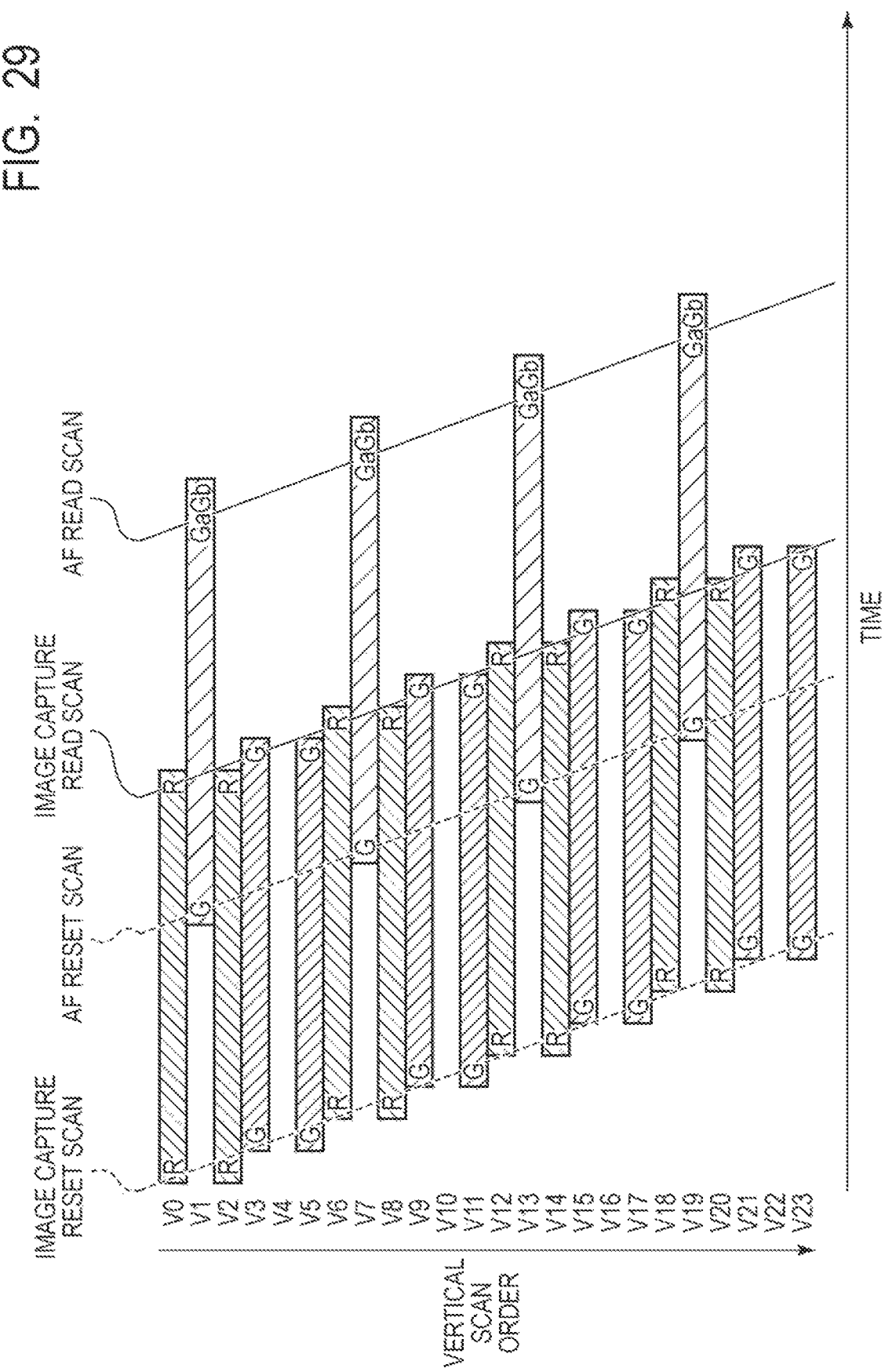
FIG. 29 is a schematic diagram illustrating the timing of the reset operation and the readout operation of respective pixel rows in a method of driving a solid-state imaging device according to a seventh embodiment.

FIG. 29 is a schematic diagram illustrating the timing of the reset operation and the readout operation of respective pixel rows in the method of driving the solid-state imaging device according to the present embodiment.

In the present embodiment, another method of driving the solid-state imaging device according to the fourth embodiment is illustrated. The drive method of the present embodiment is different from that of the fourth embodiment in the reduction ratio of AF rows. That is, while in the fourth embodiment the reduction ratio of pixel rows in the image capture scan is 2/3 and the reduction ratio of pixel rows in the AF scan is 1/3, the reduction ratio of pixel rows in the image capture scan is 4/6 and the reduction ratio of pixel rows in the AF scan is 1/6 in the present embodiment. Since readout operations are performed at the same time on two pixel rows on imaging rows, the reduction ratio of pixel rows in the image capture scan is 2/6 and the reduction ratio of pixel rows in the AF scan is 1/6 in terms of processing time.

As described above, since it is necessary to read out the image-A signal and the image-B signal in the AF read scan, the AF scan time is required to be twice the image capture scan time. Therefore, by setting the reduction ratio of an AF scan to a half (½ times) the reduction ratio of an image capture scan, the AF scan time and the image capture scan time can be matched to each other. In addition, by controlling the timing of the AF reset scan such that no AF reset scan is performed on pixels whose FDs neighbor the pixels on which the image capture read scan is performed, it is possible to suppress occurrence of horizontal stripe noise.

In the drive method of the present embodiment, none of the signals of blue pixels in the Bayer arrangement can be read out by the AF scan. Thus, interlace driving or the like may be performed if necessary to intermittently read out blue signals.

Note that, also in the present embodiment, as in the case of the fifth embodiment, the limitation of setting the timing of the AF reset scan every two rows may be further provided. This configuration is advantageous over the drive method of the fourth embodiment in that no detection means is necessary.

Further, while the reduction ratio in the AF scan is controlled in the present embodiment, the same advantageous effect can be achieved by changing the readout time per row. For example, the readout time per row in an image capture scan can be set twice the readout time per row in an AF scan.

As discussed above, according to the present embodiment, it is possible to suppress noise due to an operation of a focus detection row from superimposing an imaging signal read out from an imaging row and therefore improve the image quality.

Eighth Embodiment

Figure 30:
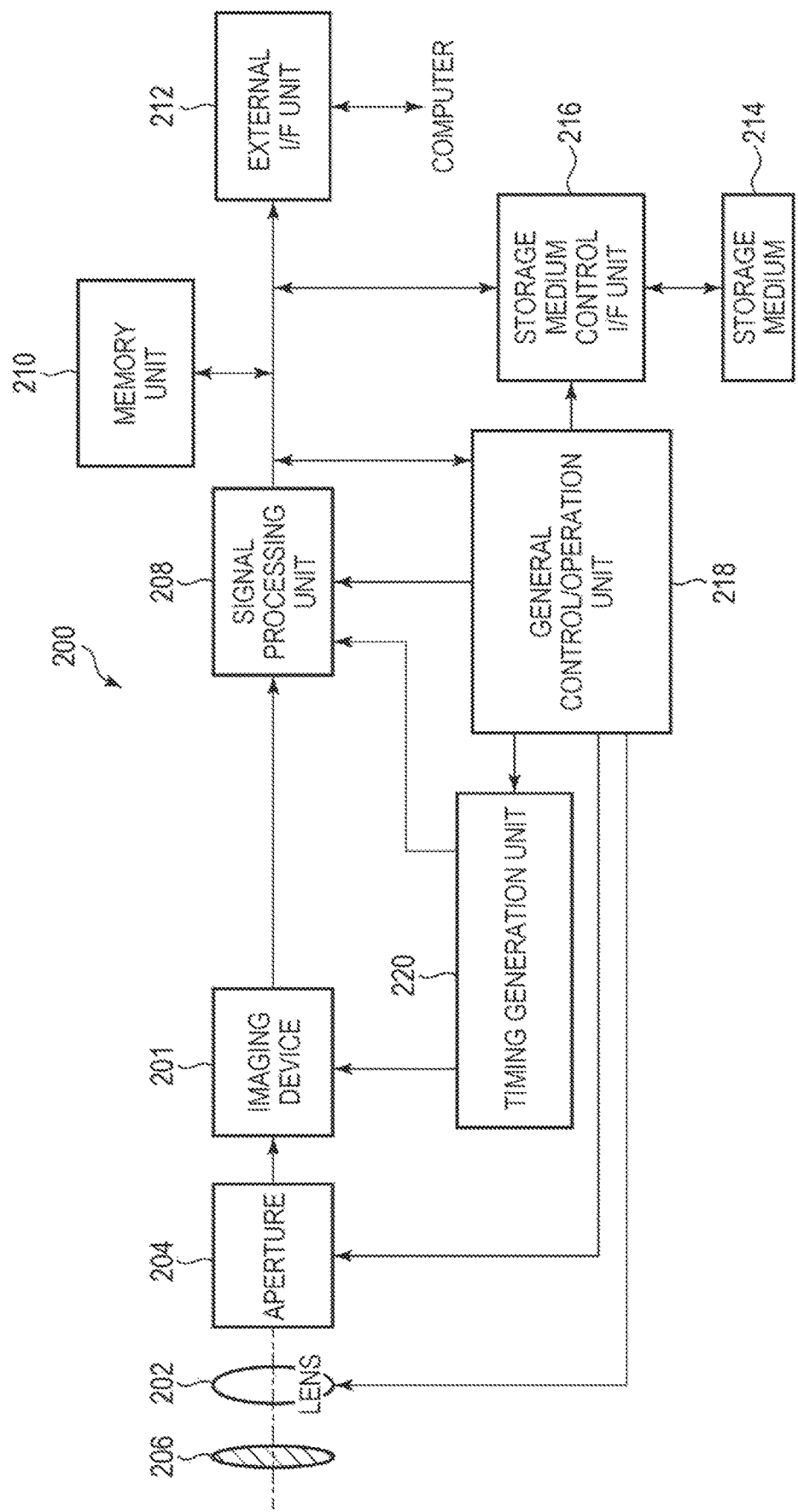
FIG. 30 is a block diagram illustrating a general configuration of an imaging system according to an eighth embodiment.

An imaging system according to an eighth embodiment of the present invention will be described with reference to FIG. 30. The same component as that of the solid-state imaging device according to the first to seventh embodiments is labeled with the same reference, and the description thereof will be omitted or simplified. FIG. 30 is a block diagram illustrating a general configuration of the imaging system according to the present embodiment.

The solid-state imaging device 100 described in the above first to seventh embodiments can be applied to various imaging systems. Examples of the applicable imaging systems may include a digital still camera, a digital camcorder, a surveillance camera, a copier machine, a fax machine, a mobile phone, an on-vehicle camera, an observation satellite, and the like. Further, a camera module having an optical system, such as a lens, and a solid-state imaging device may be included in the imaging system. FIG. 30 illustrates a block diagram of a digital still camera as an example of the above.

The imaging system 200 illustrated as an example in FIG. 30 includes the imaging device 201, a lens 202 that captures an optical image of an object onto the imaging device 201, an aperture 204 for changing a light amount passing through the lens 202, and a barrier 206 for protecting the lens 202. The lens 202 and the aperture 204 form an optical system that converges a light onto the imaging device 201. The imaging device 201 is any of the solid-state imaging devices 100 described in the first to seventh embodiments and converts an optical image captured by the lens 202 into image data.

The imaging system 200 further includes a signal processing unit 208 that processes an output signal output from the imaging device 201. The signal processing unit 208 performs AD conversion that converts an analog signal output from the imaging device 201 into a digital signal. Further, the signal processing unit 208 performs other operations of performing various correction or compression if necessary and outputting image data. An AD converter that is a part of the signal processing unit 208 may be formed on the semiconductor substrate in which the imaging device 201 is provided, or may be formed on a different semiconductor substrate from the imaging device 201. Further, the imaging device 100 and the signal processing unit 208 may be formed on the same semiconductor substrate.

The imaging system 200 further includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

The imaging system 200 further includes a general control/operation unit 218 that controls various computation and controls the entire digital still camera and a timing generation unit 220 that outputs various timing signals to the imaging device 201 and the signal processing unit 208. Here, the timing signal or the like may be input from the outside, and the imaging system 200 may have at least the imaging device 201 and the signal processing unit 208 that processes an output signal output from the imaging device 201.

The solid-state imaging device 100 outputs an imaging signal to the signal processing unit 208. The signal processing unit 208 performs predetermined signal processing on an imaging signal output from the imaging device 201 and outputs image data. The signal processing unit 208 uses an imaging signal to generate an image.

Application of the imaging device 201 of any of the first to seventh embodiments can realize an imaging system that can acquire an image of a good quality without horizontal stripe noise on a captured image.

Ninth Embodiment

Figure 31A:
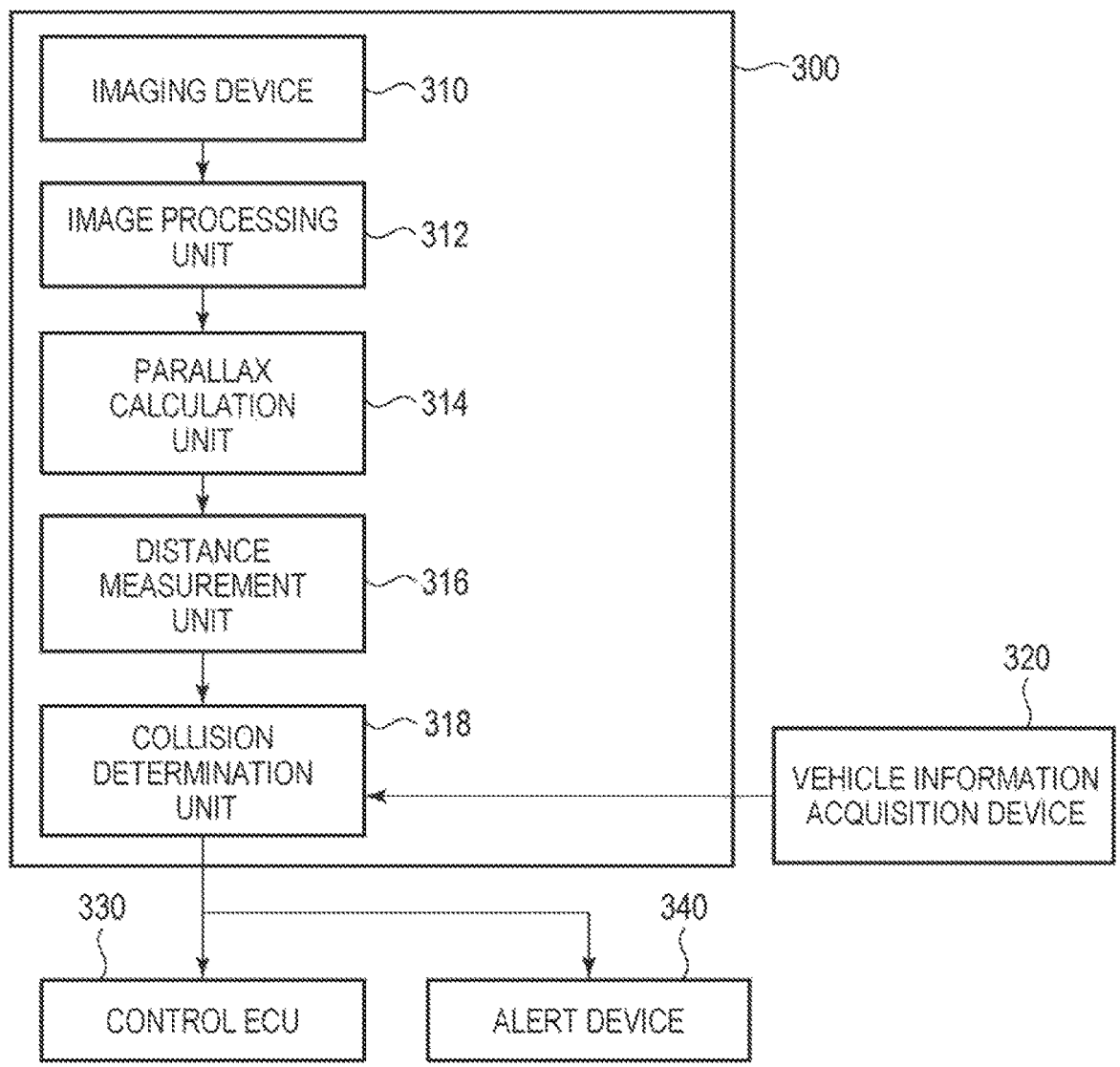
FIG. 31A is a diagram illustrating a configuration example of an imaging system according to a ninth embodiment.
Figure 31B:
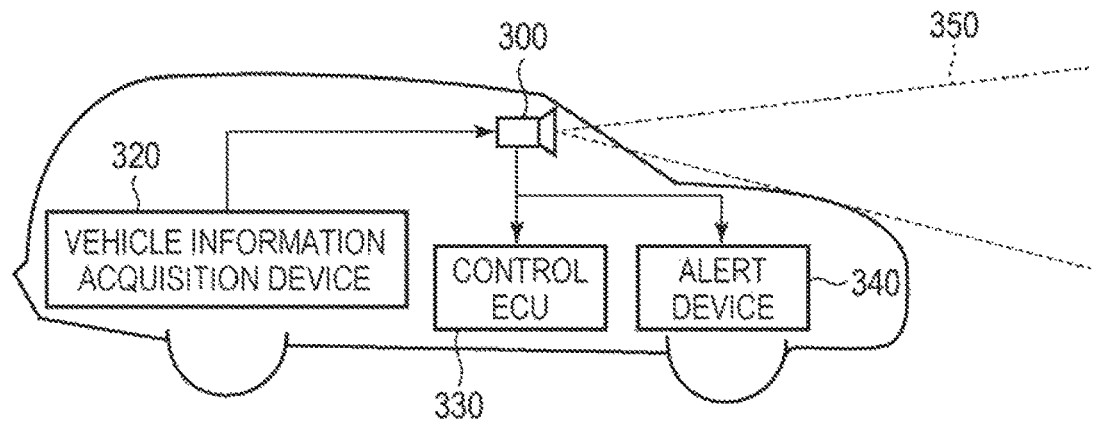
FIG. 31B is a diagram illustrating a configuration example of a movable object according to the ninth embodiment.

An imaging system and a movable object according to a ninth embodiment of the present invention will be described by using FIG. 31A and FIG. 31B. FIG. 31A is a diagram illustrating a configuration of the imaging system according to the present embodiment. FIG. 31B is a diagram illustrating a configuration of the movable object according to the present embodiment.

FIG. 31A illustrates an example of an imaging system related to an on-vehicle camera. The imaging system 300 includes an imaging device 310. The imaging device 310 is any of the solid-state imaging devices 100 described in the above first to seventh embodiments. The imaging system 300 includes an image processing unit 312 that performs image processing on a plurality of image data acquired by the imaging device 310 and a parallax calculation unit 314 that calculates a parallax (a phase difference of parallax images) from the plurality of image data acquired by the imaging system 300. Further, the imaging system 300 includes a distance measurement unit 316 that calculates a distance to the object based on the calculated parallax and a collision determination unit 318 that determines whether or not there is a collision possibility based on the calculated distance. Here, the parallax calculation unit 314 and the distance measurement unit 316 are an example of a distance information acquisition unit that acquires distance information on the distance to the object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by combination thereof.

The imaging system 300 is connected to the vehicle information acquisition device 320 and can acquire vehicle information such as a vehicle speed, a yaw rate, a steering angle, or the like. Further, the imaging system 300 is connected with a control ECU 330, which is a control device that outputs a control signal for causing a vehicle to generate braking force based on a determination result by the collision determination unit 318. Further, the imaging system 300 is connected with an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 31B illustrates the imaging system in a case of capturing a front area of a vehicle (a capturing area 350). The vehicle information acquisition device 320 transmits instructions to the imaging system 300 or the imaging device 310. Such a configuration can further improve the ranging accuracy.

Although the example of control for avoiding a collision to another vehicle has been illustrated in the above description, the embodiment is applicable to automatic driving control for following another vehicle, automatic driving control for not going out of a traffic lane, or the like. Furthermore, the imaging system is not limited to a vehicle such as the subject vehicle, and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the above-described embodiments, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention.

Further, while the case where a unit pixel row to which an imaging row belongs and a unit pixel row to which an AF row belongs are neighbored each other has been described as an example in the above embodiments, the influence of a change in the potential of the FD node may occur beyond a range of a neighboring unit pixel row. It is therefore preferable to apply any of the drive methods described in the above embodiments to at least a unit pixel row located within a range which may be affected by the change in the potential of the FD node due to the reset operation.

Further, while pupil division is made by the configuration in which a single micro-lens ML is shared by two photoelectric converters DA and DB of a single pixel in the embodiments described above, pupil division may be made by two pixels having a photoelectric converter on which a part of a pupil region is shielded from light by a light-shielding film or an interconnection layer.

Further, while all the pixels arranged in the pixel region 10 are pupil-divided pixels in the embodiments described above, not all the pixels may be required to be pupil-divided pixels. For example, at least some of the pixels belonging to at least AF rows may be pupil-divided pixels.

Further, while the control signals $\phi$TXA and $\phi$TXB of the transfer transistors MA and MB connected to the photoelectric converters DA and DB are maintained at a low level when the photoelectric converters DA and DB are in a non-accumulation state in the first to third embodiments described above, these signals may not necessarily required to be maintained at a low level. For example, the control signals $\phi$TXA and $\phi$TXB may be at a high level in a part of period.

Further, the number or address settings of imaging rows and AF rows is not limited to the embodiments described above, and any number or setting may be possible.

Further, the imaging system illustrated in the above embodiments are an example of imaging systems to which the solid-state imaging device of the present invention may be applied, the imaging system to which the solid-state imaging device of the present invention can be applied is not limited to the configuration illustrated in FIG. 30 and FIG. 31A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-087026, filed Apr. 26, 2017, which is hereby incorporated by reference herein in its entirety.

What is claimed is:

1. A solid-state imaging device comprising:
a plurality of pixels arranged to form a plurality of pixel rows, each of the plurality of pixels including a plurality of photoelectric converters that generate charges by photoelectric conversion, a holding unit that holds charges generated by any of the plurality of photoelectric converters, an amplifier unit that outputs a pixel signal based on an amount of charges held in the holding unit, and a reset unit that resets the photoelectric converters; and
a scanning circuit that performs, on the row-by-row basis for the plurality of pixels, a reset operation of the photoelectric converters of the pixel and a readout operation of a pixel signal based on charges generated by the photoelectric converter, the readout operation including charge transfer that transfers charges generated by the photoelectric converter to the holding unit,
wherein the plurality of pixel rows include a plurality of imaging rows to be used for acquiring imaging signals and a plurality of focus detection rows to be used for acquiring focus detection signals,
wherein the scanning circuit performs an image capture scan and a focus detection scan, independently, such that signals of the plurality of focus detection rows are output after signals from the plurality of imaging rows are output,
wherein, in the image capture scan, the reset operation and the readout operation are performed on the plurality of imaging rows,
wherein, in the focus detection scan, the reset operation and the readout operation are performed on the plurality of focus detection rows,
wherein the plurality of pixel rows form a plurality of unit pixel rows defined by the holding unit on a basis that each of the unit pixel rows corresponds to one of the holding units, each of the unit pixel rows including at least one pixel row,
wherein the scanning circuit performs the focus detection scan such that the reset operation on each of the plurality of focus detection rows does not overlap with a period of the charge transfer on an imaging row belonging to a unit pixel row neighboring a unit pixel row to which a focus detection row on which the reset operation is performed belongs, and
wherein, when a reset period of performing the reset operation on any of the plurality of focus detection rows matches a readout period of performing the readout operation on the imaging row belonging to a neighboring unit pixel row to a unit pixel row to which a focus detection row on which the reset operation is performed belongs, the scanning circuit performs the reset operation of the focus detection row in a period in which a potential of the holding unit of the pixel belonging to the imaging row is fixed.

2. The solid-state imaging device according to claim 1, wherein a holding unit of a pixel on the unit pixel row to which the focus detection row on which the reset operation is performed belongs neighbor a holding unit of a pixel on a unit pixel row neighboring the unit pixel row to which the focus detection row on which the reset operation is performed belongs.

3. The solid-state imaging device according to claim 1, wherein each two pixel rows neighboring each other form each of the plurality of unit pixel rows, a pixel belonging to one of the two pixel rows forming each of the unit pixel rows and a pixel belonging to the other one of the two pixel rows forming each of the unit pixel rows share the holding unit and the amplifier unit.

4. The solid-state imaging device according to claim 1, wherein the scanning circuit shifts the reset periods of the focus detection rows such that a reset period of performing the reset operation on each of the plurality of focus detection rows does not match a readout period of performing the readout operation on a imaging row belonging to a unit pixel row neighboring a unit pixel row to which the focus detection row on which the reset operation is performed belongs.

5. The solid-state imaging device according to claim 4, wherein, out of the plurality of focus detection rows, the scanning circuit selectively shifts the reset period of the focus detection row in which the reset period matches the readout period of the imaging row belonging to the neighboring unit pixel row.

6. The solid-state imaging device according to claim 4, wherein an accumulation time of the pixel belonging to the focus detection rows is set at an interval longer than an interval corresponding to two horizontal periods such that the reset period for the focus detection row does not match the readout operation for the imaging row belonging to the unit pixel row neighboring the unit pixel row to which the focus detection row on which the reset operation is performed belongs.

7. The solid-state imaging device according to claim 6, wherein an interval of the reset periods on the focus detection rows neighboring each other is set at intervals corresponding to one or more odd rows, and
wherein a timing of performing the focus detection scan is set at a timing shifted by one or more odd rows with respect to a timing of a focus detection scan in which the reset period for the focus detection row matches the readout period for the imaging row belonging to the unit pixel row neighboring the unit pixel row to which the focus detection row on which the reset operation is performed belongs.

8. The solid-state imaging device according to claim 4, wherein the scanning circuit evenly shifts the reset periods of the plurality of focus detection rows such that the focus detection scan is started after completion of the readout periods of the imaging rows located on a row ahead of the focus detection rows first scanned out of the plurality of focus detection rows.

9. The solid-state imaging device according to claim 4, wherein the scanning circuit evenly shifts the reset periods of the plurality of focus detection rows such that the readout period of the imaging rows located on a row subsequent to the focus detection rows is started after completion of the reset period of the focus detection row last scanned out of the plurality of focus detection rows.

10. The solid-state imaging device according to claim 4, wherein a reduction ratio of the focus detection rows is half a reduction ratio of the imaging rows.

11. The solid-state imaging device according to claim 1, wherein the reset period and the readout period are periods defined by intervals of control signals used for selecting rows to be scanned.

12. The solid-state imaging device according to claim 1, wherein the scanning circuit performs the readout operation on one imaging row and the readout operation on another imaging row simultaneously and outputs pixel signal read out from a pixel belonging to the one imaging row and pixel signal read out from a pixel belonging to the another imaging row to a single output line.

13. The solid-state imaging device according to claim 1, wherein the scanning circuit performs the readout operation on one imaging row and the readout operation on another imaging row simultaneously and outputs pixel signal read out from a pixel belonging to the one imaging row and pixel signal read out from a pixel belonging to the another imaging row to different output lines arranged on a single column.

14. The solid-state imaging device according to claim 1, wherein the plurality of photoelectric converters of at least a part of the plurality of pixels belonging to the focus detection rows include a first photoelectric converter that photoelectrically converts one part of a pupil-divided light and a second photoelectric converter that photoelectrically converts another part of the pupil-divided light.

15. An imaging system comprising:
the solid-state imaging device according to claim 1; and
a signal processing unit that processes signals output from the pixels of the solid-state imaging device.

16. A movable object comprising:
the solid-state imaging device according to claim 1;
a distance information acquisition unit configured to acquire distance information of a distance to an object, from parallax images based on signals from the solid-state imaging device; and
a control unit configured to control the movable object based on the distance information.

17. A solid-state imaging device comprising:
a plurality of pixels arranged to form a plurality of pixel rows, each of the plurality of pixels including a photoelectric converter that generates charges by photoelectric conversion, a holding unit that holds charges generated by the photoelectric converter, an amplifier unit that outputs a pixel signal based on an amount of charges held in the holding unit, and a reset unit that resets the photoelectric converter; and
a scanning circuit that performs, on the row-by row basis for the plurality of pixels, a reset operation of the photoelectric converter of the pixel and a readout operation of a pixel signal based on charges generated by the photoelectric converter, the readout operation including charge transfer that transfers charges generated by the photoelectric converter to the holding unit,
wherein the plurality of pixel rows include a plurality of imaging rows to be used for acquiring imaging signals and a plurality of focus detection rows to be used for acquiring focus detection signals,
wherein the plurality of pixel rows form a plurality of unit pixel rows each including a plurality of pixel rows defined by the holding unit shared by pixels on the plurality of pixel rows,
wherein the scanning circuit performs an image capture scan and a focus detection scan, independently, such that signals of the plurality of focus detection rows are output after signals from the plurality of imaging rows are output,
wherein in the image capture scan, the reset operation and the readout operation are performed on the plurality of imaging rows,
wherein, in the focus detection scan, the reset operation and the readout operation are performed on the plurality of focus detection rows,
wherein the scanning circuit performs in parallel the readout operation on an imaging row included in a first unit pixel row in a first period and the reset operation on a focus detection row included in a second unit pixel row neighboring the first unit pixel row,
wherein, in the first period, the scanning circuit performs an operation of causing the holding unit included in the second unit pixel row to be in a floating state by causing the reset unit included in the second unit pixel row to be in an off-state after completion of the reset operation on the focus detection row included in the second unit pixel row, and
wherein the scanning circuit performs the readout operation on an imaging row included in the second unit pixel row in a second period subsequent to the first period.

18. A solid-state imaging device comprising:
a plurality of pixels arranged to form a plurality of pixel rows, each of the plurality of pixels including a plurality of photoelectric converters that generate charges by photoelectric conversion, a holding unit that holds charges generated by any of the plurality of photoelectric converters, an amplifier unit that outputs a pixel signal based on an amount of charges held in the holding unit, and a reset unit that resets the photoelectric converters; and
a scanning circuit that performs, on the row-by-row basis for the plurality of pixels, a reset operation of the photoelectric converters of the pixel and a readout operation of a pixel signal based on charges generated by the photoelectric converter, the readout operation including charge transfer that transfers charges generated by the photoelectric converter to the holding unit,
wherein the plurality of pixel rows include a plurality of imaging rows to be used for acquiring imaging signals and a plurality of focus detection rows to be used for acquiring focus detection signals,
wherein the scanning circuit performs an image capture scan and a focus detection scan, independently, such that signals of the plurality of focus detection rows are output after signals from the plurality of imaging rows are output,
wherein, in the image capture scan, the reset operation and the readout operation are performed on the plurality of imaging rows,
wherein, in the focus detection scan, the reset operation and the readout operation are performed on the plurality of focus detection rows,
wherein the plurality of pixel rows form a plurality of unit pixel rows defined by the holding unit on a basis that each of the unit pixel rows corresponds to one of the holding units, each of the unit pixel rows including at least one pixel row,
wherein the scanning circuit performs the focus detection scan such that the reset operation on each of the plurality of focus detection rows does not overlap with a period of the charge transfer on an imaging row belonging to a unit pixel row neighboring a unit pixel row to which a focus detection row on which the reset operation is performed belongs,
wherein a reduction ratio of the focus detection rows is half a reduction ratio of the imaging rows, and
wherein a period used for reading out from one row of the plurality of focus detection rows is twice a period used for reading out from one row of the plurality of imaging rows.

* * * * *